(12) United States Patent
Nakano et al.

(10) Patent No.: US 7,272,229 B2
(45) Date of Patent: Sep. 18, 2007

(54) DIGITAL WORK PROTECTION SYSTEM, KEY MANAGEMENT APPARATUS, AND USER APPARATUS

(75) Inventors: Toshihisa Nakano, Neyagawa (JP); Natsume Matsuzaki, Minou (JP); Makoto Tatebayashi, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 857 days.

(21) Appl. No.: 10/278,082

(22) Filed: Oct. 23, 2002

(65) Prior Publication Data

US 2003/0081792 A1    May 1, 2003

(30) Foreign Application Priority Data

Oct. 26, 2001    (JP)    ............... 2001-329863

(51) Int. Cl.
*H04L 9/00*    (2006.01)
(52) U.S. Cl. ............... 380/277; 380/281; 380/286; 713/158
(58) Field of Classification Search ........ 380/277–279, 380/28–30, 286, 281; 713/158, 171, 168
See application file for complete search history.

(56) References Cited

U.S. PATENT DOCUMENTS

| | | | | |
|---|---|---|---|---|
| 6,307,936 B1 * | 10/2001 | Ober et al. | ................... | 380/30 |
| 6,398,245 B1 * | 6/2002 | Gruse et al. | ................. | 280/228 |
| 6,993,138 B1 * | 1/2006 | Hardjono | ................... | 380/281 |

FOREIGN PATENT DOCUMENTS

| | | |
|---|---|---|
| EP | 1 185 021 | 3/2002 |
| JP | 2001-186119 | 7/2001 |
| WO | 01/78299 | 10/2001 |

OTHER PUBLICATIONS

I. Chang et al., "Key Management for secure Internet Multicast using Boolean function minimization techniques", INFOCOM '99. Eighteenth Annual Joint Conference of the IEEE Computer and Communications Societies. Proceedings. IEEE New York, NY, USA Mar. 21-25, 1999, Piscataway, NJ, USA, IEEE, US, Mar. 21, 1999, pp. 689-698.

"Key Management System for Digital Content Protection", Toshihisa Nakano et al., The 2001 Symposium on Cryptography and Information Security Oiso, Japan, Jan. 23-26, 2001, The Institute of Electronics, Information and Communication Engineers, pp. 213-218, (with partial English translation).

"Manipulation of Trees in Information Retrieval", Gerard Salton, Communication of the ACM 5, 1962, pp. 103-114.

* cited by examiner

*Primary Examiner*—T. B. Truong
(74) *Attorney, Agent, or Firm*—Wenderoth, Lind & Ponack, L.L.P.

(57) ABSTRACT

In a system composed of a recording apparatus that records digitized content such as a movie, or a reproduction apparatus that reproduces the digitized content, and a recording medium, a media key for use in recording or reproduction is encrypted by a plurality of device keys and recorded on the recording medium. Here, the recording apparatus or the reproduction apparatus specifies the encrypted media key that it is to decrypt, from amongst the plurality of encrypted media keys. A key management apparatus records node revocation patterns assigned to nodes in a tree structure to the recording medium in a particular order, as header information of key information, together with the encrypted media keys. The recording apparatus or the reproduction apparatus specifies the encrypted media key to be decrypted, by analyzing the node revocation patterns sequentially.

10 Claims, 51 Drawing Sheets

FIG.3 tree structure table    D100

| \multicolumn{3}{c}{node information} |
| node name | device key | revocation flag |
|---|---|---|
| root | KeyA | 1 |
| 0 | KeyB | 1 |
| 1 | KeyC | 1 |
| 00 | KeyD | 1 |
| 01 | KeyE | 0 |
| 10 | KeyF | 1 |
| 11 | KeyG | 0 |
| 000 | KeyH | 1 |
| 001 | KeyI | 0 |
| 010 | KeyJ | 0 |
| ⋮ | ⋮ | ⋮ |
| 111 | KeyO | 0 |
| 0000 | IK1 | 1 |
| 0001 | IK2 | 0 |
| 0010 | IK3 | 0 |
| 0011 | IK4 | 0 |
| ⋮ | ⋮ | ⋮ |
| 1111 | IK16 | 0 |

FIG.20 key structure table → D400

| node name | device key | revocation flag | node revocation pattern |
|---|---|---|---|
| root | KeyA | 1 | {011} |
| 0 | KeyB | 1 | {111} |
| 1 | KeyC | 1 | {010} |
| 00 | KeyD | 1 | ~~{111}~~ |
| 01 | KeyE | 1 | ~~{111}~~ |
| 10 | KeyF | 1 | {001} |
| 11 | KeyG | 0 | |
| 000 | KeyH | 1 | ~~{111}~~ |
| 001 | KeyI | 1 | ~~{111}~~ |
| 010 | KeyJ | 1 | ~~{111}~~ |
| ⋮ | ⋮ | ⋮ | |
| 111 | KeyO | 0 | |
| 0000 | IK1 | 1 | ~~{111}~~ |
| 0001 | IK2 | 1 | ~~{111}~~ |
| 0010 | IK3 | 1 | ~~{111}~~ |
| 0011 | IK4 | 1 | ~~{111}~~ |
| ⋮ | ⋮ | ⋮ | |
| 1111 | IK16 | 0 | |

FIG.21 header information D500

| position | | |
|---|---|---|
| 0 ... | {011} | layer 0 |
| 1 ... | {111} | layer 1 |
| 2 ... | {010} | layer 2 |
| 3 ... | {001} | layer 3 |
| 4 ... | {001} | |

FIG.37

D1000 tree structure table

| node information | | | node information | | |
|---|---|---|---|---|---|
| node name | device key | revocation flag | node name | device key | revocation flag |
| (blank) | KeyA | | 1 | KeyC | |
| 0 | KeyB | | 10 | KeyF | |
| 00 | KeyD | | 100 | KeyL | |
| 000 | KeyH | | 1000 | IK9 | |
| 0000 | IK1 | | 1001 | IK10 | |
| 0001 | IK2 | | 101 | KeyM | |
| 001 | KeyI | | 1010 | IK11 | |
| 0010 | IK3 | | 1011 | IK12 | |
| 0011 | IK4 | | 11 | KeyG | |
| 01 | KeyE | | 110 | KeyN | |
| 010 | KeyJ | | 1100 | IK13 | |
| 0100 | IK5 | | 1101 | IK14 | |
| 0101 | IK6 | | 111 | KeyO | |
| 011 | KeyK | | 1110 | IK15 | |
| 0110 | IK7 | | 1111 | IK16 | |
| 0111 | IK8 | | | | |

DIGITAL WORK PROTECTION SYSTEM, KEY MANAGEMENT APPARATUS, AND USER APPARATUS

BACKGROUND OF THE INVENTION (1) Field of the Invention

The present invention relates to a technique for recording a digital work on a recording medium, distributing the recording medium, and reproducing the digital work from the distributed recording medium, and in particular to a technique for managing key information for content encryption for protecting the digital work.

(2) Description of the Related Art

Accompanying developments in recent years in techniques such as digital processing, storing, and communication, services that provide digital content such as movies to users by way of sale or rental of large-capacity recording media have become widespread. In addition, systems in which digitized content is broadcast, received by a reception apparatus, stored on a recording medium such as a recordable digital optical disc, and then reproduced by a reproduction apparatus are becoming common.

In providing such a service or system, it is necessary to protect the copyright of the content, and perform reproduction, copying and so on under limitations consented to by the copyright holder, so that the content is not used illegally.

Generally, a digital work is protected in the following way from illegal copying for which the copyright holder has not consented. A recording apparatus encrypts the digital content with an encryption key, and records the encrypted content on a disc. Only a reproduction apparatus that has a decryption key corresponding to the encryption key is able to decrypt the encrypted content. An agreement for copyright protection are determined by the manufacturer of the recording apparatus and the reproduction apparatus etc. in conjunction with the copyright holder, and the manufacturer obtains the encryption key or the decryption key (hereinafter simply referred to as "the key"), on the condition that the manufacturer adheres to the agreement. The manufacturer must manage the obtained key stringently so that it is not divulged to a third party.

However, even when the manufacturer manages the key stringently, there is a possibility that a third party will obtain the key illegally. Once the key has been exposed by the third party, the third party may circulate the key, manufacture a recording and/or reproduction apparatus that uses the content illegally, or create a computer program that uses the content illegally and distribute the computer program via the Internet, without regard for the agreement consented to by the manufacturer and the copyright holder. It is desirable that in such a case the copyright holder is able to make content that is provided after the key has been exposed unusable with the exposed key.

The following is the simplest method that responds to this desire.

The key management organization (hereinafter simply referred to as "the organization") has a set of keys that consists of a plurality of device keys and a plurality of media keys. The organization assigns one of the device keys and a device key identification number respectively to each of a plurality of recording apparatuses and a plurality of reproduction apparatuses, and then provides each recording apparatus and reproduction apparatus with the respective device key and device key identification number. In addition, the organization assigns one media key to a recording medium. Next, the organization encrypts the media key, using each of the device keys assigned to the recording apparatuses and the reproduction apparatuses, to generate encrypted media keys, and stores a list of the encrypted media keys corresponding to all the device keys, and the key identification numbers on the recording medium as key information. When the recording medium is loaded into a recording apparatus or a reproduction apparatus, the apparatus extracts the encrypted media key corresponding to the key identification number assigned to the apparatus itself, from the key information in the recording medium, and decrypts the extracted encrypted media key, based on the device key that is assigned to the apparatus itself, to generate the media key. Next, the recording apparatus encrypts content using the obtained media key, and records the resulting encrypted content on the recording medium. On the other hand, the reproduction apparatus decrypts encrypted content in the same way, using the obtained media key. In this way, if a recording apparatus or a reproduction apparatus has a legitimately assigned device key, it is always able to obtain the same media key from the recording medium, thus maintaining compatibility between devices.

Here, suppose that the device key of a particular recording apparatus or reproduction apparatus has been exposed. When storing key information on a new recording medium after the device key has been exposed, the organization creates key information that does not include the exposed device key, and stores the created key information on the recording medium. In this way, an illegitimate apparatus that knows the exposed device key is unable to obtain the correct media key from the key information, because an encrypted media key encrypted using the exposed device key is not included in the key information stored in the recording medium. As a result, the illegitimate apparatus is unable to use the content illegally. For example, if the illegitimate apparatus is a recording apparatus, encrypted content recorded using that recording apparatus is not encrypted using the correct key, therefore the encrypted content cannot be decrypted using a legitimate reproduction apparatus. Furthermore, if the illegitimate apparatus is a reproduction apparatus, that reproduction apparatus is unable to obtain the correct media key, and is therefore unable to correctly decrypt encrypted content that has been recording using a legitimate recording apparatus. In this way, an exposed key can be revoked.

However, a defect in this simple method is that the size of the data of the key information is unrealistically large when there is a great number of apparatuses. For example, suppose that a particular type of digital device becomes widespread throughout the world, and billions of the particular device exist in the world. If the encryption algorithm used in generating the above-described encrypted content is the American standard encryption triple DES encryption, the length of one media key including padding will be 16 bytes. Consequently, the size of an encrypted media key will also be 16 bytes. Furthermore, if a four-byte value is used as the key identification number, the size of the key information will be 20 bytes*one billion apparatuses=20 billion bytes=20 giga bytes. This large value is unrealistic considering the capacity of current recordable optical discs.

In this kind of system it is a condition that the size of key information recorded on a recording medium be very small compared to the capacity of the recording medium.

One example of a system that meets this condition is a digital work protection key management method that uses a tree structure, disclosed in Document 1"Digital Content Hogo-you Kagi Kanri Houshiki (Key Management Method for Protecting Digital Content)", Nakano, Omori and Tatebayashi, Symposium on Cryptography and Information Security 2001, SCIS2001, 5A-5, January 2001.

Before describing the method disclosed in Document 1, a brief description is given of a tree structure.

In terms of form, the tree structure is a finite set T that is composed of at least one node, and is defined as meeting the following conditions.

(a) Only one node is designated as a root of the tree structure.

(b) Other nodes (excluding the root) are divided into sets $T_1, \ldots, T_m$ that do not have m (m≧0) common parts. Each $T_i$(i=1, . . . , m) is a further tree structure whose height is "1" less than T. The tree structures $T_1$, $T_m$ are subtrees of the of the root.

Furthermore, the numbers of the levels (layers) in the tree structure T are defined in the following way. The root of T is level 0. Taking an example of a subtree $T_j$ that is a subtree of the root T, the level of the root $T_j$ is one greater than T.

The following describes the digital work protection key management method that uses a tree structure disclosed in Document 1.

In this key management method, the organization constructs, as one example, a binary tree structure having four layers, and generates a number of keys that is equal to the number of nodes in the constructed tree structure. Each generated device key is assigned to a node in the tree structure. The organization corresponds each player (hereinafter "player" refers to the above-described reproduction apparatuses) with a leaf in the tree structure, and distributes one set of device keys to each player that is corresponded one-to-one with one of the leaves. The set consists of a plurality of device keys that are assigned to the nodes on the path from the corresponding leaf through to the root. In this way, a different device key set is distributed to each player.

Here, when a device key set that has been assigned to one player is exposed, the organization deletes the nodes to which the device keys included in the exposed device key set are assigned. Then, the organization specifies the keys that are common to the greatest numbers of players, amongst the players whose device keys have not been exposed, as the next device keys to be used.

Document 1 shows that according to this method key information of approximately 3 MB will suffice if an arbitrary 10,000 of the billion players are to be revoked.

Document 2 "Manipulation of Trees in Information Retrieval" (G. Salton, Communication of the ACM 5, 1962), and Document 3 "Kihon Sanhou/Jouhou Kouzou (Basic Algorithms/Information Structure)", Knuth, trans. Yoneda & Kakehi, Saiensu-sha, 1978, disclose methods of expressing a tree structure linearly. The tree structure is expressed linearly by arranging each node in the tree structure according to a particular rule. For example, p. 136 of Document 3 shows the order in which the levels are arranged. According to this method, the levels are arranged in order from lowest to highest, and the nodes in each level are arranged in order from left to right. By arranging the nodes according to a specific kind of rule, the player is able to construct a tree structure from the linearly arranged information.

While the size of the key information recorded in the recording medium in this key management method for digital work protection does meet the condition of being very small compared to the capacity of the recording medium, there is a demand for the player to be able to efficiently determine the key assigned to the player in the event that the keys in the constructed tree structure include a revoked key.

SUMMARY OF THE INVENTION

In response to the above-described demand, the object of the present invention is to provide a digital work protection system in which a user apparatus can efficiently determine a key assigned to the user apparatus, a key management apparatus, the user apparatus, a key management method, a key management program, and a recording medium having the key management program recorded thereon.

In order to achieve the above-described object, the present invention is a digital work protection system composed of a key management apparatus and at least one user apparatus, the key management apparatus having at least one device key in association with an n-ary tree (n being an integer no less than 2), and assigning one or more of the device keys to each user apparatus, each user apparatus encrypting or decrypting based on the assigned device key, the key management apparatus including: a device key storage unit operable to store the at least one device key in one-to-one correspondence with at least one node in the n-ary tree, a plurality of the nodes on at least one path from a root to a leaf having been revoked; a key information generation unit operable to encrypt a media key respectively using a plurality of common device keys to generate a plurality of encrypted media keys, each common device key being one of the at least one device keys that is in correspondence with a valid node and that is commonly assigned to at least one user apparatus, and write the generated plurality of encrypted media keys to the recording medium in an order relating to a structure of the n-ary tree; and a revocation information generation unit operable to generate a piece of revocation information for each revoked node, excluding the leaves, showing whether each of n directly subordinate nodes of the revoked node is respectively revoked or not, to obtain a plurality of pieces of revocation information, and write the obtained pieces of revocation information to the recording medium in the order, and each of the user apparatuses including: a specification unit operable to specify one encrypted media key using the plurality of pieces of revocation information, from amongst the plurality of encrypted media keys that has been encrypted based on one of the device keys assigned to the user apparatus; a decryption unit operable to generate a media key by decrypting the specified encrypted media key based on the device key assigned to the user apparatus; and an encryption/decryption unit operable to perform at least one of (a) encrypting content based on the generated media key and writing the encrypted content to the recording medium, and (b) decrypting, based on the obtained media key, encrypted content read from the recording medium to generate content.

According to the stated construction, the key management apparatus writes the plurality of encrypted keys and the plurality of pieces of revocation information to the recording medium following the order, and the user apparatus specifies, with use of the plurality of pieces of revocation information written in the order, the encrypted media key from amongst the plurality of encrypted media keys written in the order. Therefore, the user apparatus is able to efficiently determine the encrypted media key assigned to the user apparatus.

Furthermore, the present invention is a key management apparatus having at least one device key in association with an n-ary tree (n being an integer no less than 2), and assigning one or more of the device keys to at least one user apparatus, including: a device key storage unit operable to store the at least one device key in one-to-one correspondence with at least one node in the n-ary tree, a plurality of the nodes on at least one path from a root to a leaf having been revoked; a key information generation unit operable to encrypt a media key respectively using a plurality of common device keys to generate a plurality of encrypted media keys, each common device key being one of the at least one device keys that is in correspondence with a valid node and that is commonly assigned to at least one user apparatus, and write the generated plurality of encrypted media keys to the recording medium in an order relating to a structure of the n-ary tree; and a revocation information generation unit operable to generate a piece of revocation information for each revoked node, excluding the leaves, showing whether each of n directly subordinate nodes of the revoked node is respectively revoked or not, to obtain a plurality of pieces of revocation information, and write the obtained pieces of revocation information to the recording medium in the order. Furthermore, the present invention is a user apparatus that is assigned one or more device keys by a key management apparatus that has at least one device key in association with an n-ary tree (n being a integer equal to or greater than 2), and encrypts or decrypts based on the assigned device key, wherein the key management apparatus (a) stores the at least one device key in one-to-one correspondence with at least one node in the n-ary tree, a plurality of the nodes on at least one path from a root to a leaf having been revoked, (b) encrypts a media key respectively using a plurality of common device keys to generate a plurality of encrypted media keys, each common device key being one of the at least one device keys that is in correspondence with a valid node and that is commonly assigned to at least one user apparatus, and writes the generated plurality of encrypted media keys to the recording medium in an order relating to the structure of the n-ary tree, and (c) generates a piece of revocation information for each revoked node excluding the leaves showing whether each of n directly subordinate nodes of the revoked node is respectively revoked or not, to obtain a plurality of pieces of revocation information, and writes the obtained pieces of revocation information to the recording medium in the order, the user apparatus including: a specification unit operable to specify one encrypted media key using the plurality of pieces of revocation information, from amongst the plurality of encrypted media keys that has been encrypted based on one of the device keys assigned to the user apparatus; a decryption unit operable to generate the media key by decrypting the specified encrypted media key based on the device key assigned to the user apparatus; and an encryption/decryption unit operable to perform at least one of (d) encrypting content based on the generated media key and writing the encrypted content to the recording medium, and (e) decrypting, based on the obtained media key, encrypted content read from the recording medium to generate content.

According to the stated construction, the key management apparatus writes the plurality of encrypted keys and the plurality of pieces of revocation information to the recording medium following the order, and the user apparatus specifies, with use of the plurality of pieces of revocation information written in the order, the encrypted media key from amongst the plurality of encrypted media keys written in the order. Therefore, the user apparatus is able to efficiently determine the encrypted media key assigned to the user apparatus.

Here, in the key management apparatus, the n-ary tree may be composed of a plurality of layers, the order in which key information generation unit writes the plurality of encrypted media keys to the recording medium may be an order of the layers from a root-side layer to a leaf-side layer, the root being a starting point, and the revocation information generation unit may write the pieces of revocation information to the recording medium in the order. In the user apparatus, the n-ary tree may be composed of a plurality of layers, the order in which the plurality of encrypted media keys are written to the recording medium may be an order of the layers from a root-side layer to a leaf-side layer, the root being a starting point, the pieces of revocation information may be written to the recording medium in the order, and the specification unit may specify the encrypted media key from amongst the plurality of encrypted media keys written in the order, with use of the plurality of pieces of revocation information written in the order.

According to the stated construction, the order is an order of layers from the root side to the leaf side, with the root as the starting point. Therefore, both the key management apparatus and the user apparatus can determine the order reliably.

Here, the order in which the key information generation unit writes the plurality of encrypted media keys to the recording medium may be an order in which the nodes are positioned on the paths from the root to the leaves, the root being a starting point and each node being included only once in the order, and the revocation information generation unit may write the pieces of revocation information to the recording medium in the order. In the user apparatus, the n-ary tree may be composed of a plurality of layers, the order in which the plurality of encrypted media keys are written to the recording medium may be an order in which the nodes are positioned on the paths from the root to the leaves, the root being a starting point, and each node being included only once in the order, the pieces of revocation information may be written to the recording medium in the order, and the specification unit may specify the encrypted media key from amongst the plurality of encrypted media keys written in the order, with use of the plurality of pieces of revocation information written in the order.

According to the stated construction, the order is an order of the nodes on the paths from the root to the leaves, with the root as the starting point and without any node being included in duplicate in the order. Therefore, the key management apparatus and the user apparatus can determine the order reliably.

Here, in the key management apparatus, the revocation information generation unit may generate a piece of revocation information for each revoked node excluding the leaves. In the user apparatus, a piece of revocation information may be generated and written to the recording medium for each revoked node excluding leaves, and the specification unit may specify the encrypted media key with use of the pieces of revocation information.

According to the stated construction, revocation information is generated about all revoked nodes, therefore the key management apparatus and the user apparatus can determine the revoked nodes reliably.

Here, in the key management apparatus, the revocation information generation unit may generate a piece of special revocation information for each revoked node, excluding the leaves, whose subordinate nodes are all revoked, showing that the subordinate nodes are all revoked, suppress generation of revocation information for the revoked subordinate nodes, and generate a piece of revocation information for each revoked node, excluding the leaves, whose n subordinate nodes are not all revoked, showing whether each of n subordinate nodes of the revoked node is respectively revoked or not. In the user apparatus, a piece of special revocation information may be generated for each revoked node, excluding the leaves, whose subordinate nodes are all revoked, showing that the subordinate nodes are all revoked, generation of revocation information for the revoked subordinate nodes may be suppressed, a piece of revocation information may be generated for each revoked node, excluding the leaves, whose n subordinate nodes are not all revoked, showing whether each of n subordinate nodes of the revoked node is respectively revoked or not, and the specification unit may specify the encrypted media key with use of the pieces of special revocation information and the pieces of revocation information.

According to the stated construction, special revocation information is generated showing that all the subordinate nodes of a node are revoked, therefore space can be saved on the recording medium when there are many nodes whose subordinate nodes are all revoked.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 is an example of the data structure of a tree structure table D100;

FIG. 8 is a block diagram showing the structure of a recording medium apparatus 300a;

FIG. 9 is a block diagram showing the structure of a reproduction apparatus 400a;

FIG. 20 shows an example of the data structure of a tree structure table D400;

FIG. 21 shows an example of the data structure of header information D500;

FIG. 37 shows an example of the data structure of a tree structure table D1000;

DESCRIPTION OF THE PREFERRED EMBODIMENTS

1. First Embodiment

The following describes a digital work protection system 10 as a first embodiment of the present invention.

1.1 Structure of the Digital Work Protection System 10

Figure 1:
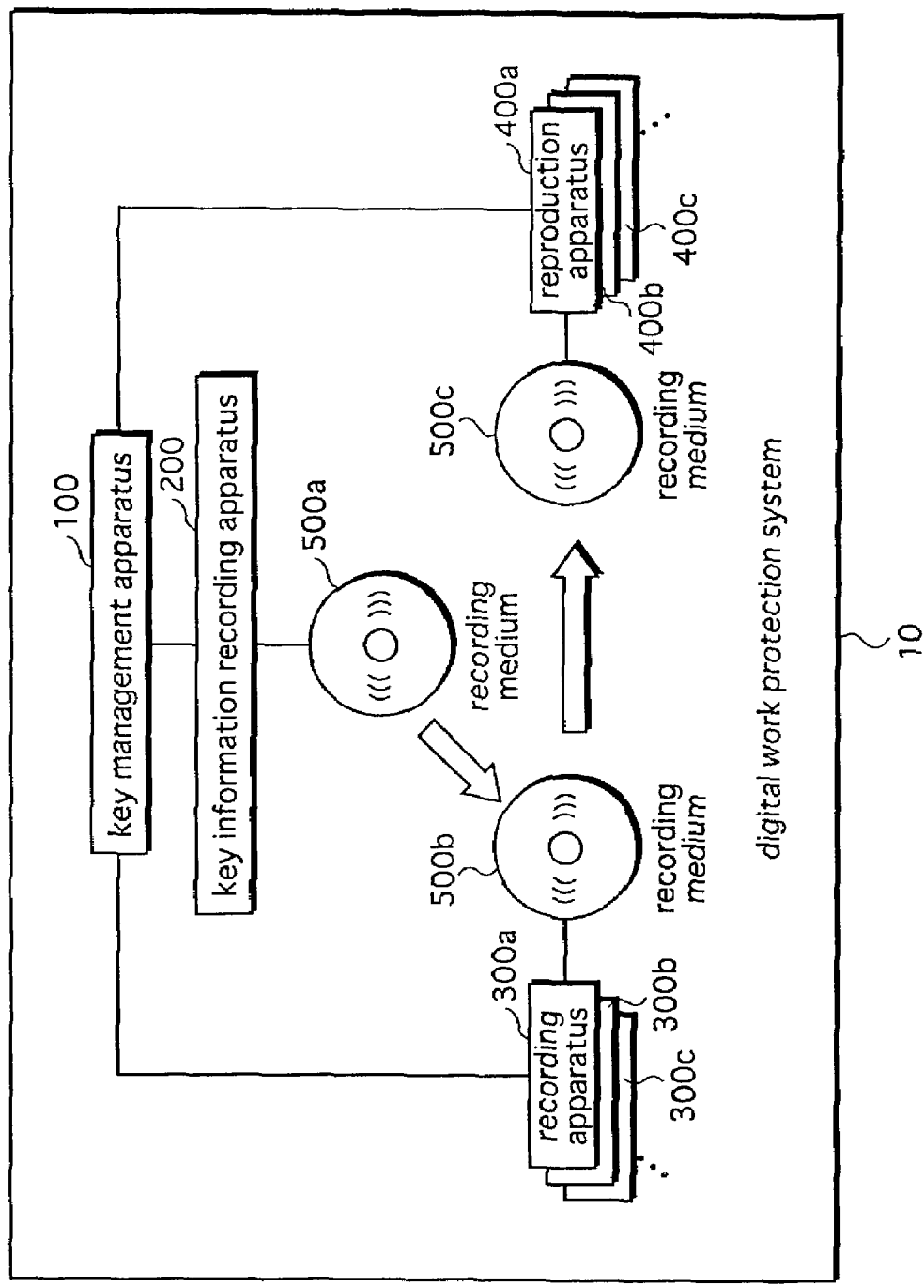
FIG. 1 is a block diagram of the structure of a digital work protection system 10.

The digital work protection system 10, as shown in FIG. 1, is composed of a key management apparatus 100, a key information recording apparatus 200, recording apparatuses 300a, 300b, 300c, . . . (hereinafter referred to as "recording apparatuses 300a etc."), and reproduction apparatuses 400a, 400b, 400c, . . . (hereinafter referred to as "reproduction apparatuses 400a etc.").

The key management apparatus 100 has key information pre-recorded onto a recording medium 500a by the key information recording apparatus 200, resulting in a recording medium 500b on which the key information has been recorded being generated in advance. Note that the recording medium 500a is a recordable medium such as a DVD-RAM (Digital Versatile Disk Random Access Memory), onto which no information has been recorded. Furthermore, the key management apparatus 100 assigns device keys for decrypting key information respectively to each recording apparatus 300a etc. and each reproduction apparatus 400a etc., and distributes in advance the assigned device keys, device key identification information that identifies the device keys, and ID information that identifies the particular recording apparatus or reproduction apparatus, to each of the recording apparatuses 300a etc. and reproduction apparatuses 400a etc.

The recording apparatus 300a encrypts digitized content to generate encrypted content, and records the generated encrypted content on the recording medium 500b, resulting in a recording medium 500c being generated. The reproduction apparatus 400a reads the encrypted content from the recording medium 500c, and decrypts the read encrypted content to obtain the original content. The recording apparatuses 300b etc. operate in an identical manner to the recording apparatus 300a, and the reproduction apparatuses 400b etc. operate in an identical manner to the reproduction apparatus 400a.

Note that hereinafter "user apparatus" is used to refer to the recording apparatuses 300b etc. and the reproduction apparatuses 400b etc.

1.1.1 Key Management Apparatus 100

Figure 2:
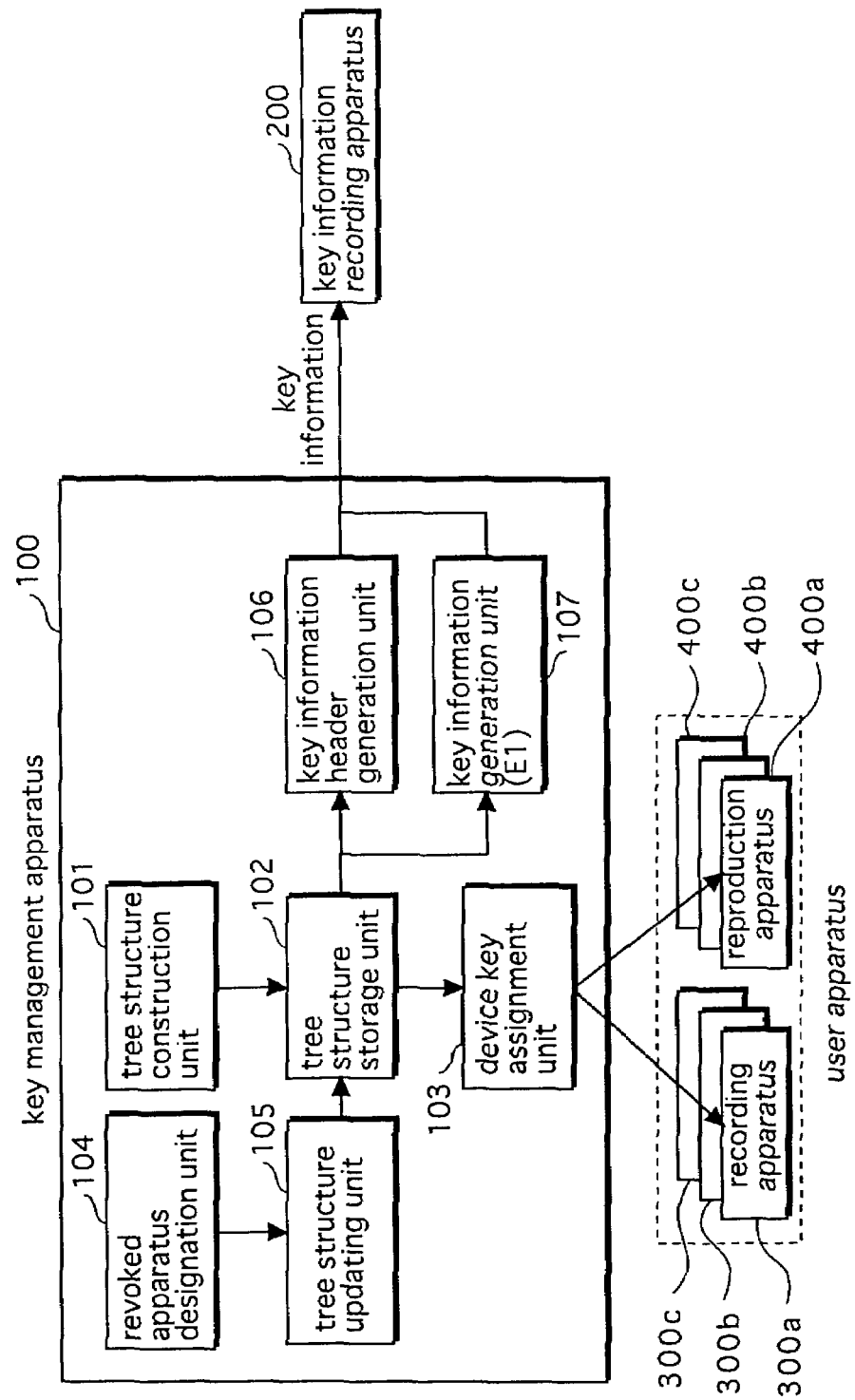
FIG. 2 is a block diagram of the structure of a key management apparatus 100.

The key management apparatus 100, as shown in FIG. 2, is composed of a tree structure construction unit 101, a tree structure storage unit 102, a device key assignment unit 103, a revoked apparatus designation unit 104, a key structure updating unit 105, a key information header generation unit 106, and a key information generation unit 107.

Specifically, the key management apparatus 100 is a computer system that includes a microprocessor, a ROM (Read Only Memory), a RAM (Random Access Memory), a hard disk unit, a display unit, a keyboard, and a mouse. Computer programs are stored in the RAM or the hard disk unit. The key management apparatus 100 achieves its functions by the microprocessor operating in accordance with the computer programs.

(1) Tree Structure Storage Unit 102

Specifically, the tree structure storage unit 102 is composed of a hard disk unit, and, as shown in FIG. 3, has a tree structure table D100.

Figure 4:
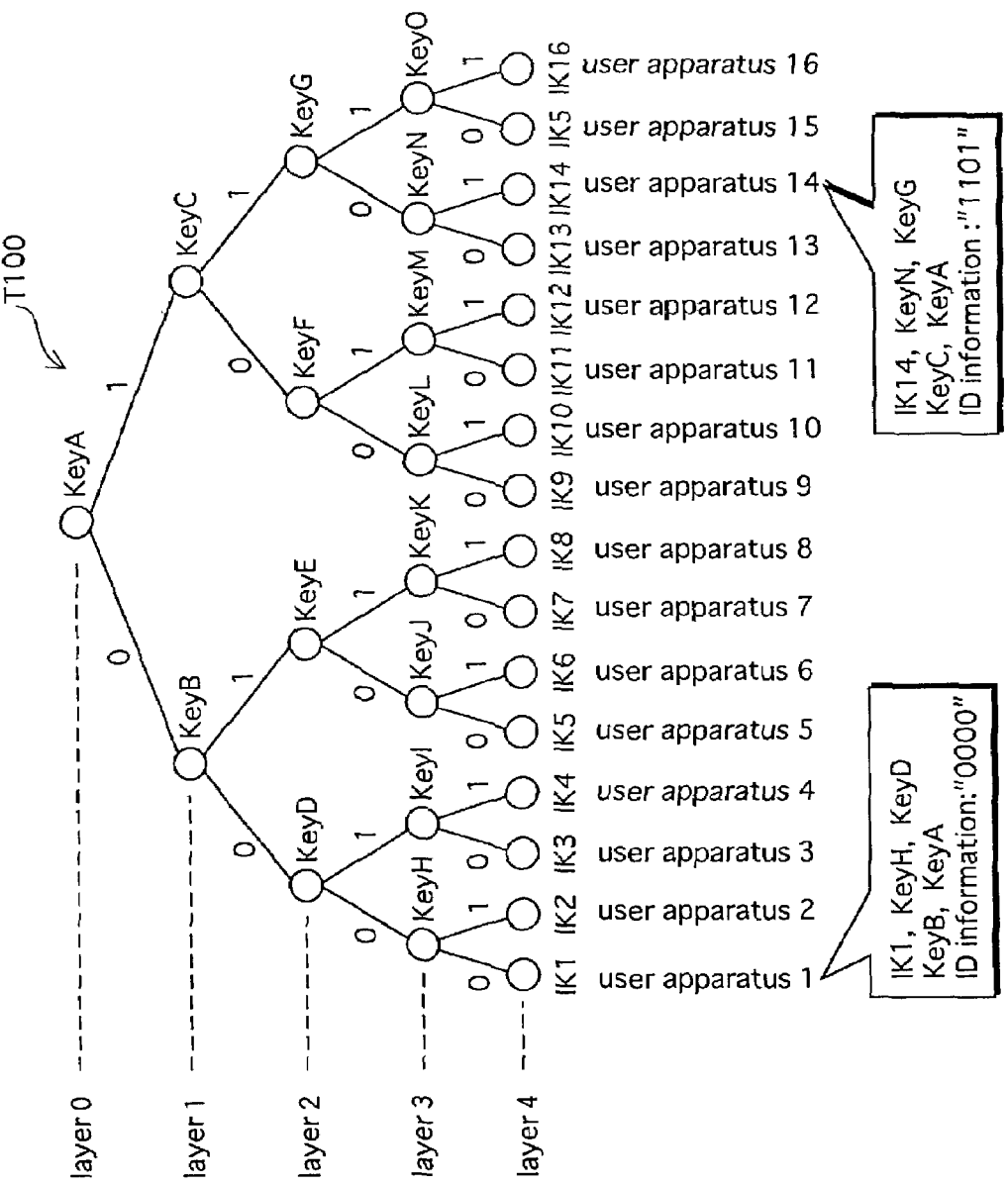
FIG. 4 is a conceptual diagram of a tree structure T100.

The tree structure table D100 corresponds to a tree structure T100 shown in FIG. 4 as one example of a tree structure, and shows a data structure for expressing the tree structure T100. As is described later, the data structure for expressing the tree structure T100 is generated by the tree structure construction unit 101 as the tree structure table D100, and stored in the tree structure storage unit 102.

<Tree Structure T100>

The tree structure T100, as shown in FIG. 4, is a binary tree that has five layers: layer 0 through to layer 4. Since the tree structure T100 is a binary tree, each node (excluding leaves) in the tree structure T100 is connected to two nodes on the lower side of the node via two paths. One node, which is the root, is included in layer 0, two nodes are included in layer 1, four nodes are included in layer 2, eight nodes are included in layer 3, and 16 nodes, which are leaves, are included in layer 4. Note that "lower side" refers to the leaf side of the tree structure, while "upper side" refers to the root side of the tree structure.

Each of the two paths that connect a node (excluding leaves) in the tree structure T100 with its directly subordinate node is assigned a number, the left path being assigned "0" and the right path being assigned "1". Here, in FIG. 4 a path that branches downwards to the left of a node to connect left nodes is called a left path. A path that branches downwards to the right of a node to connect right nodes is called a right path.

A node name is assigned to each node. The name of the root node is "root". Each of the nodes in the layers from layer 1 downwards is given a character string as a node name. The number of characters in the character string is equal to the number of the layer, and is generated by arranging the numbers assigned to each node on the same path as the node from the root through to the node in this order. For example, the node names of the two nodes in layer 1 are "0" and "1" respectively. The node names of the four nodes in layer 2 are "00", "01", "10", and "11" respectively. The node names of the eight nodes in layer 3 are "000", "001", "010", "011", . . . , "101", "110" and "111" respectively. The node names of the eight nodes on layer 4 are "0000", "0001", "0010", "0011", . . . , "1100", "1101", "1110", and "1111" respectively.

<Tree Structure Table D100>

The tree structure table D100 includes pieces of node information equal in number to the nodes in the tree structure T100. Each piece of node information corresponds to one of the nodes in the tree structure T100.

Each piece of node information includes a device key and a revocation flag.

Each node name identifies the node to which a particular piece of node information corresponds.

Each device key is assigned to a node that corresponds to a piece of node information.

In addition, each revocation flag shows whether the device key corresponding to the piece of node information had been revoked or not. A revocation flag set to "0" shows that a device key is not revoked, while a revocation flag set to "1" shows that a device key is revoked.

Each piece of node information is stored in the tree structure table D100 in an order shown by the following Order Rule 1. The Order Rule 1 is also applied when the recording apparatuses 300a etc. and the reproduction apparatuses 400a etc. read node information sequentially from the tree structure table D100.

(a) Node information corresponding to the nodes in each layer is stored in the tree structure table D110 in ascending order of the layer numbers in the tree structure T100. Specifically, first one piece of node information corresponding to the one root in layer 0 is stored, then two pieces of node information corresponding to the two nodes in layer 1, followed by four pieces of node information corresponding to the four nodes in layer 2, and so on in the same manner.

(b) Within each layer, the pieces of node information corresponding to each node in the layer are stored in ascending order of node name.

Specifically, the pieces of node information are stored in the following order in the tree structure table D100 shown in FIG. 3:

"root", "0", "1", "00", "01", "10", "11", "000", "001", "010", "011", . . . , "101", "110", "111", "0000", "0001", "0010", "0011", . . . , "1100", "1101", "1110", "1111".

Here, the order in which the pieces of node information are stored is shown by the node name included in each piece of node information.

(2) Tree Structure Construction Unit 101

The tree structure construction unit 101, as described below, constructs an n-ary data structure for managing device keys, and stores the constructed tree structure in the tree structure storage unit 102. Here, n is an integer equal to or greater than 2. As an example, n=2.

The tree structure construction unit 101 first generates a piece of node information with "root" as the node name, and writes the generated piece of node information to the tree structure table in the tree structure storage unit 102.

Next, tree structure construction unit 101 generates node names "0" and "1" that identify the two nodes in layer 1, generates two pieces of node information that respectively include the generated node names "0" and "1", and writes the two generated pieces of node information in the stated order to the tree structure table in the tree structure storage unit 102.

Next, the tree structure construction unit 101 generates four node names "00", "01", "10" and "11" that identify the four nodes in layer 2, generates four pieces of node information that respectively include "00", "01", "10" and "11", and adds the four generated pieces of node information to the tree structure table in the stated order.

After this, the tree structure construction unit 101 generates node information for layer 3 and layer 4 in the stated order, and writes the generated node information to the tree structure table, in the same manner as described above.

Next, the tree structure construction unit 101 generates a device key with use of a random number, for each node in the tree structure, and writes the generated device keys to the tree structure in correspondence with the respective nodes.

(3) Device Key Assignment Unit 103

The device key assignment unit 103, as described below, selects a device key in correspondence with a leaf to which a user apparatus is not yet assigned and a user apparatus to which a device key is to be assigned, and outputs the selected device key to the user apparatus.

The device key assignment unit 103 has a variable ID that is four bits in length.

The device key assignment unit 103 performs below-described processing (a) to (f) sixteen times. Each time, the variable ID has one of the values "0000", "0001", "0010", . . . , "1110", and "1111". By performing the processing sixteen times, the device key assignment unit 103 assigns ID information and five device keys to each of the 16 user apparatuses.

(a) The device key assignment unit 103 obtains the piece of node information that includes the node name "root", from the tree structure table in the tree structure storage unit 102, and extracts the device key from the obtained node information. The extracted device key is the device key assigned to the root.

(b) The device key assignment unit 103 obtains the piece of node information that includes the node name that is the head bit of the variable ID, from the tree structure table in the tree structure storage unit 102, and extracts the device key from the obtained node information. Hereinafter, this device key is called device key A.

(c) The device key assignment unit 103 obtains the piece of node information that includes the node name that is the head two bits of the variable ID, from the tree structure table in the tree structure storage unit 102, and extracts the device key from the obtained node information. Hereinafter, this device key is called device key B.

(d) The device key assignment unit 103 obtains the piece of node information that includes the node name that is the head three bits of the variable ID, from the tree structure table in the tree structure storage unit 102, and extracts the device key from the obtained node information. Hereinafter, this device key is called device key C.

(e) The device key assignment unit 103 obtains the piece of node information that includes the node name that is the four bits of the variable ID, from the tree structure table in the tree structure storage unit 102, and extracts the device key from the obtained node information. Hereinafter, this device key is called device key D.

(f) The device key assignment unit 103 writes ID information, the device key assigned to the root, the device keys A, B, C, and D assigned to each node, and five pieces of device key identification information, to a key information storage unit in the user apparatus. Note that the ID information is the variable ID, and that the five pieces of device key of identification information respectively identify the five device keys.

Figure 8:
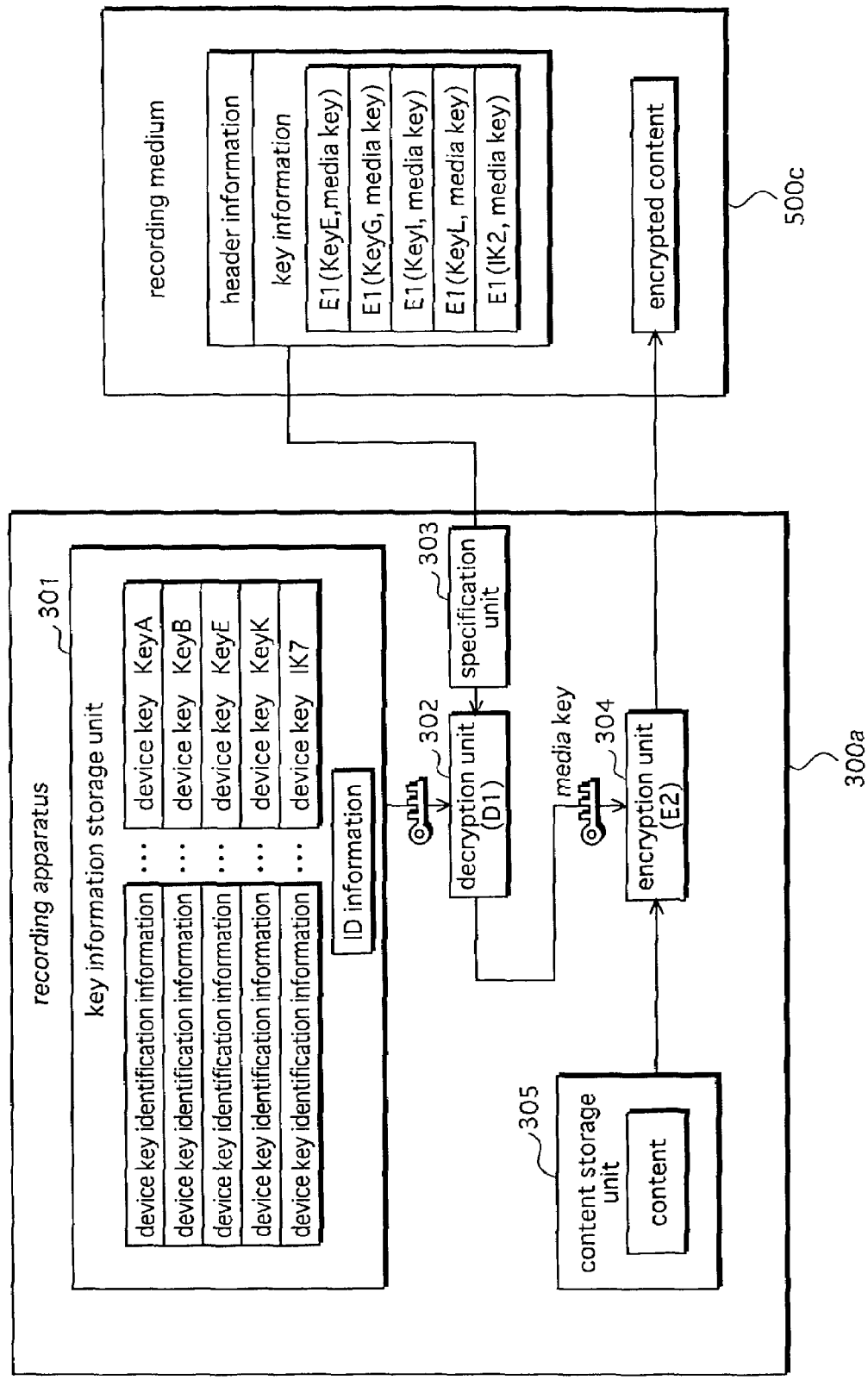

In this way, the key information storage unit in each user apparatus stores ID information, five pieces of device key identification information and five device keys, as shown in one example in FIG. 8. Here, the five pieces of device key identification information and the five device keys are stored in correspondence. Each piece of device key identification information is the number of the layer (layer number) to which the corresponding device key is assigned.

In this way, ID information and five device keys are assigned to each of the sixteen user apparatuses.

As one example, the tree structure T100 shown in FIG. 4 is, as described above, a binary tree with five layers, and includes sixteen leaves. Here, it is assumed that there are sixteen user apparatuses, each of which corresponds to one of the leaves. Each user apparatus is provided with the device keys assigned to the nodes on the path from the corresponding leaf through to the root. For example, a user apparatus 1 is provided with five device keys IK1, KeyH, KeyD, KeyB, and KeyA. The user apparatus 1 is further provided, for example, with ID information "0000", and the user apparatus 14 provided with ID information "1101".

(4) Revoked Apparatus Designation Unit 104

The revoked apparatus designation unit 104 receives at least one piece of ID information that identifies at least one user apparatus that is to be revoked, from the manager of the key management apparatus 100, and outputs the received ID information to the key structure updating unit 105.

(5) Key Structure Updating Unit 105

The key structure updating unit 105 receives the at least one piece of ID information from the revoked apparatus designation unit 104, and on receiving the ID information, performs the following processing (a) to (d) for each of the at least one pieces of ID information.

(a) The key structure updating unit 105 obtains the piece of node information that includes the received ID information as the node name, from the tree structure table in the tree structure storage unit 102, attaches a revocation flag "1" to the obtained node information, and writes the node information to which the revocation flag "1" has been attached to the position in the tree structure table where the obtained node information is stored, thus overwriting the original piece of node information with the node information to which the revocation flag has been attached.

(b) The key structure updating unit 105 obtains the piece of node information that includes as the node name the head three bits of the received ID information, from the tree structure table in the tree structure storage unit 102, attaches a revocation flag "1" to the obtained piece of node information, and overwrites the original piece of node information in the tree structure table, in the same manner as described above.

(c) The key structure updating unit 105 obtains the piece of node information that includes as the node name the head two bits of the received ID information, from the tree structure table in the tree structure storage unit 102, attaches a revocation flag "1" to the obtained piece of node information, and overwrites the original piece of node information in the tree structure table, in the same manner as described above.

(d) The key structure updating unit 105 obtains the piece of node information that includes "root" as the node name, from the tree structure table in the tree structure storage unit 102, attaches a revocation flag "1" to the obtained piece of node information, and overwrites the original piece of node information in the tree structure table, in the same manner as described above.

As has been described, the key structure updating unit 105 revokes, based on the ID information received from the revoked apparatus designation unit 104, all nodes on the path from the leaf shown by the received information through to the root in the tree structure.

Figure 5:
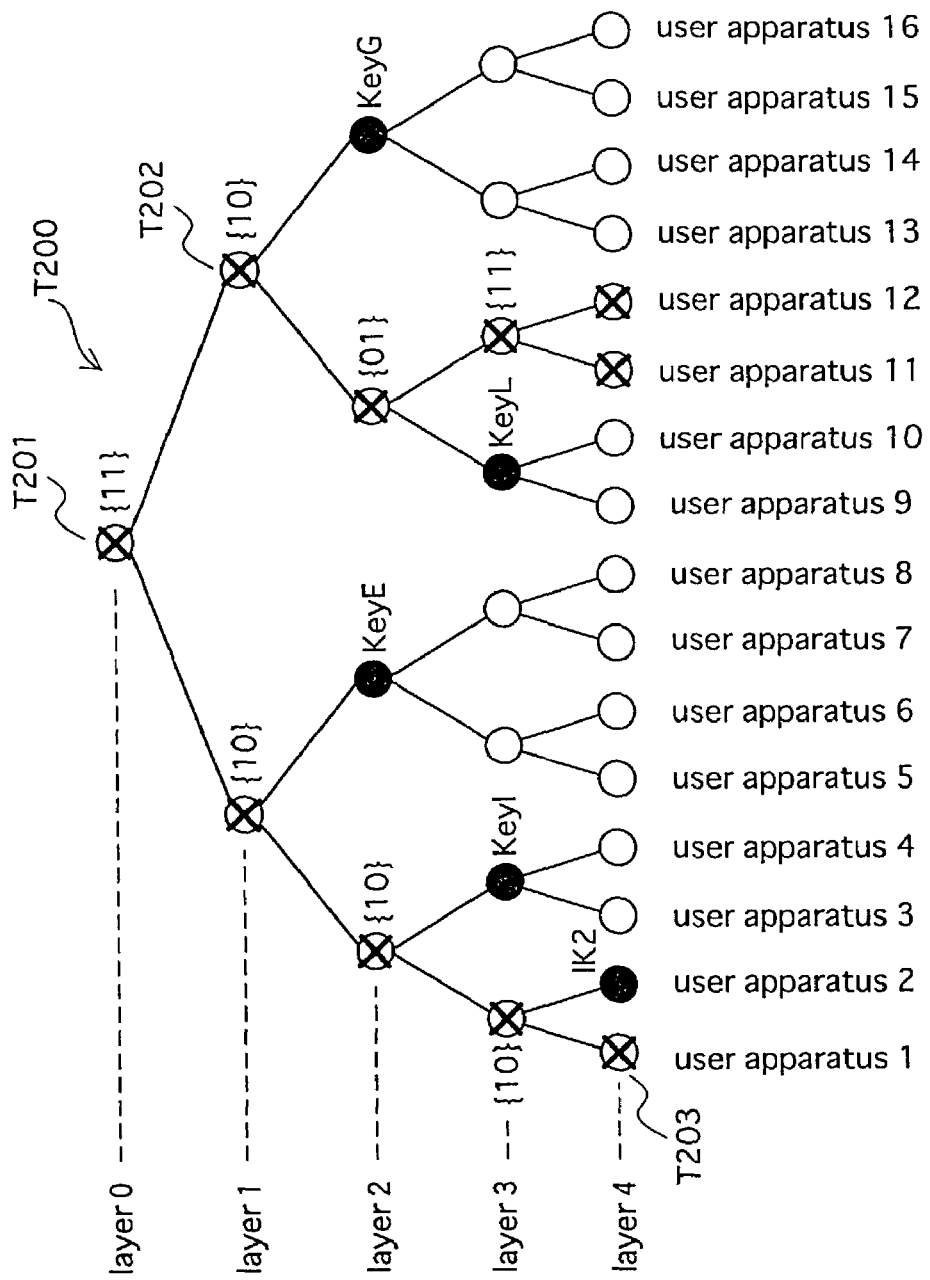
FIG. 5 is a conceptual diagram of a tree structure T200 that includes revoked nodes.

Assuming that user apparatuses shown by ID information "0000", "1010", and "1011" in the tree structure T100 showing FIG. 4 are to be revoked, the resulting tree structure T200 in which nodes have been revoked in the above-described manner is that shown in FIG. 5.

Furthermore, the tree structure table D100 has revocation flags that correspond to the tree structure T200.

In the tree structure T200, all nodes on the path to the root from the leaf corresponding to the user apparatus 1 shown by the ID information "0000", all nodes on the path to the root from the leaf corresponding to the user apparatus 11 shown by the ID information "1010", and all nodes on the path to the root from the leaf corresponding to the user apparatus 12 shown by the ID information "1011" are marked with a cross (X). Each cross shows a revoked node.

Each piece of node information in the tree structure table D100 that corresponds to one of the revoked nodes has a revocation flag attached.

(6) Key Information Header Generation Unit 106

The key information header generation unit 106 has a variable i that shows a number of a layer, and a variable j that shows the node name in the layer.

The key information header generation unit 106 performs processing (a) described below, for each layer in the tree structure. Each time the key information header generation unit 106 performs the processing, the variable i that shows the layer number has a value "0", "1", "2", or "3".

(a) The key information header generation unit 106 performs processing (a-1) to (a-3) for each node in the layer whose layer number is shown by the variable i. Here, the name of the node that is the target of processing (a-1) to (a-3) is shown by the variable j.

(a-1) The key information header generation unit 106 obtains from the tree structure table in the tree structure storage unit 102 the piece of node information that includes a node name that is obtained by joining the variable j and "0", and the piece of node information that includes a node name that is obtained by joining the variable j and "1".

The two pieces of node information obtained in this way correspond to the two nodes that are directly subordinate to (i.e., connected to and are directly below) the target node shown by the variable j.

(a-2) The key information header generation unit 106 checks whether the revocation flag included in each of the two obtained pieces of node information is "0". If both are not "0", the key information header generation unit 106 generates a node revocation pattern (hereinafter "NRP") by arranging the two revocation flags respectively included in the two obtained pieces of node information, in the order that the two pieces of node information are stored in the tree structure table.

Specifically, when the revocation flags in the two obtained pieces of node information are "0" and "0" respectively, the key information header generation unit 106 does not generate an NRP.

Furthermore, when the revocation flags in the two obtained pieces of node information are "1" and "0" respectively, the key information header generation unit 106 generates an NRP {10}.

When the when the revocation flags in the two obtained pieces of node information are "0" and "1" respectively, the key information header generation unit 106 generates an NRP {01}.

When the when the revocation flags in the two obtained pieces of node information are "1" and "1" respectively, the key information header generation unit 106 generates an NRP {11}.

(a-3) The key information header generation unit 106 outputs the generated NRP to the key information recording apparatus 200.

In the manner described, the key information header generation unit 106 checks for each node in the layer whether the two directly subordinate nodes of the target node are revoked or not, and when either or both of the two lower nodes is revoked, generates a revocation pattern as described above. In the tree structure T200 shown in FIG. 5, each generated NRP is shown near the corresponding node that is marked with a cross.

Figure 6:
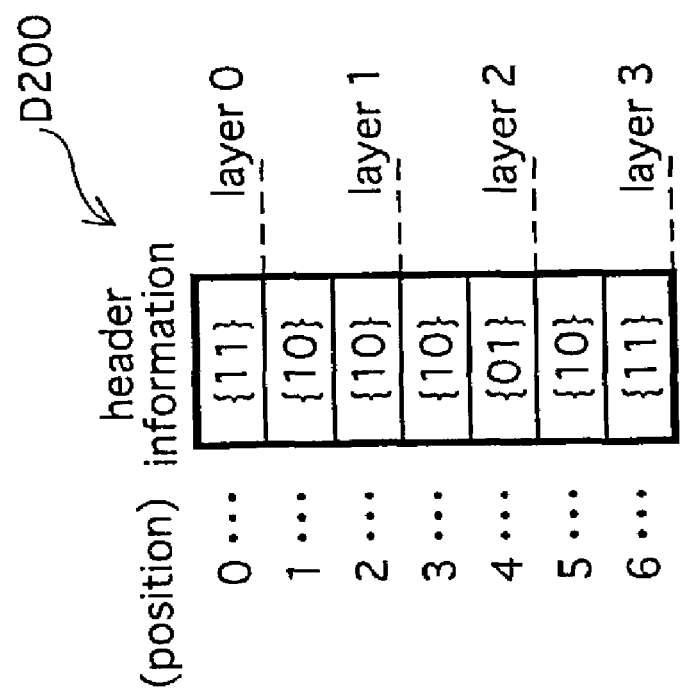
FIG. 6 is a data structure diagram showing an example of node revocation patterns.

Furthermore, since the key information header generation unit 106 outputs NRPs in the above-described processing, in the case shown in FIG. 5, a plurality of NRPs shown as one example in FIG. 6 are generated and output. The key information header generation unit 106 outputs these NRPs as header information.

In the tree structure T200 shown in FIG. 5, the user apparatus 1, the user apparatus 11 and the user apparatus 12 are revoked. Here, nodes that are on a path from the leaf corresponding to each user apparatus to be revoked through to the root (in other words, the nodes marked with a cross in FIG. 5) are called revoked nodes. Furthermore, an NRP is made by combining in order from left to right the state of the two child nodes of a node. Here, "1" is used to express a revoked child node, while "0" is used to express a child node that is not revoked. For an n-ary tree, each revocation pattern is information that is n bits in length. Both the child nodes of a root T201 in the tree structure T200 are revoked, therefore the revocation pattern of the root T201 is expressed {111}. The revocation pattern of a node T202 is expressed {10}. A node T203 is a revoked node, but since it is a leaf and therefore does not have any child nodes, it does not have a revocation pattern.

As shown in FIG. 6 as one example, header information D200 is composed of NRPs {11}, {10}, {10}, {10}, {01}, {10}, and {11}, which are included in the header information D200 the stated order.

Note that the positions in the header information D200 in which the node information patterns are arranged are set. The positions are set according to the above-described repeated processing. As shown in FIG. 6, the NRPs {11}, {10}, {10}, {10}, {01}, {10}, and {11} are arranged respectively in positions defined by "0", "1", 37 2, "3", "4", "5", and "6".

As has been described, the key information header generation unit 106 extracts the NRP of at least one revoked node, and outputs the extracted at least one NRP as header information of the key information, to the key information recording apparatus 200. Here, the key information header generation unit 106 arranges in level order. In other words, the key information header generation unit 106 arranges the plurality of NRPs in order from the top layer through to the bottom layer, and arranges NRPs of the same layer in order from left to right. Note it is sufficient for the NRPs to be arranged based on some kind of rule. For example, NRPs in the same layer may be arranged from right to left.

(7) Key Information Generation Unit 107

The key information generation unit 107 has a variable i that shows the layer number, and a variable j that shows the node name in the layer, the same as the key information header generation unit 106.

The key information generation unit 107 performs the following processing (a) for each layer excluding the layer 0. In performing the processing (a) for each layer, the variable i showing the layer number holds a value "1", "2", or "3".

(a) The key information generation unit 107 performs processing (a-1) to (a-3) for each node in the layer whose layer number is shown by the variable i. Here, the name of the node that is the target of processing (a-1) to (a-3) is shown by the variable j.

(a-1) The key information generation unit 107 obtains the piece of node information that includes the variable j as the node name, from the tree structure table in the tree structure storage unit 102, and judges whether the revocation flag in the obtained node information is "1" or "0".

(a-2) When the revocation flag is "0", the key information generation unit 107 further judges whether encryption has been performed using the device key that corresponds to the node connected directly above the target node.

(a-3) When the encryption has not been performed using the device key that corresponds to the node connected directly above the target node, the key information generation unit 107 extracts the device key from the obtained piece of node information, and encrypts the generated media key with use of the extracted device key, by applying an encryption algorithm E1, to generate an encrypted media key.

Encrypted media key=E1(device key, media key)

Here, E (A, B) shows that data B is encrypted with use of a key A by applying the encryption algorithm E.

One example of the encryption algorithm E1 is DES (Data Encryption Standard).

Next, the key information generation unit 107 outputs the generated encrypted media key to the key information recording apparatus 200.

Note that when the revocation flag is "1", or when encryption has been performed, the key information generation unit 107 does not perform the processing (a-3).

Figure 7:
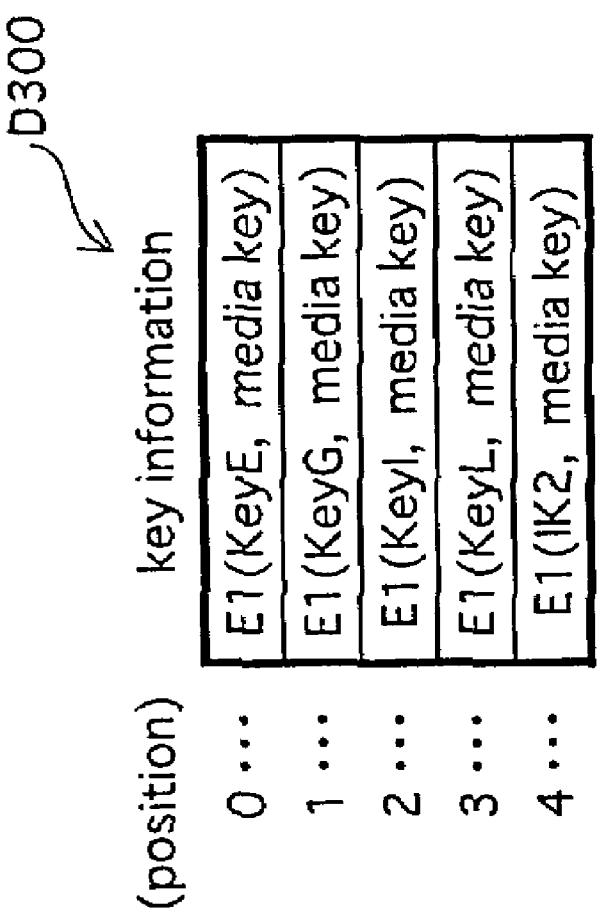
FIG. 7 is a data structure diagram showing an example of key information that includes a plurality of encrypted media keys.

Since the key information generation unit 107 performs the above-described processing repeatedly as described, in the case shown in FIG. 5, a plurality of encrypted media keys such as those shown in an example in FIG. 7 are generated and output. The key information generation unit 107 outputs the plurality of encrypted media keys as key information D300.

Note that the positions in which the media keys are stored in the key information D300 are set. These positions are set according to the above-described processing. As shown in FIG. 7, encrypted media keys E1 (keyE, media key), E1 (keyG, media key), E1 (keyI, media key), E1 (keyL, media key) and E1 (IK2, media key) a restored respectively in positions defined by "0", "1", "2", "3" and "4".

1.1.2 Key Information Recording Apparatus 200

The key information recording apparatus 200 receives header information from the key information header generation unit 106, receives key information from the key information generation unit 107, and writes the received header information and key information to the recording medium 500a.

1.1.3 Recording Mediums 500a, b, and c

The recording medium 500a is a recordable medium such as a DVD-RAM, and stores no information of any kind.

The recording medium 500b is the recording medium 500a to which key information that has header information attached thereto has been written by the key management apparatus 100 and the key information recording apparatus 200 in the manner described earlier.

The recording medium 500c is the recording medium 500b to which encrypted content has been written by any of the recording apparatuses 300a etc. in the manner described earlier.

As shown in FIG. 8, key information that has header information attached thereto and encrypted content are recorded on the recording medium 500c.

1.1.4 Recording Apparatuses 300a etc.

The recording apparatus 300a, shown in FIG. 8, is composed of a key information storage unit 301, a decryption unit 302, specification unit 303, an encryption unit 304, and a content storage unit 305. Note that the recording apparatuses 300b etc. have an identical structure to the recording apparatuses 300a, and therefore descriptions thereof are omitted.

The recording apparatus 300a includes a microprocessor, a ROM, and a RAM. Computer programs are stored in the RAM. The recording apparatus 300a achieves its functions by the microprocessor operating in accordance with the computer programs.

The recording medium 500b is loaded into the recording apparatus 300a. The recording apparatus 300a analyzes header information stored on the recording medium 500b, based on the ID information stored by the recording apparatus 300a itself, to specify the positions of the encrypted media key that is to be decrypted and the device key that is to be used, and uses the specified device key to decrypt the encrypted media key and consequently obtain the media key. Next, the recording apparatus 300a encrypts digitized content with use of the obtained media key, and records the encrypted content on the recording medium 500b.

(1) Key Information Storage Unit 301

The key information storage unit 301 has an area for storing ID information, five device keys, and five pieces of device key identification for respectively identifying the five device keys.

(2) Specification Unit 303

The specification unit 303 operates under the assumption that the key information header generation unit 106 in the key management apparatus 100 has generated the header information of the key information following the Order Rule 1 described earlier.

The specification unit 303 reads the ID information from the key information storage unit 301. The specification unit 303 also reads the header information and the key information from the recording medium 500b. Next, the specification unit 303 specifies a position X of one encrypted media key in the key information, with use of the read ID information and the read header information, by checking the pieces of header information sequentially from the top, and specifies the piece of device key identification information that identifies the device key that is to be used in decrypting the encrypted media key. Note that details of the operations for specifying the position X of the encrypted media key and specifying the piece of device key identification information are described later.

Next, the specification unit 303 outputs the specified encrypted media key and the specified device identification information to the decryption unit 302.

(3) Decryption Unit 302

The decryption unit 302 receives the encrypted media key and the piece of device key identification information from the specification unit 303. On receiving the encrypted media key and the piece of device key identification information, the decryption unit 302 reads the device key identified by the received piece of device key identification information from the key information storage unit 301, and decrypts the received encrypted media key with use of the read device key by applying a decryption algorithm D1, to generate a media key.

media key=D1 (device key, encrypted media key)

Here, D(A, B) denotes decrypting encrypted data B with use of a key A by applying a decryption algorithm D, to generate the original data.

Furthermore, the decryption algorithm D1 corresponds to the encryption algorithm E1, and is an algorithm for decrypting data that has been encrypted by applying the encryption algorithm E1.

Next, the decryption unit 302 outputs the generated media key to the key information updating unit 304.

Note that each block shown in FIG. 8 is connected to the block by connection lines, but some of the connection lines are omitted. Here, each connection line represents a path via which signals and information are transferred. Furthermore, of the connection lines that connect to the block representing the decryption unit 302, the line on which a key mark is depicted represents the path via which information is transferred to the decryption unit 302 as a key. This is the same for the key information updating unit 304, and also for other blocks in other drawings.

(4) Content Storage Unit 305

The content storage unit 305 stores content that is a digital work, such as digitized music.

(5) Encryption Unit 304

The encryption unit 304 receives the media key from the decryption unit 302, and reads the content from the content storage unit 305. Next, the encryption unit 304 encrypts the read content with use of the received media key by applying an encryption algorithm E2, to generate encrypted content.

Encrypted content=E2 (media key, content)

Here, the encryption algorithm E2 is, for example, a DES encryption algorithm.

Next, the encryption unit 304 writes the generated encrypted content to the recording medium 500b. This results in the recording medium 500c to which the encrypted content has been written being generated.

1.1.5 Reproduction Apparatuses 400a, 440b, 400c . . .

Figure 9:
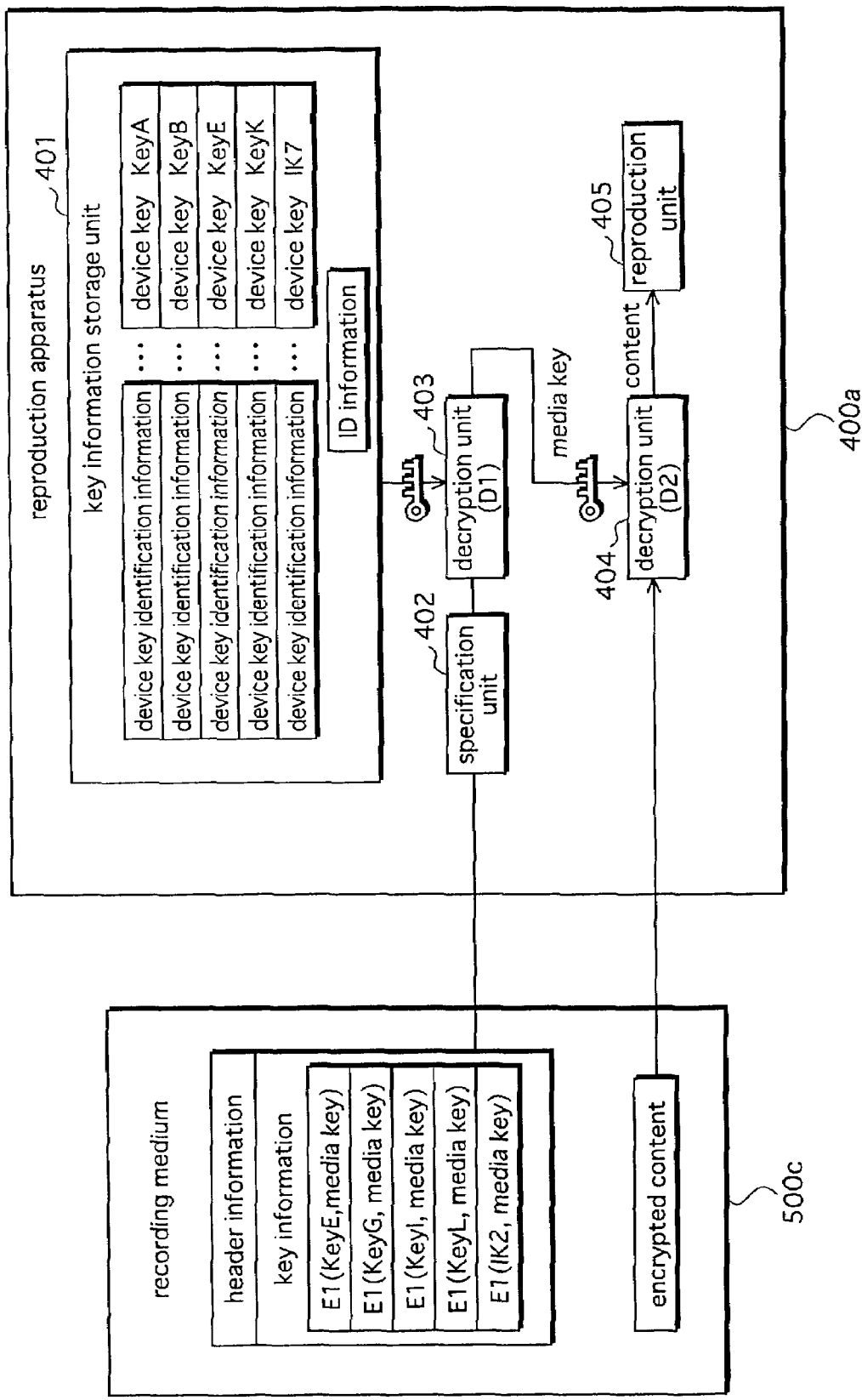

The reproduction apparatus 400a, as shown in FIG. 9, is composed of a key information storage unit 401, a specification unit 402, a decryption unit 403, a decryption unit 404 and a reproduction unit 405. Note that the reproduction apparatuses 400b etc. have the same structure as the reproduction apparatus 400a, and therefore a description thereof is omitted.

The reproduction apparatus 400a specifically includes a microprocessor, a ROM and a RAM. Computer programs are stored in the RAM. The reproduction apparatus 400a achieves its functions by the microprocessor operation according to the computer programs.

Here, the key information storage unit 401, the specification unit 402, and the decryption unit 403 have the same structures as the key information storage unit 301, specification unit 303, and the decryption unit 302 respectively, and therefore a description thereof is omitted.

The recording medium 500c is loaded into the reproduction apparatus 400a. The reproduction apparatus 400a, based on the ID information that the reproduction apparatus 400a itself stores, analyzes the header information stored in the recording medium 500c to specify the position of the encrypted media key to be decrypted and the device key to be used, and decrypts the specified encrypted media key with use of the specified device key, to obtain the media key. Next, the reproduction apparatus 400a decrypts the encrypted content stored on the recording medium 500c, with use of the obtained media key, to reproduce the content.

(1) Decryption Unit 404

The decryption unit 404 receives the media key from the decryption unit 403, reads the encrypted content from the recording medium 500c, decrypts the read encrypted content with use of the received media key, by applying a decryption algorithm D2, to generate content, and outputs the generated content to the reproduction unit 405.

Content=D2 (media key, encrypted content)

Here, the decryption algorithm D2 corresponds to the encryption algorithm E2, and is an algorithm for decrypting data that has been encrypted by applying the encryption algorithm E2.

(2) Reproduction Unit 405

The reproduction unit 405 receives the content from the decryption unit 404, and reproduces the received content. For example, when the content is music, the reproduction unit 405 converts the content to audio, and outputs the audio.

1.2 Operations of the Digital Work Protection System 10

The following describes operations of the digital work protection system 10

Figure 10:
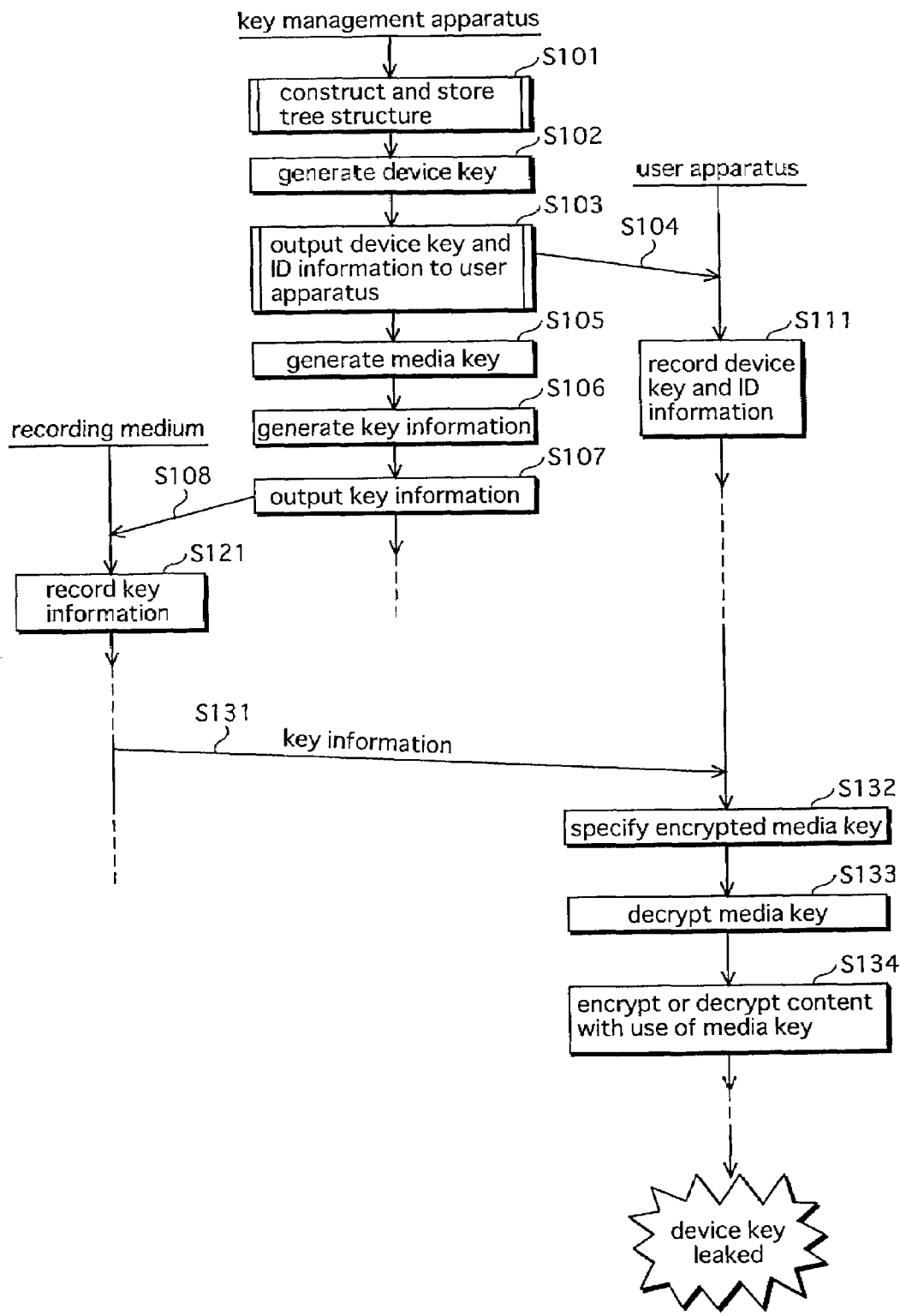
FIG. 10 is a flowchart showing operations for assigning a device key to a user apparatus, operations for generating key information and writing the key information to a recording apparatus, and operations for the user apparatus to encrypt or decrypt content; and in particular showing operations for each apparatus up to when a device key is exposed illegally by a third party.

1.2.1 Operations for Assigning Device Keys, Generating a Recording Medium, and Encrypting or Decrypting Content Here, the flowchart in FIG. 10 is used to describe operations for assigning device keys to each user apparatus, operations for generating key information and writing the key information to a recording medium, and operations by the user apparatus for encrypting or decrypting content. In particular, the operations are described for up until the device key is exposed illegally by a third party.

The tree structure construction unit 101 in the key management apparatus 100 generates a tree structure table that expresses a tree structure, and writes the generated tree structure table to the tree structure storage unit 102 (step S101). Next, the tree structure construction unit 101 generates a device key for each node of the tree structure, and writes each generated device key in correspondence with the respective node to the tree structure table (step S102). Next, the device key assignment unit 103 outputs device keys, device key information and ID information to the corresponding user apparatus (steps S103 to S104). The key information storage unit of the user apparatus receives the device keys, the device key identification information and the ID information (step S104), and records the received device keys, device key identification information and ID information (step S111).

In this way, user apparatuses in which device keys, device key identification information, and ID information are recorded are produced, and the produced user apparatuses are sold to users.

Next, the key information generation unit 107 generates a media key (step S105), generates key information (step S106), and outputs the generated key information to the recording medium 500a via the key information recording apparatus 200 (steps S107 to S108). The recording medium 500a stores the key information (step S121).

In this way, the recording medium 500b on which the key information is recorded is generated, and then distributed to the user by, for instance, being sold.

Next, the recording medium on which the key information is recorded is loaded into the user apparatus, and the user apparatus reads the key information from the recording medium (step S131), uses the read key information to specify the encrypted media key that is assigned to the user apparatus itself (step S132), and decrypts the media key (step S133). Then, the user apparatus either encrypts the content, using the decrypted media key, and writes the encrypted content to the recording medium 500b, or reads encrypted content recorded from the recording medium 500c, and decrypts the read encrypted content, using the media key, to generate content (step S134).

In this way, encrypted content is written to the recording medium 500b by the user apparatus, and encrypted content recorded on the recording medium 500c is read and decrypted by the user apparatus, and then reproduced.

Next, the third party illegally obtains the device key by some kind of means. The third party circulates the content illegally, and produces and sells illegitimate apparatuses that are imitations of a legitimate user apparatus.

The manager of the key management apparatus 100 or the copyright holder of the content discovers that the content is being circulated illegally, or that illegitimate apparatuses are circulating, and therefore knows that a device key has been leaked.

1.2.2 Operations After the Device Key has Been Exposed

Figure 11:
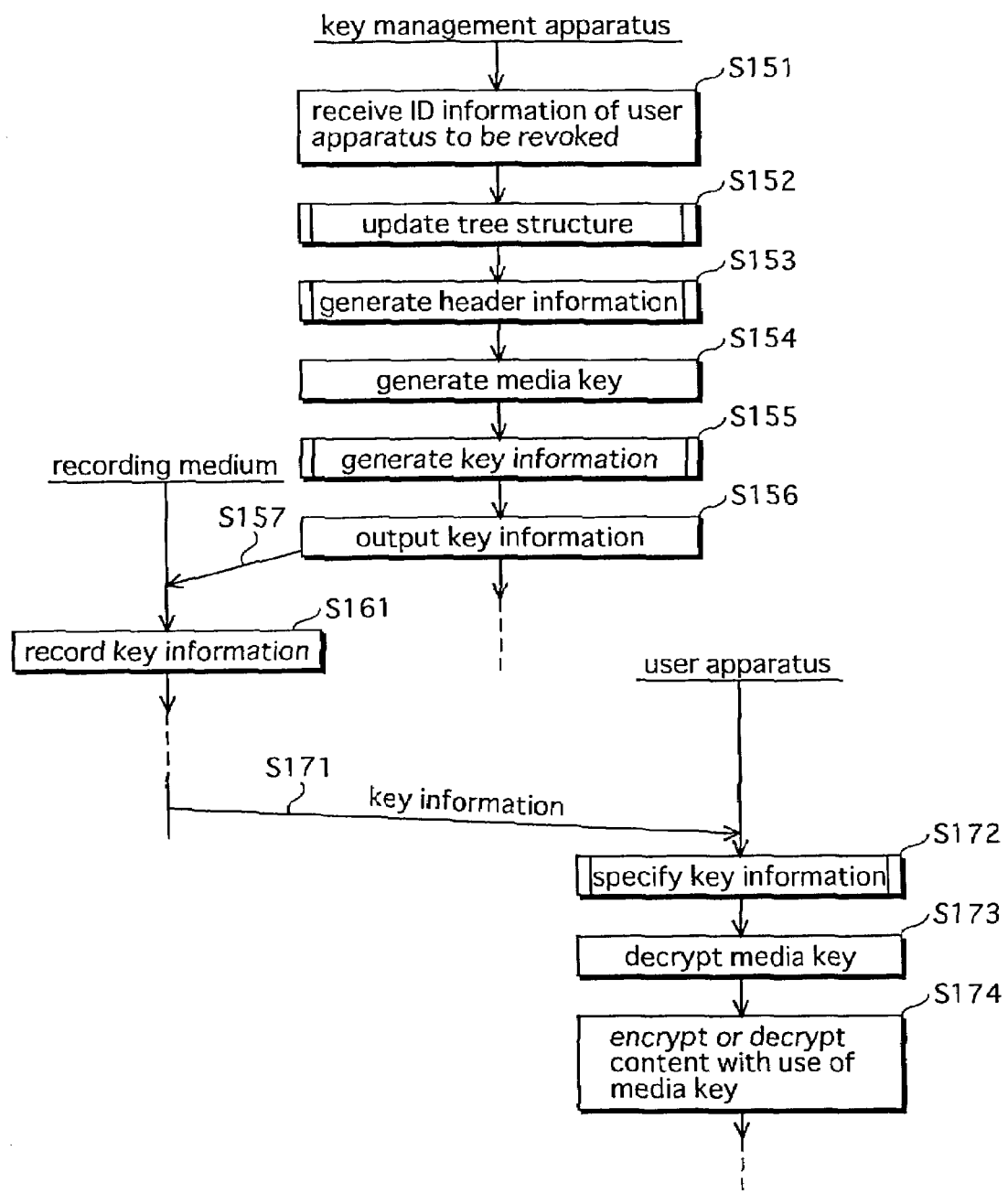
FIG. 11 is a flowchart showing, after the device key has been exposed illegally by a third party, operations for revoking the nodes in the tree structure to which the exposed device key corresponds, operations for generating new key information and writing the generated key information to a recording medium, and operations for the user apparatus to encrypt or decrypt content.

Here, the flowchart in FIG. 11 is used to describe operations for revoking nodes in the tree structure that correspond to the exposed device key, operations for generating new key information and writing the generated key information to a recording medium, and operations by the user apparatus for encrypting or decrypting content, after a device key has been exposed illegally by a third party.

The revoked apparatus designation unit 104 of the key management apparatus 100 receives at least one piece of ID information about at least one user apparatus to the revoked, and outputs the received ID information to the key structure updating unit 105 (step S151). Next, the key structure updating unit 105 receives the ID information, and updates the tree structure using the received ID information (step S152). The key information header generation unit 106 generates header information, and outputs the generated header information to the key information recording apparatus 200 (step S153). The key information generation unit 107 generates a media key (step S154), generates key information (step S155), and outputs the generated key information via the key information recording apparatus 200 (steps S156 to S157), which records the key information on to the recording medium 500a (step S161).

In this way, a recording medium 500b on which the key information is recorded is generated, and then distributed to the user by, for instance, being sold.

Next, the recording medium on which the key information is recorded is loaded in the user apparatus, and the user apparatus reads the key information from the recording medium (step S171), uses the read key information to specify the encrypted media key assigned to the user apparatus itself (step S172), and decrypts the media key (step S173). Then, the user apparatus either encrypts the content with use of the decrypted media key and writes the encrypted content to the recording medium 500b, or reads encrypted content recorded on the recording medium 500c and decrypts the read encrypted content with use of the media key, to generate content (step S174).

In this way, encrypted content is written to the recording medium 500b by the user apparatus, and encrypted content recorded on the recording medium 500c is read and decrypted by the user apparatus and then reproduced.

1.2.3 Operations for Constructing and Storing the Tree Structure

Figure 12:
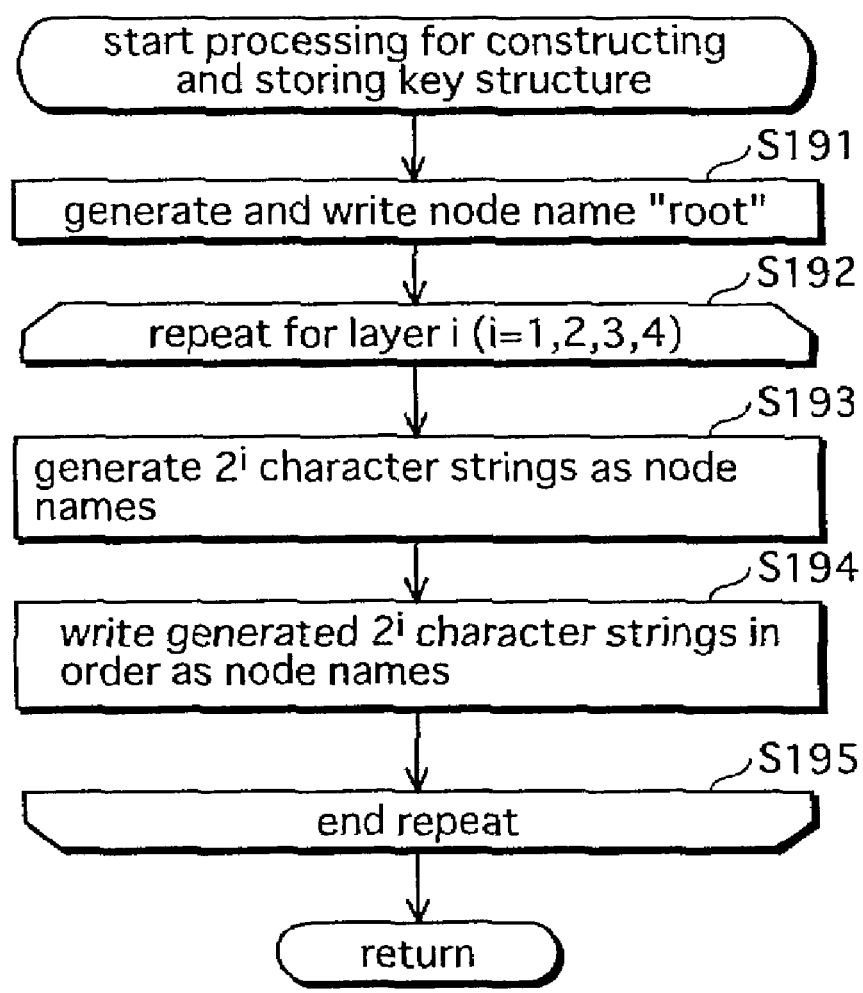
FIG. 12 is a flowchart showing operations by a key structure construction unit 101 for generating a tree structure table and writing the generated tree structure table to a tree structure storage unit 102.

Here, the flowchart in FIG. 12 is used to describe operations by the tree structure construction unit 101 for generating a tree structure table and writing the tree structure table to the tree structure storage unit 102. Note that the operations described here are details of step S101 in the flowchart in the FIG. 10.

The tree structure construction unit 101 generates node information that includes "root" as the node name, and writes the generated node information to the tree structure table in the tree structure storage unit 102 (step S191).

Next, the tree structure construction unit 101 repeats the following steps S193 to S194 for layer i (i=1,2,3,4).

The tree structure construction unit 101 generates a string of $2^i$ characters as the node name (step S193), and writes node information that includes the string of $2^i$ characters as the node name in order to the tree structure table (step S194).

Figure 13:
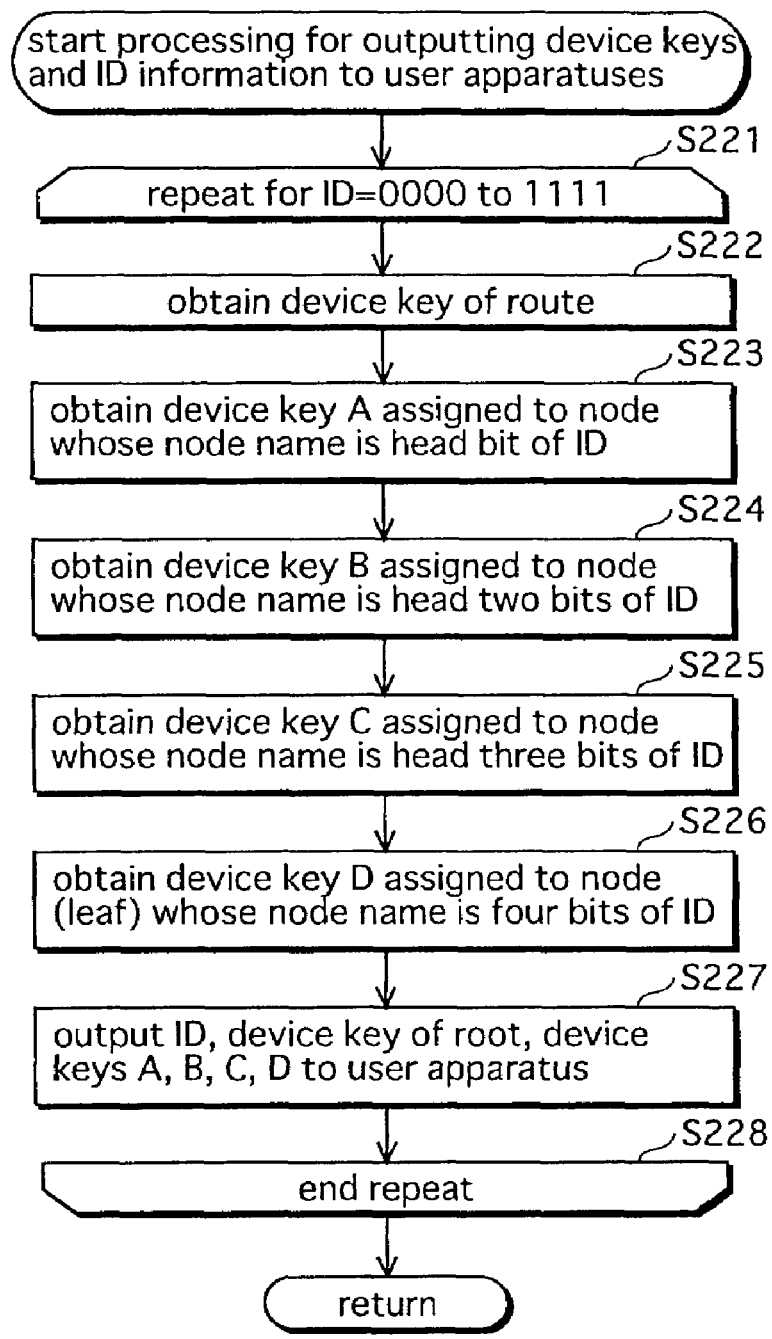
FIG. 13 is a flowchart showing operations by a device key assignment unit 103 for outputting device keys and ID information to each user apparatus.

1.2.4 Operations for Outputting Service Keys and ID Information to the User Apparatuses Here, the flowchart in FIG. 13 is used to describe operations by the device key assignment unit 103 for outputting device keys and ID information to the user apparatuses. Note that the operations described here are details of step S103 in the flowchart in FIG. 10.

The device key assignment unit 103 varies the variable ID to be "0000", "0001", "0010", . . . , "1110", and "1111", and repeats the following steps S222 to S227 for each variable ID.

The device key assignment unit 103 obtains the device key assigned to the root (step S222), obtains the device key A assigned to the node whose node name is the head bit of the variable ID (step S223), obtains a device key B assigned to the node whose node name is the head two bits of the variable ID (step S224), obtains a device key C assigned to the node whose node name is the head three bits of the variable ID (step S225), obtains a device key D assigned to the node whose node name is the head four bits of the variable ID (step S226), and outputs the device keys A, B, C, and D assigned to each node to the user apparatus (step S227).

1.2.5 Operations for Updating the Tree Structure

Figure 14:
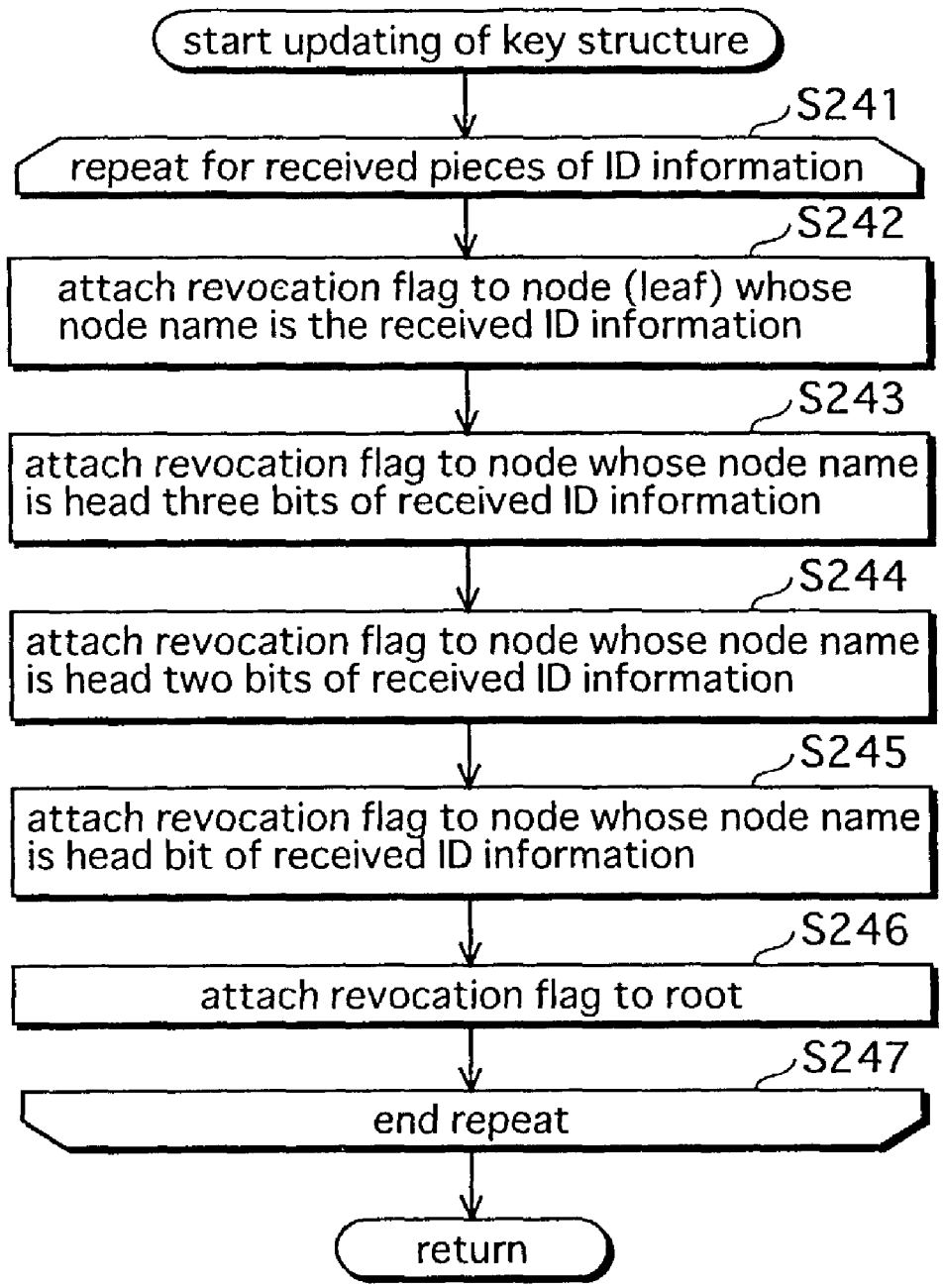
FIG. 14 is a flowchart showing operations by a tree structure updating unit 105 for updating the tree structure.

Here, the flowchart in FIG. 14 is used to describe operations by the key structure updating unit 105 for updating the tree structure. Note that the operations described here are details of step S152 in the flowchart in the FIG. 11.

The key structure updating unit 105 performs the following steps S242 to S246 for each of the at least one pieces of ID information received from the revoked apparatus designation unit 104.

The key structure updating unit 105 obtains the piece of node information that includes the received piece of ID information as the node name, and attaches a revocation flag "1" to the obtained node information (step S242).

Next, the key structure updating unit 105 obtains the piece of node information that includes the head three bits of the received piece of ID information as the node name, and attaches a revocation flag "1" to the obtained node information (step S243).

Next, the key structure updating unit 105 obtains the pieces of node information that includes the head two bits of the received piece of ID information as the node name, and attaches a revocation flag "1" to the obtained node information (step S244).

Next, the key structure updating unit 105 obtains the piece of node information that includes the head bit of the received ID information as the node name, and attaches a revocation flag "1" to the obtained piece of node information (step S245).

Next, the key structure updating unit 105 obtains the piece of node information that includes "root" as the node name, and attaches a revocation flag "1" to the obtained piece of node information (step S246).

1.2.6 Operations for Generating Header Information

Figure 15:
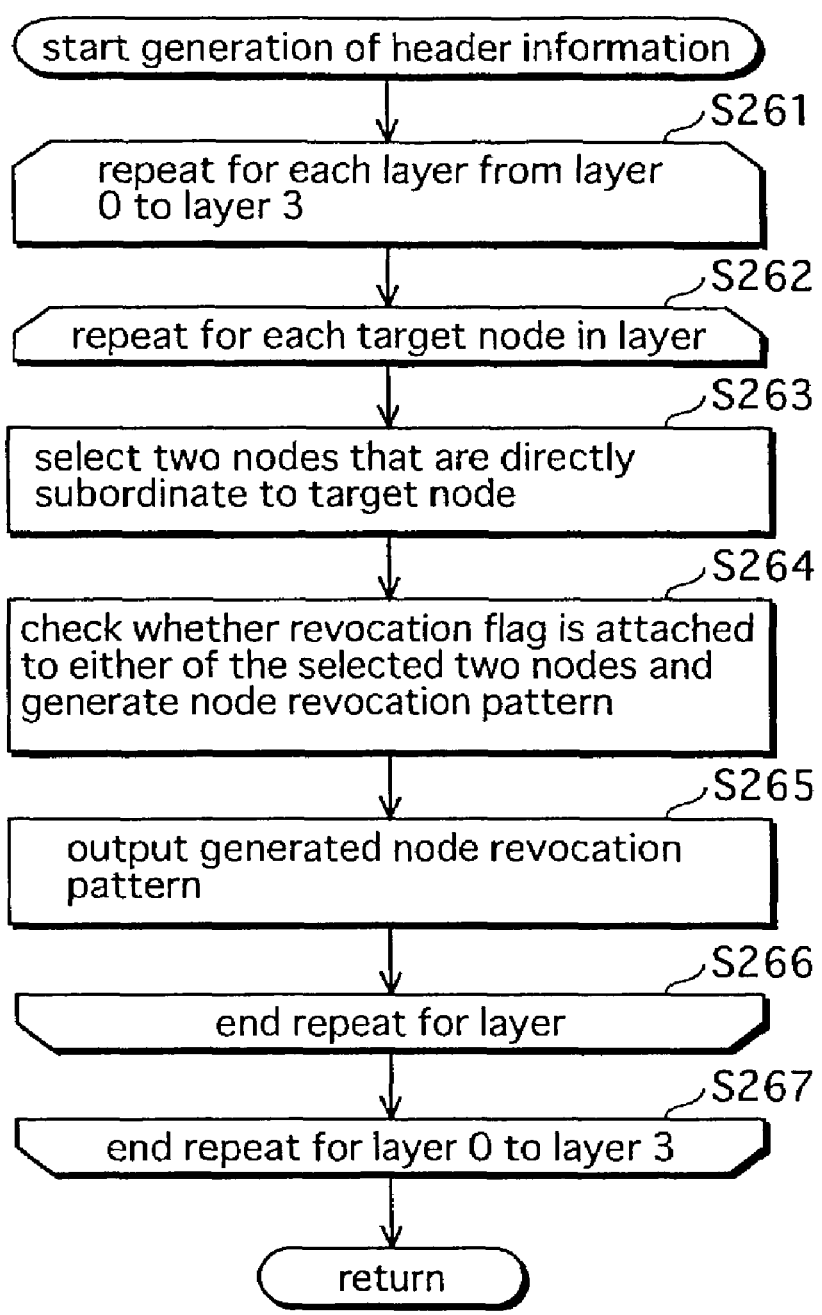
FIG. 15 is a flowchart showing operations by a key information header generation unit 106 for generating header information.

Here, the flowchart in FIG. 15 is used to describe operations by the key information header generation unit 106 for generating header information. Note that the operations described here are the details of step S153 in the flowchart in FIG. 11.

The key information header generation unit 106 performs steps S262 to S266 for each layer from layer 0 to layer 3, and further performs steps S263 to S265 for each target node in each layer.

The key information header generation unit 106 selects the two directly subordinate nodes of the target node (step S263), checks whether each of the two selected nodes have a revocation flag attached thereto or not, to generate an NRP (step S264), and outputs the generated revocation pattern (step S265).

1.2.7 Operations for Generating Key Information

Figure 16:
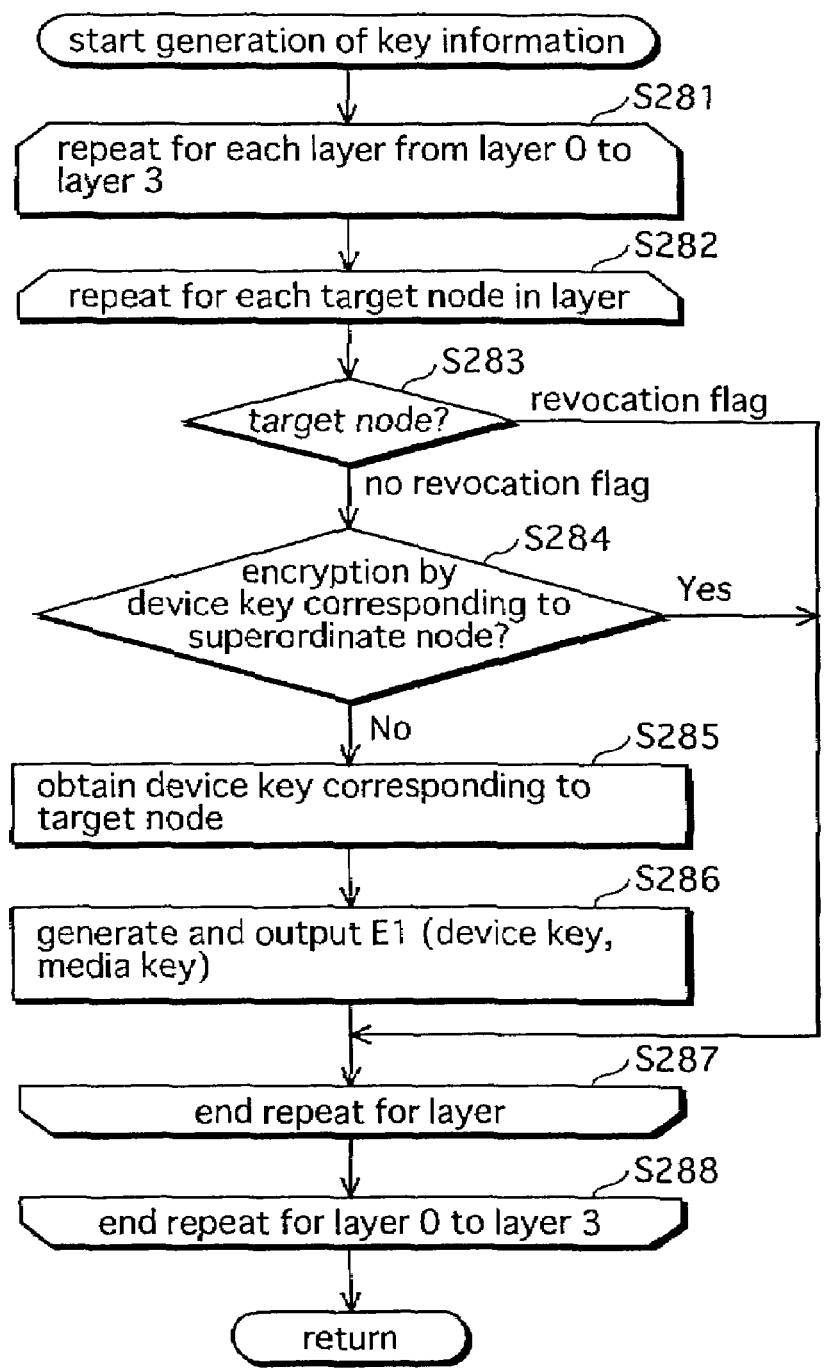
FIG. 16 is a flowchart showing operations by a key information generation unit 107 for generating key information.

Here, the flowchart in FIG. 16 is used to described operations by the key information generation unit 107 for generating key information. Note that the operations described here are the details of step S155 in the flowchart in FIG. 11.

The key information generation unit 107 performs steps S282 to S287 for each layer from layer 1 to layer 3, and further performs steps S283 to S286 for each target node in each layer.

The key information generation unit 107 judges whether a revocation flag "1" is attached to the target node. When a revocation flag "1" is not attached (step S283), the key information generation unit 107 further judges whether encryption has been performed using the device key corresponding to the superordinate node of the target node. When encryption has not been performed (step S284), the key information generation unit 107 obtains the device key corresponding to the target node from the tree structure table (step S285), encrypts the generated media key using the obtained device key, to generate an encrypted media key, and outputs the encrypted media key (step S286).

When a revocation flag "1" is attached to the target node (step S283), or when encryption has been performed (step S284), the key information generation unit 107 does not perform steps S285 to S286.

1.2.8 Operations for Specifying Key Information

Figure 17:
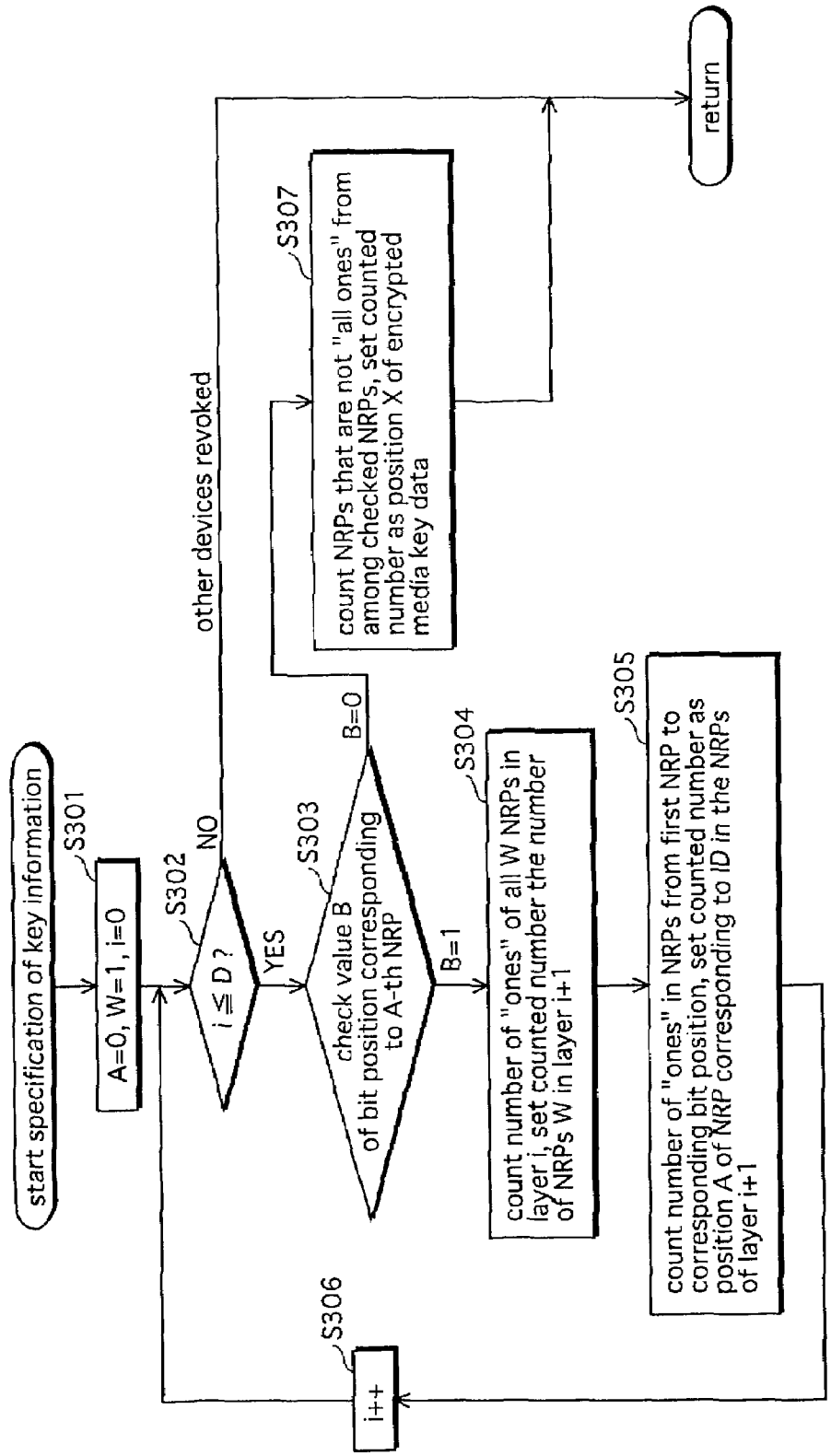
FIG. 17 is a flowchart showing operations by a specification unit 303 in the recording apparatus 300a for designating one encrypted media key from amongst key information stored in the recording medium 500b.

Here, the flowchart in FIG. 17 is used to describe operations by the specification unit 303 of the recording apparatus 300a for specifying an encrypted media key from key information stored on the recording medium 500b. Note that the operations described here are the details of step S172 in the flowchart in FIG. 11.

Note also that operations performed by the specification unit 402 of the reproduction apparatus 400a are the same as those by the specification unit 303, and therefore a description thereof is omitted.

The specification unit 303 has a variable X that shows the position of the encrypted media key, a variable A that shows the position of the NRP relating to the user apparatus itself, a variable W that shows the number of NRPs in a layer, and a value D that shows the number of layers in the tree structure. Here, an NRP relating to the user apparatus itself denotes an NRP of a node in the tree structure that is on the path from the leaf assigned to the user apparatus through to the root.

The specification unit 303 analyzes the layer i=0 through to the layer i=D−1 according to the following procedure.

The specification unit 303 sets variable A=0, variable W=1, and variable i=0 as initial values (step S301).

The specification unit 303 compares the variable i and the value D, and when the variable i is greater than the value D (step S302) the user apparatus is a revoked apparatus, therefore the specification unit 303 ends the processing.

When the variable i is less than or equal to the value D (step S302), the specification unit 303 checks whether a value B that is in the bit position corresponding to the value of the highest i-th bit of the ID information is "0" or "1", to determine which of the left bit and the right bit of the NRP the value B corresponds to (step S303). Here, since, as shown in FIG. 4, "0" is assigned to the left path in the tree structure and "1" is assigned to the right path, and the ID information is composed based on this rule, a value "0" of the highest i-th bit of the ID information corresponds to the left bit of the A-th NRP, while a value "0" of the right bit corresponds to the A-th NRP.

When value B=0 (step S303), the specification unit 303 counts the number of NRPs, from amongst the NRPs checked so far, whose bits do not all have the value "1", and sets the counted value as the variable X. The variable X obtained in this way shows the position of the encrypted media key. Furthermore, the variable i at this point is the device key identification information for identifying the device key (step S307). The specification unit 303 then ends the processing.

When value B=1 (step S303), the specification unit 303 counts the number of "ones" in all W NRPs in layer i, and sets the counted value in the variable W. The variable W obtained in this way shows the number of NRPs in the next layer i+1 (step S304).

Next, the specification unit 303 counts the number of "ones" starting from the first NRP in layer i through to the NRP of the corresponding bit position, and sets the counted value in the variable A. Here, the value of the corresponding bit position is not counted. The variable A obtained in this way shows the position of the NRP, from amongst the NRPs in the next layer i+1, relating to the user apparatus itself (step S305).

Next, the specification unit 303 calculates the variable i=i+1 (step S306), moves the control to step S302, and repeats the above-described processing.

1.2.9 Specific Example of Operations for Specifying Key Information

The following describes one specific example of operations by the non-revoked user apparatus 14 shown in FIG. 5 until specifying an encrypted media key with use of the header information and the key information shown in FIGS. 6 and 7. Here it is supposed that the user apparatus 14 has been assigned ID information "1101", and device keys "KeyA", "KeyC", "KeyG", "KeyN" and "IK14".

<Step 1> Since the value of the top bit of the ID information "1101" assigned to the user apparatus 14 is "1", the specification unit 303 checks the right bit of the first NRP {11} (step S303).

<Step 2> Since the value of right bit of the first NRP {11} is "1", the specification unit 303 continues analyzing (step S303, B=1).

<Step 3> The specification unit 303 counts the number of "ones" in the NRP {11} in layer 0. Since the counted value is "2", the specification unit 303 knows that there are two NRPs in the next layer 1 (step S304).

<Step 4> The specification unit 303 counts the number of "ones" in the NRPs up to the corresponding bit position. Note that the value of the corresponding bit position is not counted. Since the counted value is "1", the NRP corresponding to the next layer 1 is in position 1 in layer 1 (step S305).

<Step 5> Next, since the value of the second bit from the top of the ID information "1101" is "1", the specification unit 303 checks the right bit of the first NRP {10} in layer 1 (step S303).

<Step 6> Here, since the value of the right bit of the first NRP {10} in layer 1 is "0", the specification unit 303 ends analyzing (step S303, B=0).

<Step 7> The specification unit 303 counts the number of NRPs whose bits do not all have the value "1", from amongst the NRPs analyzed so far. Note that the NRP that was checked last is not counted. Since the counted value is "1", the encrypted media key is in position 1 in the key information (step S307).

<Step 8> As shown in FIG. 7, the encrypted media key stored in position 1 in the key information is E1(KeyG, media key).

The user apparatus 14 has the KeyG. Accordingly, the user apparatus 14 is able to obtain the media key by decrypting the encrypted media key using the KeyG.

1.3 Conclusion

As has been described, according to the first embodiment, the plurality of NRPs are arranged in level order in the header information of the key information stored in advance on the recording medium, resulting in key information that is compact in size. Furthermore, the player is able to specify efficiently the encrypted media key to be decrypted.

2. Second Emodiment

Here, a second embodiment is described as a modification of the first embodiment.

Figure 18:
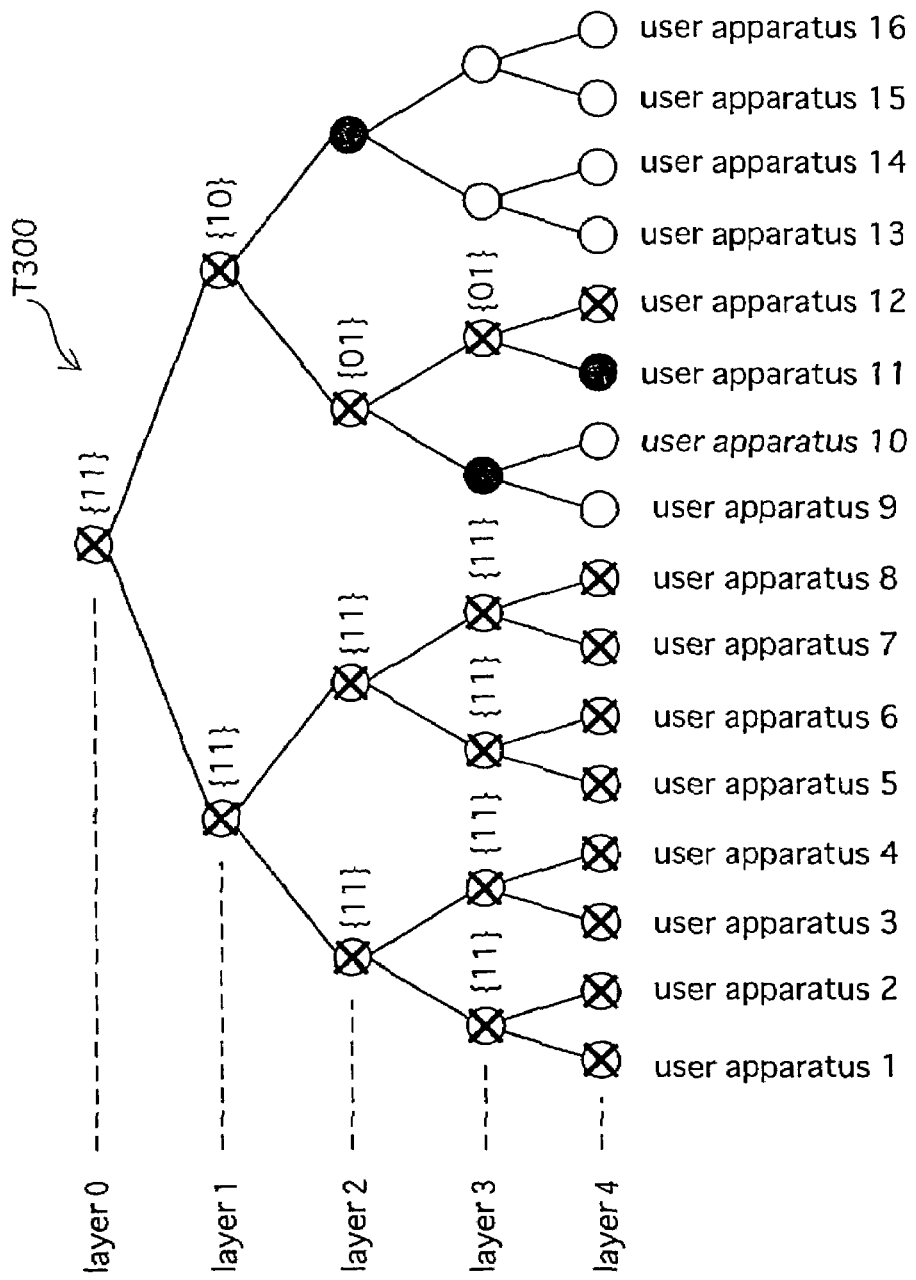
FIG. 18 shows an example of a tree structure in a first embodiment in an example of a case in which there is a possibility that revoked user apparatuses occur one-sidedly around a particular leaf in the tree structure.

In the first embodiment, as shown as one example in FIG. 18, it is possible that revoked user apparatuses occur around a particular leaf in the tree structure. In this case, there are numerous NRPs that are {11} in the header information of the key information that the key management apparatus 100 writes to the recording medium. In the example shown in FIG. 18, the leaves on the left half of a tree structure T300 all correspond to revoked apparatuses, therefore eight of the eleven NRPs included in the header information in the key information are {11}.

In the example shown in FIG. 18, since all the apparatuses on the left side of the tree structure T300 are revoked, it is not necessary to record NRPs that correspond to each of the nodes in the left half as header information if it is expressed that the left node of layer 1 and all its subordinate nodes are revoked nodes.

For this purpose, in the second embodiment a digital work protection system 10b (not illustrated) is able to reduce the data size of the header information in cases in which revoked apparatuses occur one-sidedly around a particular leaf.

Figure 19:
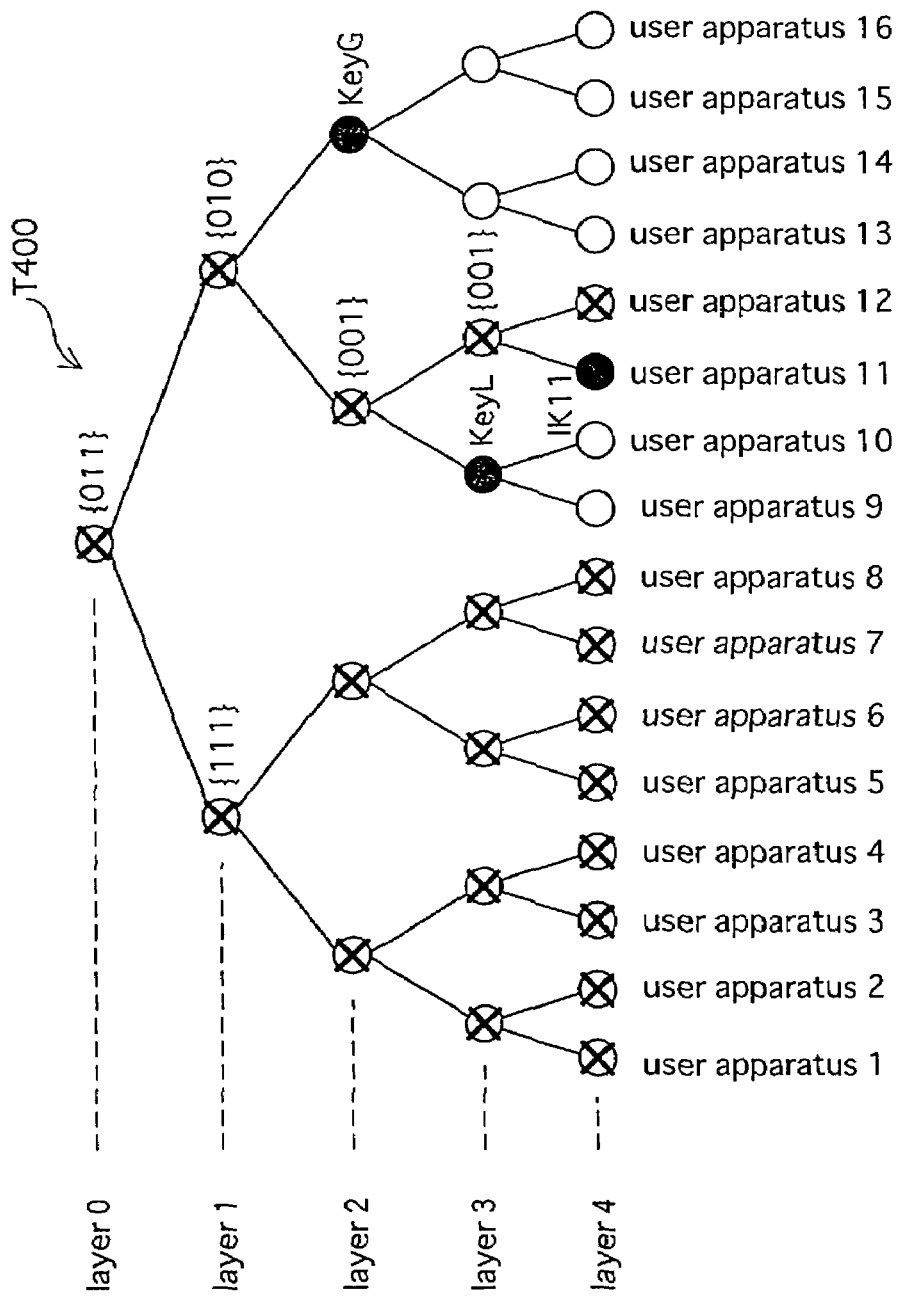
FIG. 19 is a tree structure showing a special NRP in a case in which revoked user apparatuses occur one-sidedly around a specific leaf in the tree structure, in a second embodiment.

The key management apparatus 100 generates NRPs as header information of the key information, as described in the first embodiment. Here, one bit is added to the head of NRPS. An added bit "1" means that all the user apparatuses assigned to the descendant nodes of the particular node are revoked apparatuses. In FIG. 19, not all the apparatuses assigned to the descendant nodes of a node T401 and a node T402 are revoked, therefore the head bit is "0", and the NRPs of the nodes T401 and T402 are expressed as {011} and {010} respectively. Since all the apparatuses assigned to the descendant nodes of a node T403 are revoked, the NRP for the node T403 is expressed as {111}. The key management apparatus 100 does not write any NRPs about the descendant nodes of the node T403 to the recording medium.

2.1 Structure of the Digital Work Protection System 10b

The digital work protection system 10b has a similar structure to the digital work protection system 10. Here the features of the digital work protection system 10b that differ from the digital work protection system 10 are described.

In the second embodiment, as shown in FIG. 19, user apparatuses 1 to 8 and user apparatus 12 are revoked.

2.1.1 Key Management Apparatus 100

The key management apparatus 100 of the digital work protection system 10b has a similar structure to that described in the first embodiment. Here the features of the key management apparatus 100 in the second embodiment that differ from the key management apparatus 100 in the first embodiment are described.

(1) Tree Structure Storage Unit 102

The tree structure storage unit 102 has, as one example, a tree structure table D400 shown in FIG. 20 instead of the tree structure table D110.

The tree structure table D400 corresponds to a tree structure T400 shown in FIG. 19 as one example, and is a data structure for expressing the tree structure T400.

The tree structure table D400 includes a number of pieces of node information that is equal to the number of nodes in the tree structure T400. The pieces of node information correspond respectively to the nodes in the tree structure T400.

Each piece of node information includes a node name, a device key, a revocation flag and an NRP.

The node names, device keys and revocation flags are as described in the first embodiment, therefore descriptions thereof are omitted here.

The NRP is composed of three bits. The highest bit shows, as described above, that all the user apparatuses assigned to the descendant nodes shown by the corresponding node name are revoked apparatuses. The content of the lower two bits is the same as the NRPs described in the first embodiment.

(2) Key Information Header Generation Unit 106

When the head bit of the NRP is "1", the key information header generation unit 106 generates an NRP that shows that all the user apparatuses assigned to the descendant nodes of the node are revoked apparatuses, and outputs the generated NRP to the key information recording apparatus 200. Note that generation of the NRP is described in detail later.

The key information header generation unit 106 generates, as one example, header information D500 shown in FIG. 21. The header information D500 is composed of NRPs {011}, {111}, {010}, {001} and {001}, which are included in the header information D500 in the stated order. Furthermore, as shown in FIG. 21, the NRPs {011}, {111}, {010}, {001} and {001} are arranged respectively in positions defined by "0", "1", "2", "3" and "4".

(3) Key Information Generation Unit 107

Figure 22:
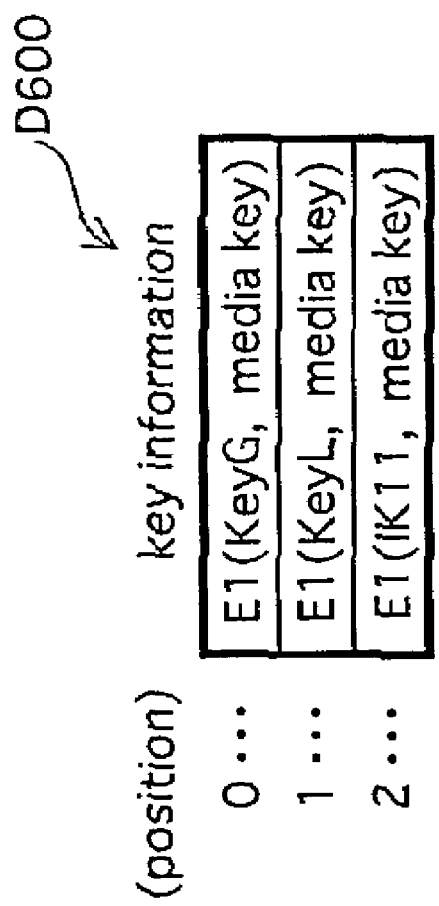
FIG. 22 shows an example of the data structure of key information D600.
Figure 23:
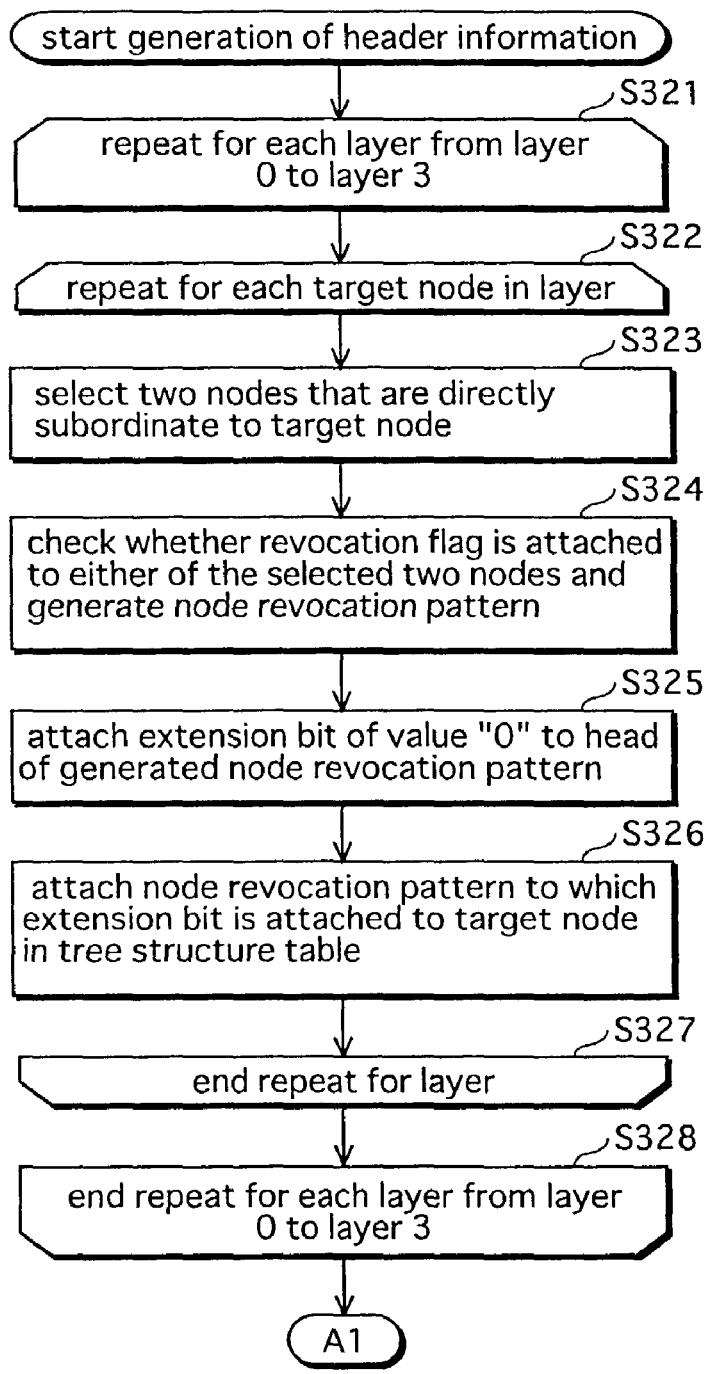
FIG. 23 is a flowchart, which continues in FIG. 24, showing operations by the key information header generation unit 106 for generating header information.
Figure 24:
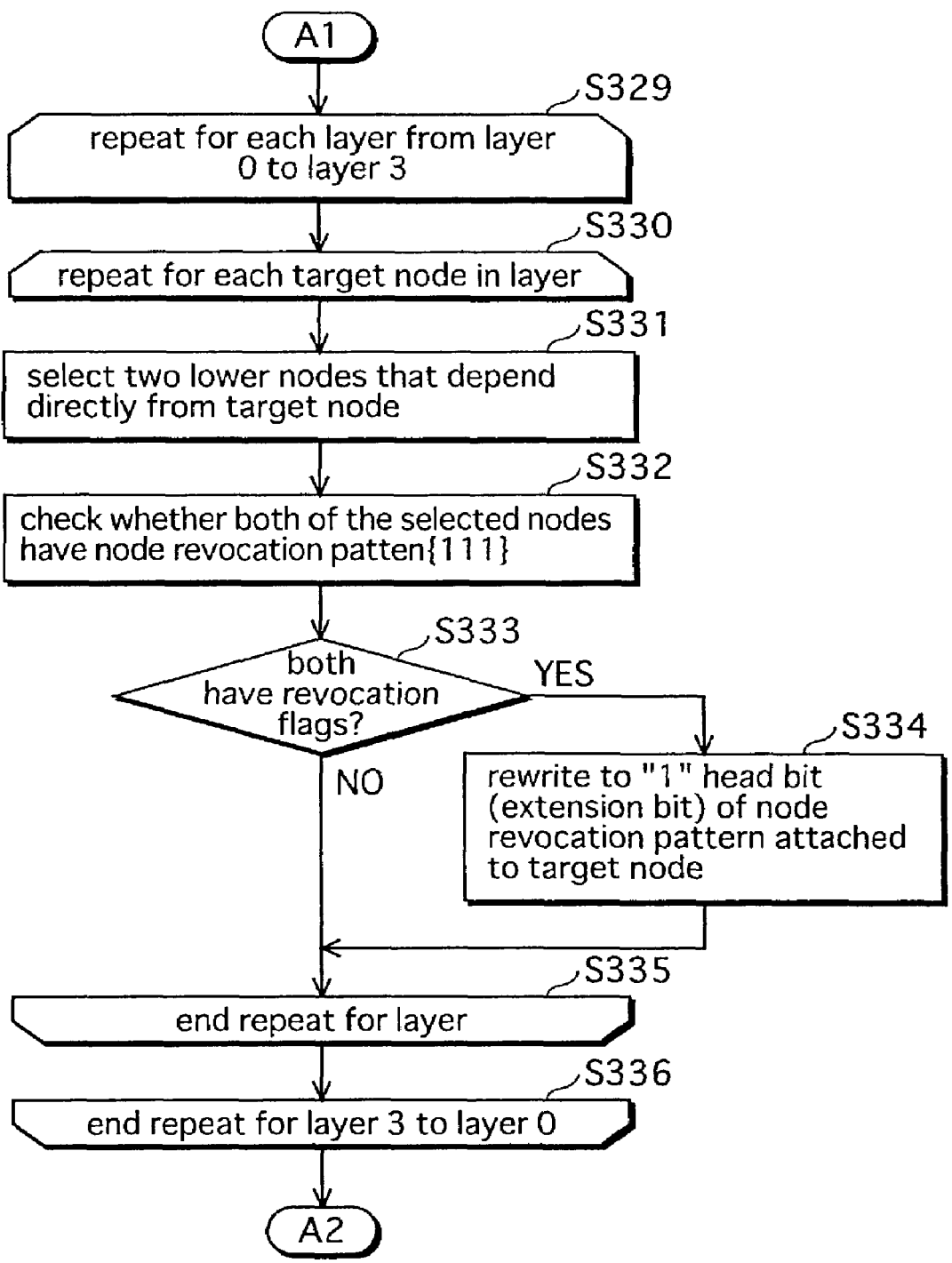
FIG. 24 is a flowchart, which continues in FIG. 25, showing operations by the key information header generation unit 106 for generating header information.
Figure 25:
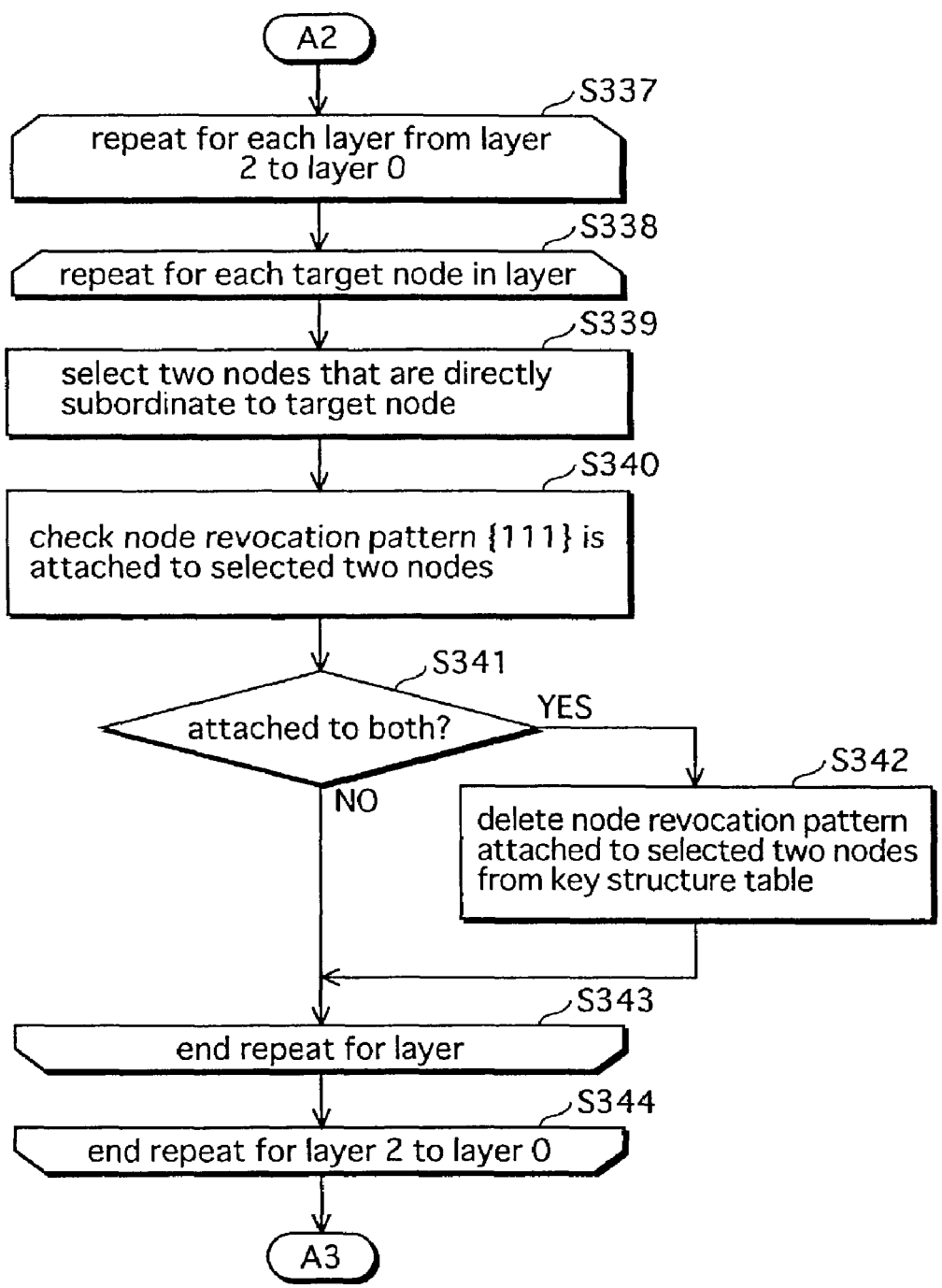
FIG. 25 is a flowchart, which continues in FIG. 26, showing operations by the key information header generation unit 106 for generating header information.
Figure 26:
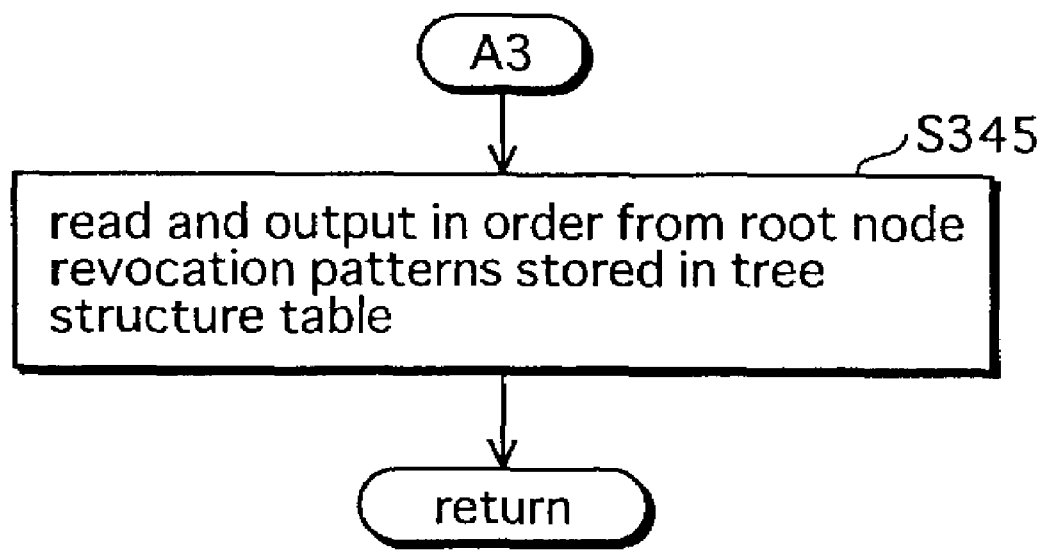
FIG. 26 is a flowchart, which continues from FIG. 25, showing operations by the key information header generation unit 106 for generating header information.

The key information generation unit 107 generates, as one example, key information D600 shown in FIG. 22. The key information D600 includes three encrypted media keys. The encrypted media keys are generated by encrypting the media key with use of device keys KeyG, KeyL, and IK11 respectively.

The position in which each of the plurality of encrypted media keys is stored in the key information D600 is set. As shown in FIG. 22, the encrypted media keys E1 (Key G, media key), E1(Key L, media key) and E1(IK11, media key) are arranged respectively in positions defined by "0", "1" and "2" in the key information D600.

2.1.2 Recording Apparatus 300a

The recording apparatus 300a has a similar structure to the recording apparatus 300 described in the first embodiment. Here, the features of the recording apparatus 300a that differ from the recording apparatus 300 are described.

(1) Specification Unit 303

The specification unit 303 specifies the position X of one encrypted media key in the key information by checking the pieces of header information sequentially from the top, with use of the read ID information and the read header information. Note that details of the operations for specifying the position X of the encrypted media key are described later.

2.2 Operations of the Digital Work Protection System 10b

The following description focuses on the features of the operations of the digital work protection system 10b that differ from the digital work protection system 10.

2.1.1 Operations for Generating Header Information

Here, the flowcharts shown in FIG. 23 to FIG. 26 are used to describe operations by the key information header generation unit 106 for generating header information. Note that the operations described here are details of step S153 in the flowchart in FIG. 11.

The key information header generation unit 106 performs steps S322 to S327 for each layer from layer 0 to layer 3, and further performs steps S323 to S326 for each target node in each layer.

The key information header generation unit 106 selects the two directly subordinate nodes of the target node (step S323), checks whether each of the two selected nodes had a revocation flag attached thereto or not, to generate an NRP (step S324), attaches an extension bit having a value "0" to the head of the generated NRP (step S325), and attaches the NRP to which the extension bit has been attached to the node information that corresponds to the target node in the tree structure table (step S326).

In this way, after repetition of steps S321 to S328 has ended, an NRP in attached to each piece of node information in the same way as described in the first embodiment. Here, a value "0" (one bit) is attached to the head of each NRP.

Next, the key information header generation unit 106 performs steps S330 to S335 for each layer from layer 3 to layer 0, and further performs steps S331 to S334 for each target node in each layer.

The key information header generation unit 106 selects the two nodes that are directly below and connected to the target node (step S331), and checks whether each of the two selected nodes has a revocation flag {111} attached thereto or not. When the two selected nodes are leaves, the key information header generation unit 106 checks whether a revocation flag is attached to both the selected nodes (step S332).

Only when both the selected subordinate nodes have NRPs {111} attached thereto, or in the case of the two selected nodes being leaves only when the both of the two selected subordinate nodes have a revocation flag attached thereto (step S333), the key information header generation unit 106 rewrites the head bit of the NRP attached to the target node to "1" (step S334).

In this way, after the key information header generation unit 106 has finished repeating the steps S329 to S336, {111} is attached to the superordinate node of the two subordinate nodes having the NRP {111}.

Next, the key information header generation unit 106 performs steps S338 to S343 for each layer from layer 2 to layer 0, and further performs steps S339 to S342 for each target node in each layer.

The key information header generation unit 106 selects the two directly subordinate nodes of the target node (step S339), and checks whether each of the two selected nodes have a revocation pattern {111} attached thereto or not (step S340).

Only when both the selected lower nodes have revocation patterns {111} attached thereto (step S341), the key information header generation unit 106 deletes the respective NRPs attached to the selected two lower nodes from the tree structure table (step S342).

Next, the key information header generation unit 106 reads and outputs the NRPs stored in the tree structure table in order (step S345).

In this way, when the head bit of an NRP is "1", an NRP is generated that shows that all the user apparatuses assigned to the descendant nodes of the node are revoked apparatuses.

2.2.2 Operations for Specifying Key Information

Figure 27:
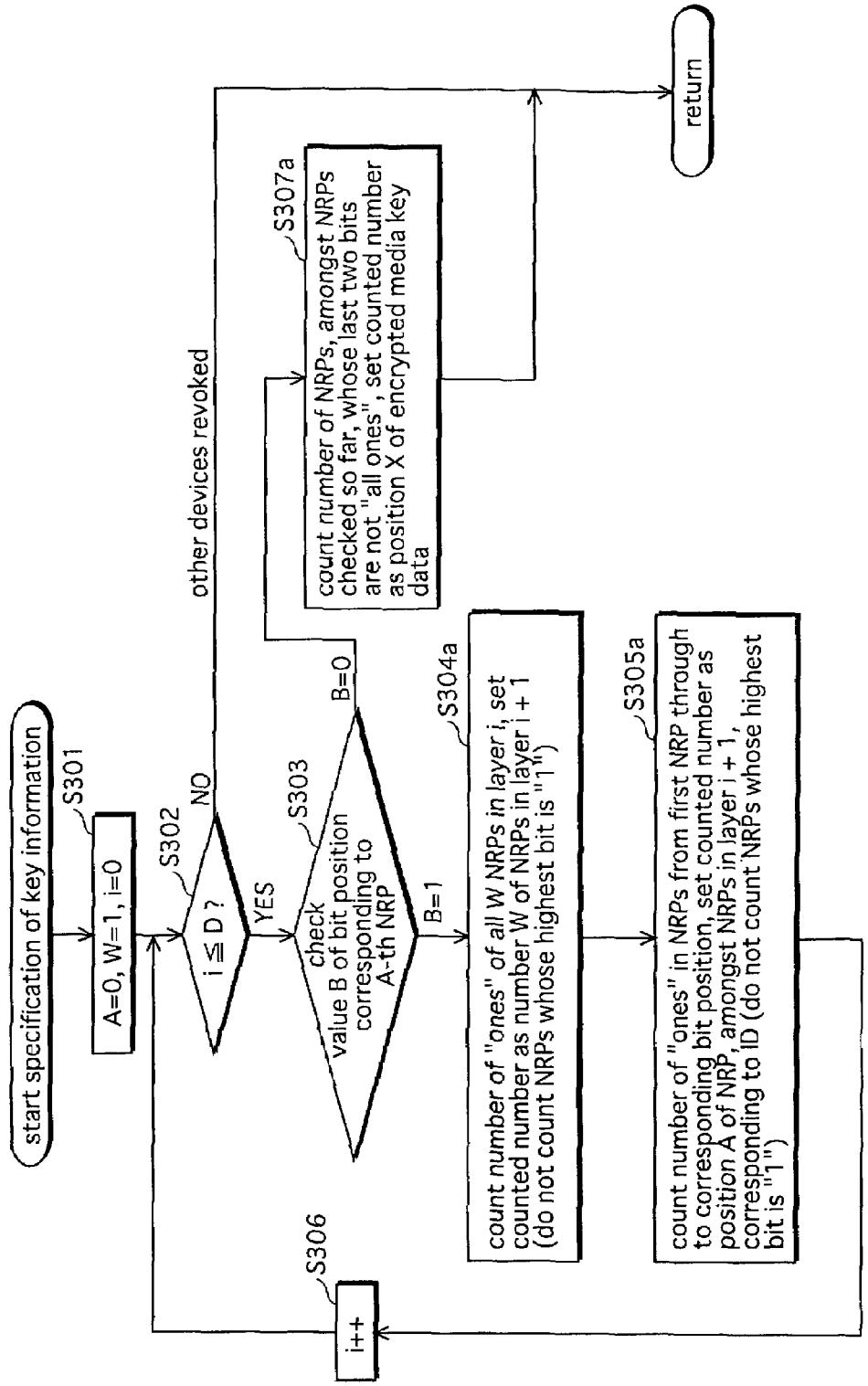
FIG. 27 is a flowchart showing operations by the specification unit 303 in the recording apparatus 300a for designating one encrypted media key from amongst key information stored in the recording medium 500b.

Here, the flowchart shown in FIG. 27 is used to describe operations by the specification unit 303 in the recording apparatus 300a for specifying one encrypted media key from the key information stored on the recording medium 500b. Note that the operations described here are the details of step S172 in the flowchart shown in FIG. 11.

Note that the operations by the specification unit 303 for specifying an encrypted media key are similar to those described in the first embodiment, therefore following description centers on the features of the specification unit 303 that differ to that of the first embodiment.

When value B=0 (step S303), the specification unit 303 counts the number of NRPs, amongst the NRPs checked so far, whose lower two bits do not all have the value "1", and sets the counted value in the variable X. The variable X obtained in this way shows the position of the encrypted media key (step S307a). The specification unit 303 then ends the processing.

When value B=1 (step S303), the specification unit 303 counts all the "ones" in the W NRPs in the layer i. However, NRPs whose highest bit is "1" are not counted. The counted value is set in the variable W. The variable W obtained in this manner shows the number of NRPs in the next layer i+1 (step S304a).

Next, the specification unit 303 counts the number of "ones" starting from the first NRP through to the NRP of the corresponding bit position, and sets the counted value in the variable A. Here, the value of the corresponding bit position is not counted. The variable A obtained in this way shows the position of the NRP, from amongst the NRPs in the next layer i+1, relating to the user apparatus itself (step S305a).

2.2.3 Specific Example of Operations for Specifying Key Information

The following describes one specific example of operations by the non-revoked user apparatus 10 shown in FIG. 19 up to specifying an encrypted media key with use of the header information and the key information shown in FIGS. 21 and 22. Here it is supposed that the user apparatus 10 has been assigned ID information "1001", and device keys "KeyA", "KeyC", "KeyF", "KeyL" and "IK10".

<Step 1> Since the value of the top bit of the ID information "1001" assigned to the user apparatus 10 is "1", the specification unit 303 checks the right bit of the two lower bits of the first NRP {011} (step S303).

<Step 2> Since the value of right bit of the two lower bits of the first NRP {011} is "1", the specification unit 303 continues analyzing (step S303, B=1).

<Step 3> The specification unit 303 counts the number of "ones" in the two lower bits of the NRP {011} in layer 0. Since the counted value is "2", the specification unit 303 knows that there are two NRPs in the next layer 1 (step S304a).

<Step 4> The specification unit 303 counts the number of "ones" in two lower bits of the NRP {011} up to the corresponding bit position. Note that the value of the corresponding bit position is not counted. Since the counted value is "1", the NRP corresponding to the next layer 1 is in position 1 in layer 1 (step S305).

<Step 5> Next, since the value of the second bit from the top of the ID information "1001" is "0", the specification unit 303 checks the left bit of the two lower bits of the first NRP {010} in layer 1 (step S303).

<Step 6> Here, since the value of the left bit of the two lower bits of the first NRP {010} in layer 1 is "1", the specification unit 303 continues analyzing (step S303, B=1).

<Step 7> The specification unit 303 counts the number of "ones" in the two lower bits of the two NRPs {111} and {010} in layer 1. Note that NRPs whose highest bit is "1" are not counted. Since the counted value is "1", the specification unit 303 knows that there is one NRP in the next layer 2 (step S304a).

<Step 8> The specification unit 303 counts the number of "ones" in the NRP up to the corresponding bit position. Note that the value of the corresponding bit position is not counted. Since the counted value is "0", the position of the corresponding NRP in the next layer 2 is position 0 in layer 2 (step S305a).

<Step 9> Since the value of third bit of the ID information "1001" is "0", the specification unit 303 checks the left bit of the two lower bits of the 0-th NRP {001} in layer 2 (step S303).

<Step 10> Here, since the value of the left bit of the lower two bits of the 0-th NRP in layer 2 is "0", the specification unit 303 ends analyzing (step S303, B=0).

<Step 11> The specification unit 303 counts the number of NRPs whose bits are not all "1", from amongst the NRPs analyzed so far. Note that the NRP that was last checked is not counted. Since the counted value is "1", the position of the encrypted media key is position 1 in the key information (step S307a).

<Step 12> As shown in FIG. 22, the encrypted media key stored in position 1 in the key information is E1(KeyL, media key).

The user apparatus 10 has the KeyL. Accordingly, the user apparatus 10 is able to obtain the media key by decrypting the encrypted media key using the KeyL.

Note that in the above-described second embodiment, when all the user apparatuses of descendant nodes of a particular node are revoked, the bit that is added is "1". However, in the case of a tree structure in which the layer number of the leaves vary, the added bit "1" may also be used as a flag to show the terminal.

3. Third Embodiment

In the second embodiment a method was shown that further reduces the size of the header information when revoked terminals occur one-sidedly around a particular leaf, by adding a bit to the head of the NRP of a node to show that the descendants are all revoked terminals.

In the third embodiment, instead of adding a bit to the NRP, an NRP having a specific pattern {100} is used to judge whether all the descendants of a node are revoked terminals. {00} is used here because it is not otherwise used in any of the layers except for the layer 0. The following describes a digital work protection system 10c (not illustrated) that is accordingly able to further reduce the size of header information compared to the second embodiment.

Figure 28:
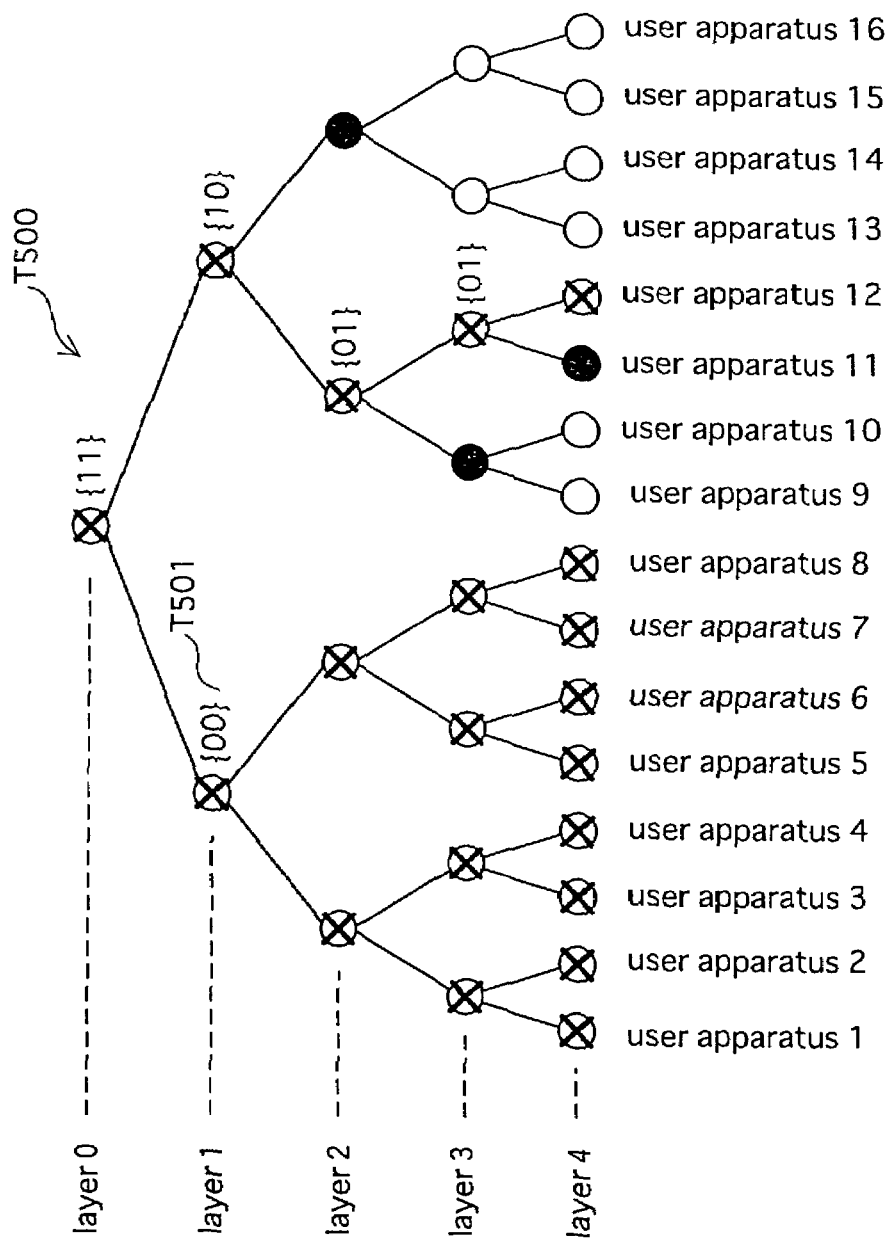
FIG. 28 is a tree structure showing a special NRP, in a third embodiment.

Here, as shown in FIG. 28, user apparatus 1 to user apparatus 8, and user apparatus 12 are revoked. In the third embodiment the NRPs are as shown in the first embodiment, but when all the user apparatuses of descendants of a particular node are revoked apparatuses, the NRP of the node is expressed as {00}. Since the descendants of a node T501 in FIG. 28 are all revoked apparatuses, the NRP of the node T501 is expressed as {00}.

3.1 Structure of Digital Work Protection System 10c

The digital work protection system 10c has a similar structure to the digital work protection system 10. Here, the features of the digital work protection system 10c that differ to the digital work protection system 10 are described.

3.1.1 Key Management Apparatus 100

The key management apparatus 100 of the digital work protection system 10c has a similar structure to the key management apparatus 100 described in the first embodiment. Here the features of the key management apparatus 100 in the third embodiment that differ from the key management apparatus 100 in the first embodiment are described.

(1) Key Information Header Generation Unit 106

When the NRP is {00}, the key information header generation unit 106 generates an NRP that shows that all the user apparatuses assigned to the descendant nodes of the node are revoked apparatuses, and outputs the generated NRP to the key information recording apparatus 200. Note that the generated NRP is described in detail later.

Figure 29:
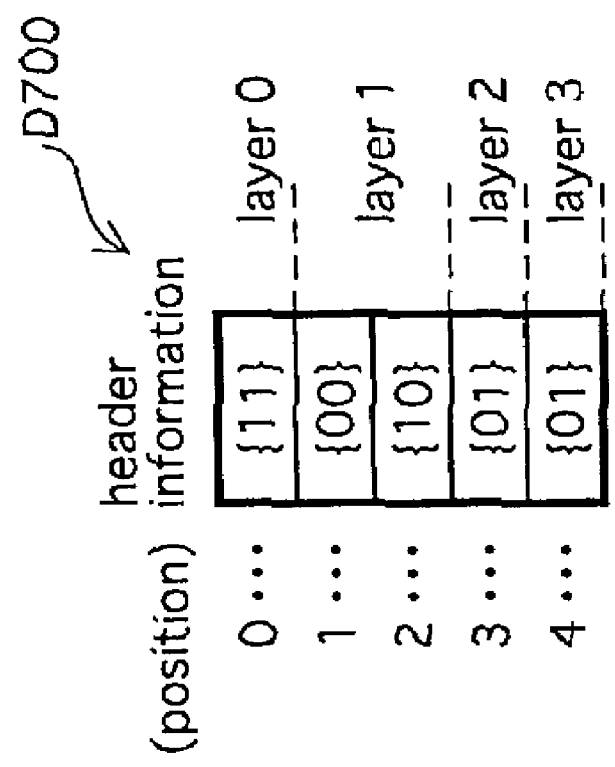
FIG. 29 shows an example of the data structure of header information D700.

The key information header generation unit 106 generates, as one example, header information D700 shown in FIG. 29. The header information D700 is composed of NRPs {11}, {00}, {10}, {01} and {01}, which are included in the header information D700 in the stated order. Furthermore, as shown in FIG. 29, the NRPs {11}, {00},{10}, {01} and {01} are positioned respectively in positions defined by "0", "1", "2", "3" and "4".

(2) Key Information Generation Unit 107

Figure 30:
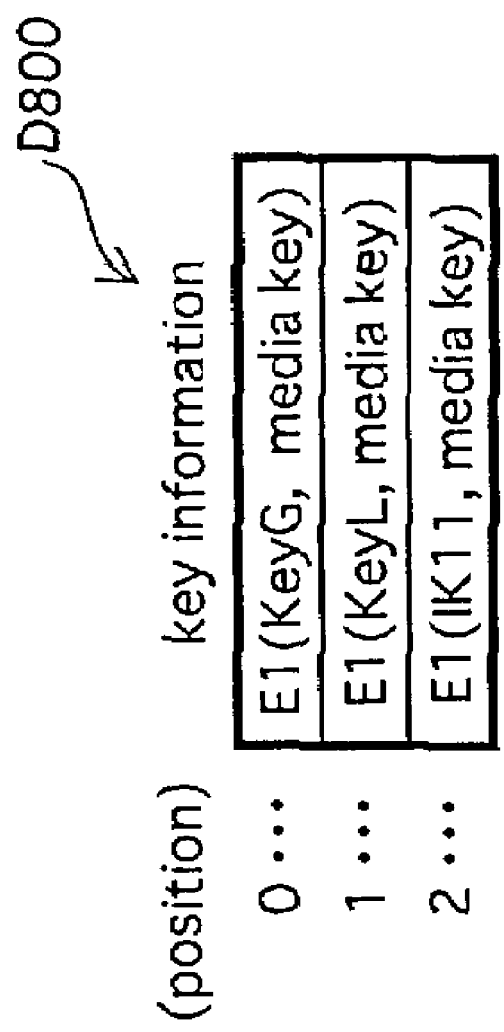
FIG. 30 shows an example of the data structure of key information D800.
Figure 31:
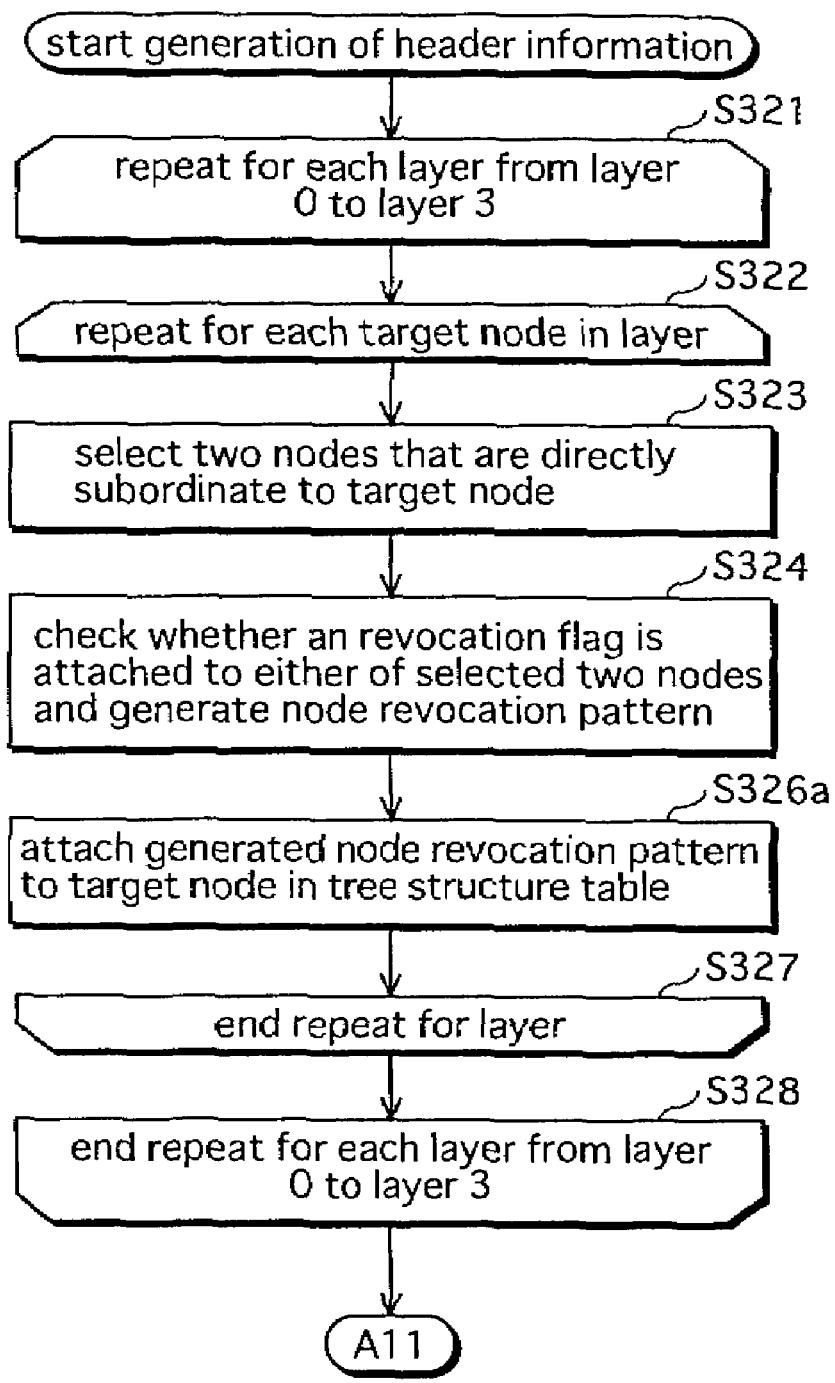
FIG. 31 is a flowchart, which continues in FIG. 32, of operations for generating header information.
Figure 32:
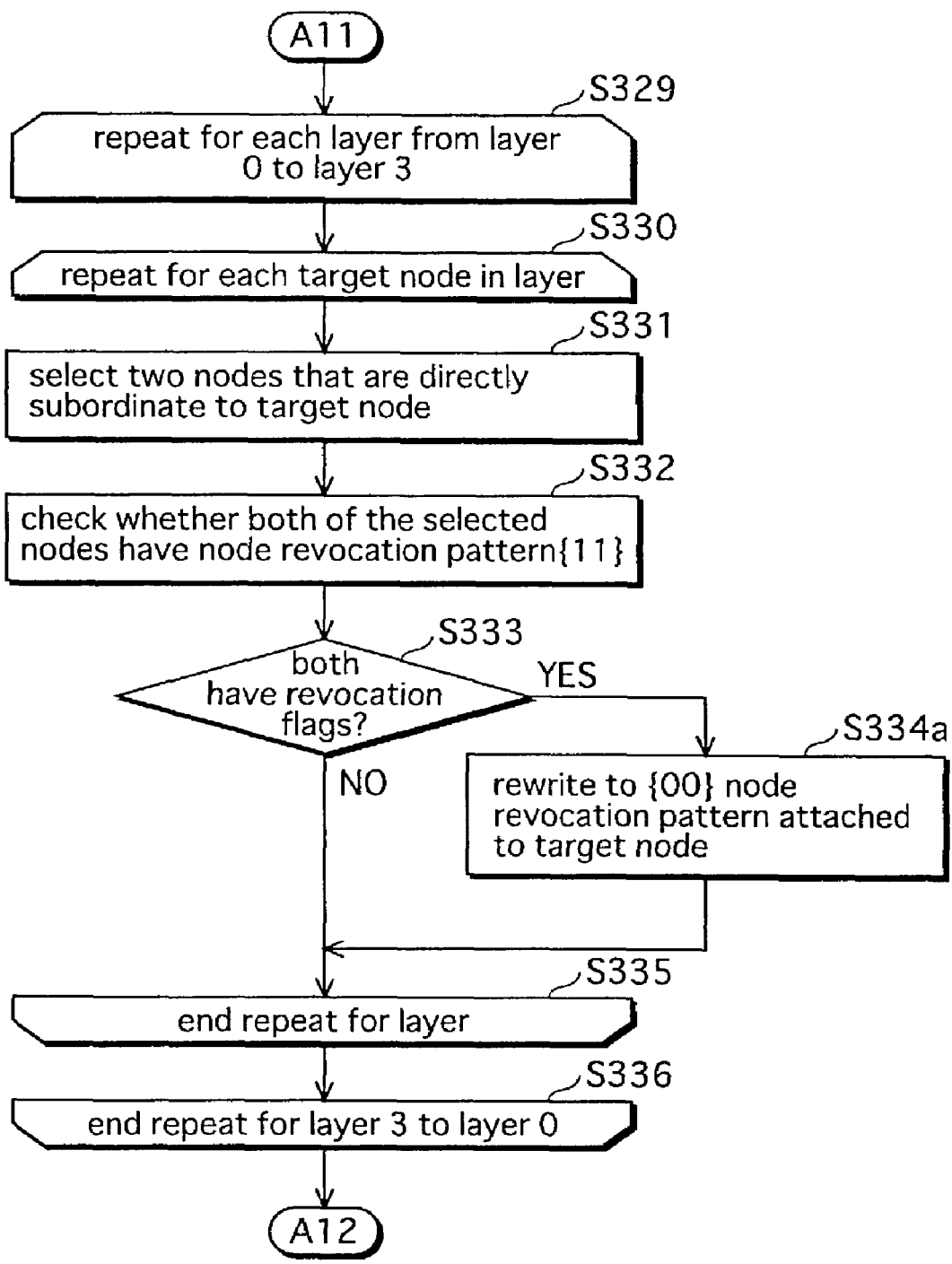
FIG. 32 is a flowchart, which continues in FIG. 33, of operations for generating header information.
Figure 33:
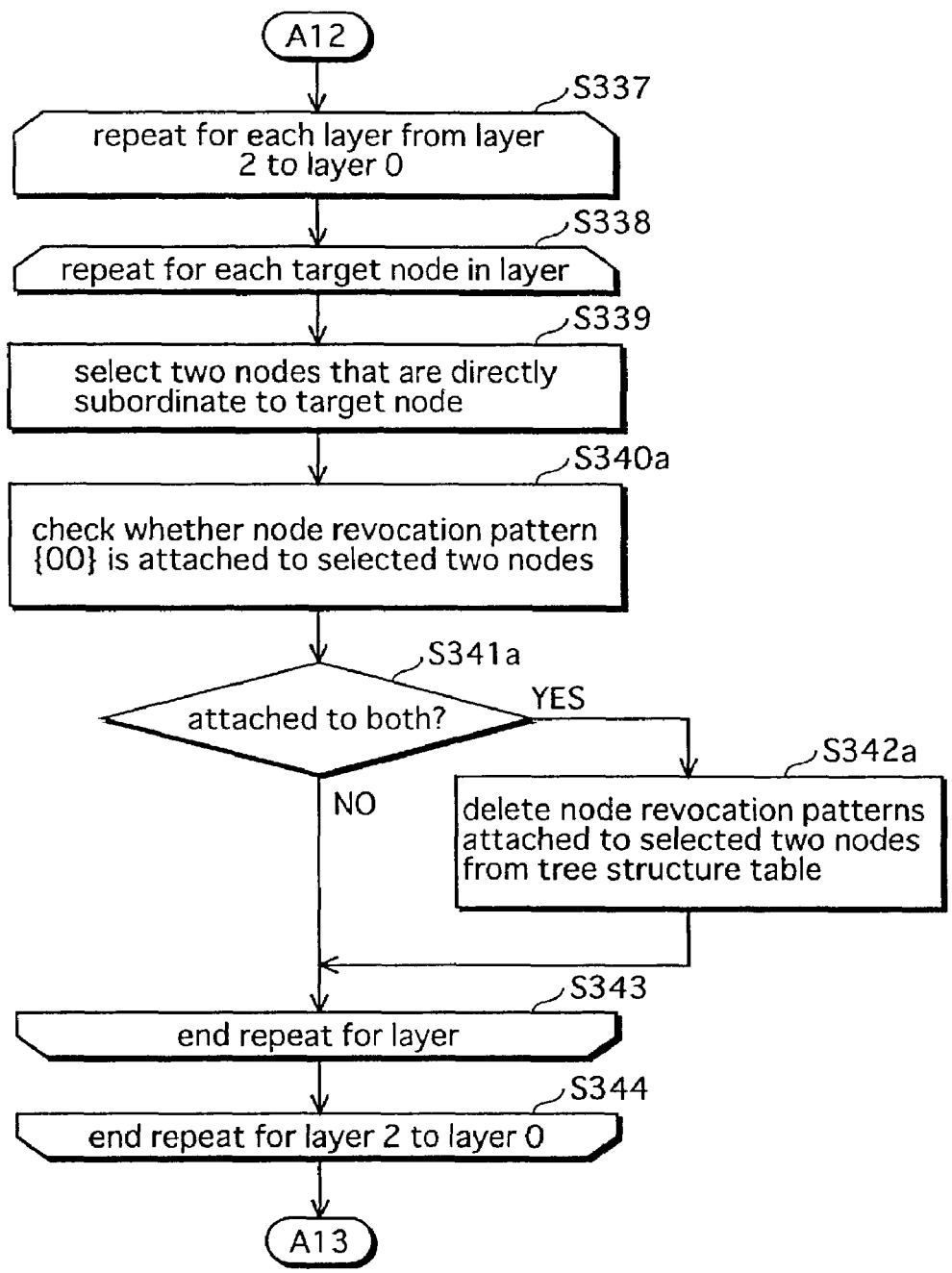
FIG. 33 is a flowchart, which continues in FIG. 34, of operations for generating header information.
Figure 34:
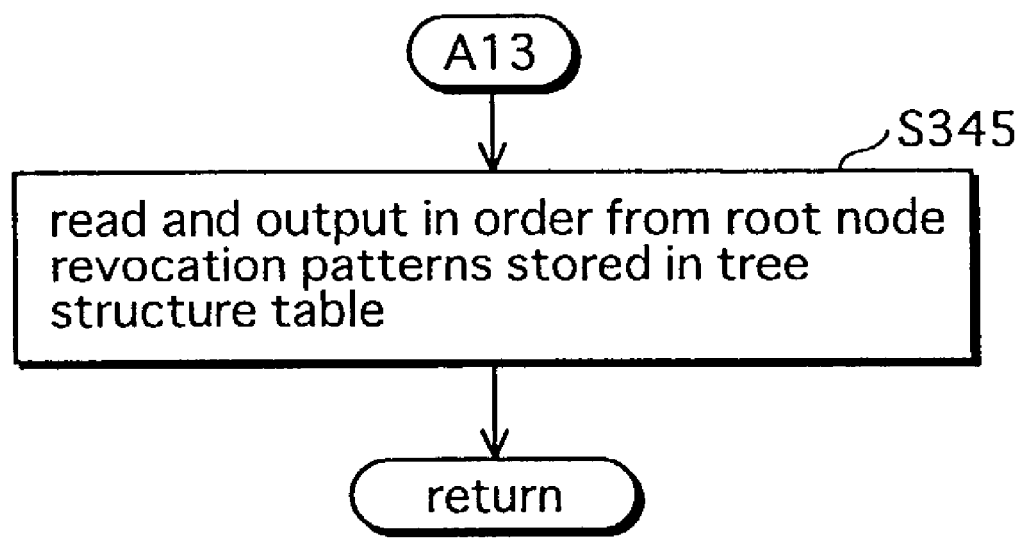
FIG. 34 is a flowchart, which continues from FIG. 33, of operations for generating header information.

The key information generation unit 107 generates, as one example, key information D800 shown in FIG. 30. The key information D800 includes three encrypted media keys. The encrypted media keys are generated by encrypting the media key with use of device keys KeyG, KeyL, and IK11 respectively.

The position in which each of the plurality of encrypted media keys is stored in the key information D800 is set. As shown in FIG. 30, the encrypted media keys E1 (Key G, media key), E1 (Key L, media key) and E1 (IK11, media key) are arranged respectively in positions defined by "0", "1" and "2" in the key information D800.

3.1.2 Recording Apparatus 300a

The recording apparatus 300a in the digital work protection system 10c has a similar structure to the recording apparatus 300 described in the first embodiment. Here, the features of the recording apparatus 300a that differ from the recording apparatus 300 are described.

(1) Specification Unit 303

The specification unit 303 specifies the position X of one encrypted media key in the key information, by checking the pieces of header information sequentially from the top, with use of the ID information and the header information. Note that details of the operations for specifying the position X of the encrypted media key are described later.

3.2 Operations of the Digital Work Protection System 10c

The following description focuses on the features of the operations of the digital work protection system 10c that differ from the digital work protection system 10.

3.2.1 Operations for Generating Header Information

Here, the flowcharts shown in FIG. 31 to FIG. 34 are used to describe operations by the key information header generation unit 106 for generating header information. Note that the operations described here are details of step S153 in the flowchart in FIG. 11.

The key information header generation unit 106 performs steps S322 to S327 for each layer from layer 0 to layer 3, and further performs steps S323 to S326a for each target node in each layer.

The key information header generation unit 106 selects the two directly subordinate nodes of the target node (step S323), checks whether each of the two selected nodes has a revocation flag attached thereto or not, to generate an NRP (step S324), and attaches the NRP to which the extension bit has been attached to the node information in the tree structure table that corresponds to the target node (step S326a).

In this way, after repetition of steps S321 to S328 has ended, an NRP has been attached to each piece of node information in the same way as described in the first embodiment.

Next, the key information header generation unit 106 performs steps S330 to S335 for each layer from layer 3 to layer 0, and further performs steps S331 to S334a for each target node in each layer.

The key information header generation unit 106 selects the two subordinate nodes of the target node (step S331), and checks whether each of the two selected nodes has an NRP {11} attached thereto or not. Note that when the selected two nodes are leaves, the key information header generation unit 106 checks whether both the selected nodes have revocation flags attached thereto (step S332).

Only when both the selected subordinate nodes have NRPs {11} attached thereto, or in the case of the two selected subordinate nodes being leaves, only when both the selected subordinate nodes have revocation flags attached thereto (step S333), the key information header generation unit 106 rewrites the NRP attached to the target node to {00} (step S334a).

When the key information header generation unit 106 has finished repeating the steps S329 to S336 in this way, {00} is attached to the superordinate node of the two subordinate nodes having NRPs {11}.

Next, the key information header generation unit 106 performs steps S338 to S343 for each layer from layer 2 to layer 0, and further performs steps S339 to S342a for each target node in each layer.

The key information header generation unit 106 selects the two subordinate nodes of the target node (step S339), and checks whether each of the two selected nodes have a revocation pattern {00} attached thereto or not (step S340a).

Only when both the selected subordinate nodes have revocation patterns {00} attached thereto (step S341a) the key information header generation unit 106 deletes the respective NRPs attached to the selected two subordinate nodes from the tree structure table (step S342a).

Next, the key information header generation unit 106 reads and outputs the NRPs stored in the tree structure table in order (step S345).

In this way, when an NRP is {00}, an NRP is generated that shows that all the user apparatuses assigned to the descendant nodes of the node are revoked apparatuses.

3.2.2 Operations for Specifying Key Information

Figure 35:
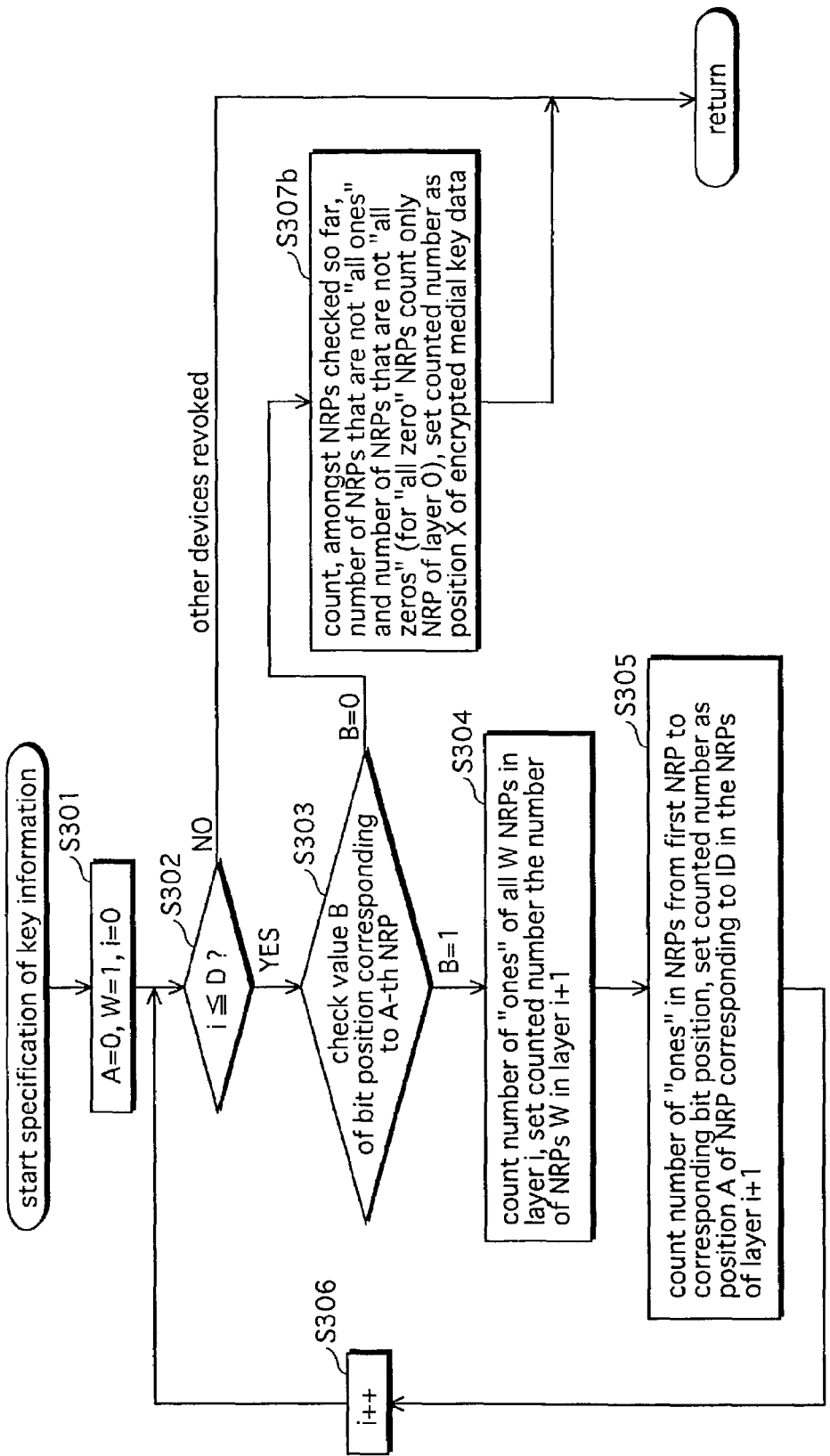
FIG. 35 is a flowchart showing operations by the specification unit 303 in the recording apparatus 300a for designating one encrypted media key from amongst key information stored in the recording medium 500b.

Here, the flowchart shown in FIG. 35 is used to describe operations by the specification unit 303 in the recording apparatus 300a for specifying one encrypted media key from the key information stored on the recording medium 500b. Note that the operations described here are the details of step S172 in the flowchart shown in FIG. 11.

Note that the operations by the specification unit 303 for specifying an encrypted media key are similar to those described in the first embodiment, therefore following description centers on the features of the operations that differ to the first embodiment.

When value B=0 (step S303), the specification unit 303 counts the number of NRPs, amongst the NRP checked so far, whose bits-se do not all have the value "1" and do not all have the value "0". Note that the number of NRPs whose bits are all "0" are counted for layer 0 only. The specification unit 303 sets the counted value in the variable X. The variable X obtained in this way shows the position of the encrypted media key. Furthermore, the variable i at this point is the piece of device key identification information that identifies the device key (step S307b). The specification unit 303 then ends the processing.

3.2.3 Specific Example of Operations for Specifying Key Information

The following describes one specific example of operations by the non-revoked user apparatus 10 shown in FIG. 28 up to specifying an encrypted media key with use of the header information and the key information shown in FIGS. 29 and 30. Here it is supposed that the user apparatus 10 has been assigned ID information "1001", and device keys "KeyA", "KeyC", "KeyF", "KeyL" and "IK10".

<Step 1> Since the value of the top bit of the ID information "1001" assigned to the user apparatus 10 is "1", the specification unit 303 checks the right bit of the first NRP {11} (step S303).

<Step 2> Since the value of right bit of the first NRP {11} is "1", the specification unit 303 continues analyzing (step S303, B=1).

<Step 3> The specification unit 303 counts the number of "ones" in the NRP {11} in layer 0. Since the counted value is "2", the specification unit 303 knows that there are two NRPs in the next layer 1 (step S304).

<Step 4> The specification unit 303 counts the number of "ones" in the NRPs up to the corresponding bit position. Note that the value of the corresponding bit position is not counted. Since the counted value is "1", the corresponding NRP in the next layer 1 is in position 1 in layer 1 (step S305).

<Step 5> Next, since the value of the second highest bit of the ID information "1001" is "1", the specification unit 303 checks the right bit of the first NRP {10} in layer 1 (step S303).

<Step 6> Here, since the value of the right bit of the first NRP {10} in layer 1 is "0", the specification unit 303 ends analyzing (step S303, B=1).

<Step 7> The specification unit 303 counts the number of "ones" in the two NRPs in layer 1. Note that the NRP {00} is not counted. Since the counted value is "1", the specification unit 303 knows that there is one NRP in the next layer 2 (step S304).

<Step 8> The specification unit 303 counts the number of "ones" in the NRP up to the corresponding bit position. Note that the value of the corresponding bit position is not counted. Since the counted value is "0", the position of the corresponding NRP in the next layer 2 is position 0 in layer 2 (step S305).

<Step 9> Since the value of third bit of the ID information "1001" is "0", the specification unit 303 checks the left bit of the two lower bits of the NRP {001} in the position 0 in layer 2 (step S303).

<Step 10> Here, since the value of the left bit of the lower two bits of the 0-th NRP {01} in layer 2 is "0", the specification unit 303 ends analyzing (step S303, B=0).

<Step 11> The specification unit 303 counts the number of NRPs whose bits do not all have the value "1", from amongst the NRPs analyzed so far. Note that the NRP that was checked last is not counted. Since the counted value is "1", the position of the encrypted media key is position 1 in the key information.

<Step 12> As shown in FIG. 30, the encrypted media key stored in position 1 in the key information is E1(KeyL, media key).

The user apparatus 10 has the KeyL. Accordingly, the user apparatus 10 is able to obtain the media key by decrypting the encrypted media key using the KeyL.

4. Fourth Embodiment

In the first embodiment NRPs are arranged in order from the top layer to the bottom layer, and NRPs of the same layer are arranged in order from left to right.

In the fourth embodiment a description is given of a digital work protection system 10d (not illustrated) that outputs NRPs in another order.

4.1 Structure of Digital Work Protection System 10d

The digital work protection system 10d has a similar structure to the digital work protection system 10. Here the features of the digital work protection system 10d that differ from the digital work protection system 10 are described.

4.1.1 Key Management Apparatus 100

The key management apparatus 100 of the digital work protection system 10d has a similar structure to that described in the first embodiment. Here the features of the key management apparatus 100 in the second embodiment that differ from the key management apparatus 100 in the first embodiment are described.

(1) Tree Structure Storage Unit 102

Specifically, the tree structure storage unit 102 is composed of a hard disk unit, and, as shown in FIG. 37, has a tree structure table D1000 shown in FIG. 37 as one example.

Figure 36:
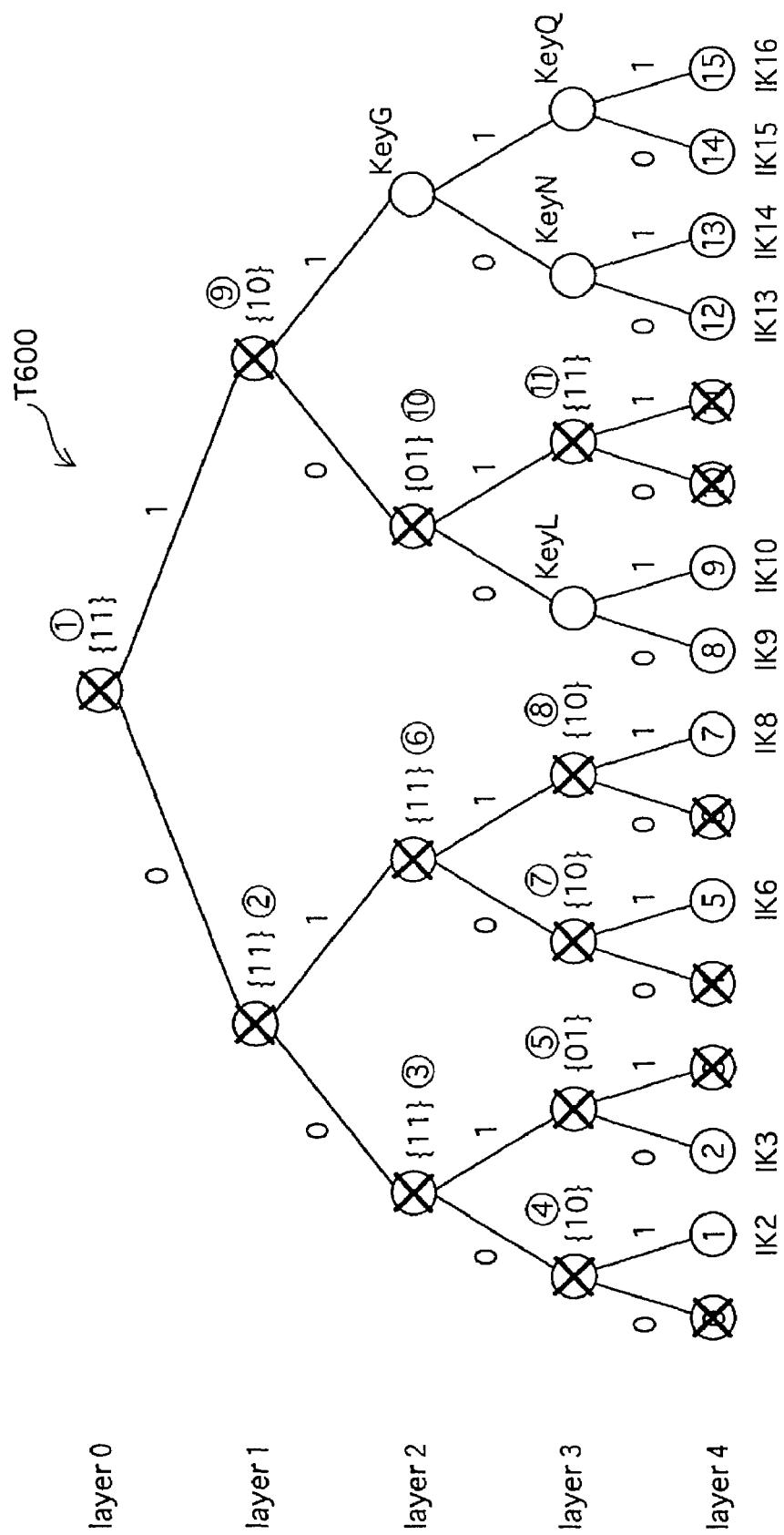
FIG. 36 is a tree structure showing how a plurality of NRPs are arranged in a fourth embodiment.

The tree structure table D1000 corresponds to a tree structure T600 shown in FIG. 36 as one example, and is a data structure for expressing the tree structure T600. As is described later, the data structure for expressing the tree structure T600 is generated by the tree structure construction unit 101 as the tree structure table D1000, and written to the tree structure storage unit 102.

<Tree Structure T600>

The tree structure T600, as shown in FIG. 36, is a binary tree that has five layers: layer 0 through to layer 4.

The number of nodes included in each layer is the same as the tree structure T100. Furthermore, the numbers assigned to the paths from the node on the upper side through to the nodes on the lower side are the same as in the tree structure T100. Nodes marked with a cross (X) are revoked nodes.

The node name of the node that is the root of the tree structure T600 is blank. The node names of the other nodes are the same as in the tree structure T100.

Each node name is a four-digit expression. The node name of the node that is the root is four blanks. A node name "0" is specifically the character "0"+one blank+one blank+one blank. A node name "00" is the character "0"+the character "0"+one blank+one blank. A node name "101" is the character "1"+the character "0"+the character "1"+one blank. The node name "1111" is the character "1"+the character "1"+the character "1"+the character "1". The other node names are formed similarly.

In the tree structure T600, "{10}" and the like near each node show NRPs. Furthermore, numbers in circles near each node show the order in which the NRPs are output.

<Tree Structure Table D1000>

The tree structure table D1100 includes a number of pieces of node information equal to the number of nodes in the tree structure T1000. Each piece of node information corresponds to one of the nodes in the tree structure T1000.

Each piece of node information includes a device key and a revocation flag. Node names, device keys and revocation flags are the same as in the tree structure table D100, therefore a description thereof is omitted here.

Each piece of node information is stored in the tree structure table D1100 in an order shown by the following Order Rule 2. This Order Rule 2 is applied when node information is read sequentially from the tree structure table D1000 by the recording apparatuses 300a etc. and the reproduction apparatuses 400a etc.

(a) The piece of node information corresponding to the node that is the root is stored at the top of the tree structure table D1000.

(b) After a piece of node information corresponding to a particular node is stored in the tree structure table D1000, when the node has two subordinate nodes, the node information is arranged in the following manner. Pieces of node information that respectively correspond to each of the left node of the two subordinate nodes and all the further subordinate left nodes on the same path are stored. Then, pieces of node information that respectively correspond to the right node of the two subordinate nodes and all the further right nodes subordinate to the right node are stored.

(c) Within (b), (b) is re-applied.

Specifically, the pieces of node information in the tree structure table D1000 shown in FIG. 37 are stored in the following order:

blank (showing the root), "0", "00", "000", "0000", "0001", "001", "0010", "0011", "01", "010", . . . , "11", "110", "1100", "1101", "111", "1110", and "1111".

(2) Tree Structure Construction Unit 101

The tree structure construction unit 101, as described below, constructs an n-ary data structure for managing device keys, and stores the constructed tree structure in the tree structure storage unit 102. Here, n is an integer equal to or greater than 2. As an example, n=2.

Details of operations by the tree structure construction unit 101 for constructing the tree structure and storing the constructed tree structure to the tree structure storage unit 102 are described later.

The tree structure construction unit 101 generates a device key for each node in the tree structure with use of a random number, and writes each generated device key in correspondence with the respective node to the tree structure table.

(3) Key Information Header Generation Unit 106

The key information header generation unit 106 generates a plurality of NRPS, and outputs the generated NRPs to the key information recording apparatus 200 as header information. Details of operations for generating the NRPs are described later.

Figure 38:
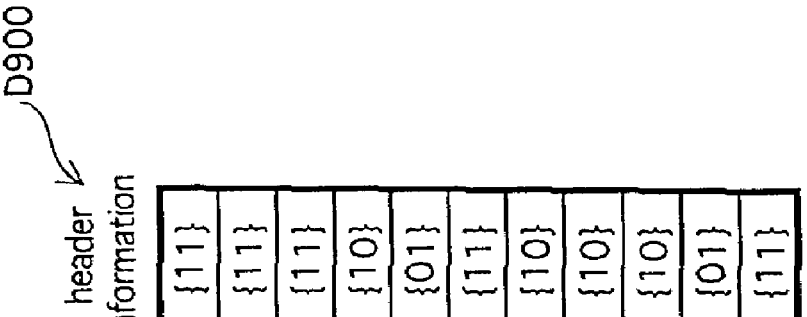
FIG. 38 shows an example of the data structure of header information D900.

One example of the header information generated by the key information header generation unit 106 is shown in FIG. 38. Header information D900 shown in FIG. 38 is composed of NRPs {11}, {11}, {10}, {01}, {11}, {10}, {10}, {10}, {01}, {11}, which are included in the header information D900 is the stated order.

Note that the position in the header information D900 in which each of the node information patterns is positioned is set. As shown in FIG. 38, the NRPs {11}, {11}, {11}, {10}, {01}, {11}, {10}, {10}, {10}, {01}, {11} are arranged in positions defined by "0", "1", "2", "3", "4", "5", "6", "7", "8", "9" and "10" respectively in the header information D900.

(4) Key Information Generation Unit 107

The key information generation unit 107 generates encrypted media keys by encrypting the media key using each device key that corresponds to a non-revoked node, in the same order that the pieces of node information are stored in the above-described tree structure table, and outputs the generated encrypted media keys as key information.

The following shows one example of the key information generated and then output by the key information generation unit 107.

The key information is composed of encrypted media keys E1(IK2, media key), E1(IK3, media key), E1(IK6, media key), E1(IK8, media key), E1(KeyL, media key) and E1(KeyG, media key), which are generated by encrypting the media key with use of device keys "IK2", "IK3", "IK6", "IK8", "KeyL" and "KeyG" respectively. The encrypted media keys E1(IK2, media key), E1(IK3, media key), E1(IK6, media key), E1(IK8, media key), E1(KeyL, media key) and E1(KeyG, media key) are arranged in the key information in positions defined by "0", "1", "2", "3", "4", "5" and "6" respectively.

4.1.2 Recording Apparatus 300a

The recording apparatus 300a of the digital work protection system 10d has a similar structure to that described in the first embodiment. Here the features of the recording apparatus 300a in the second embodiment that differ from the first embodiment are described.

(1) Specification Unit 303

The specification unit 303 specifies the position X in the key information of one encrypted media key by checking the pieces of header information sequentially from the top, with use of the read ID information and the read header information. Note that details of the operations for specifying the position X of the encrypted media key are described later.

4.2 Operations of the Digital Work Protection System 10d

The following description focuses on the features of the operations of the digital work protection system 10d that differ from the digital work protection system 10.

4.2.1 Operations for Constructing and Storing the Tree Structure

Figure 39:
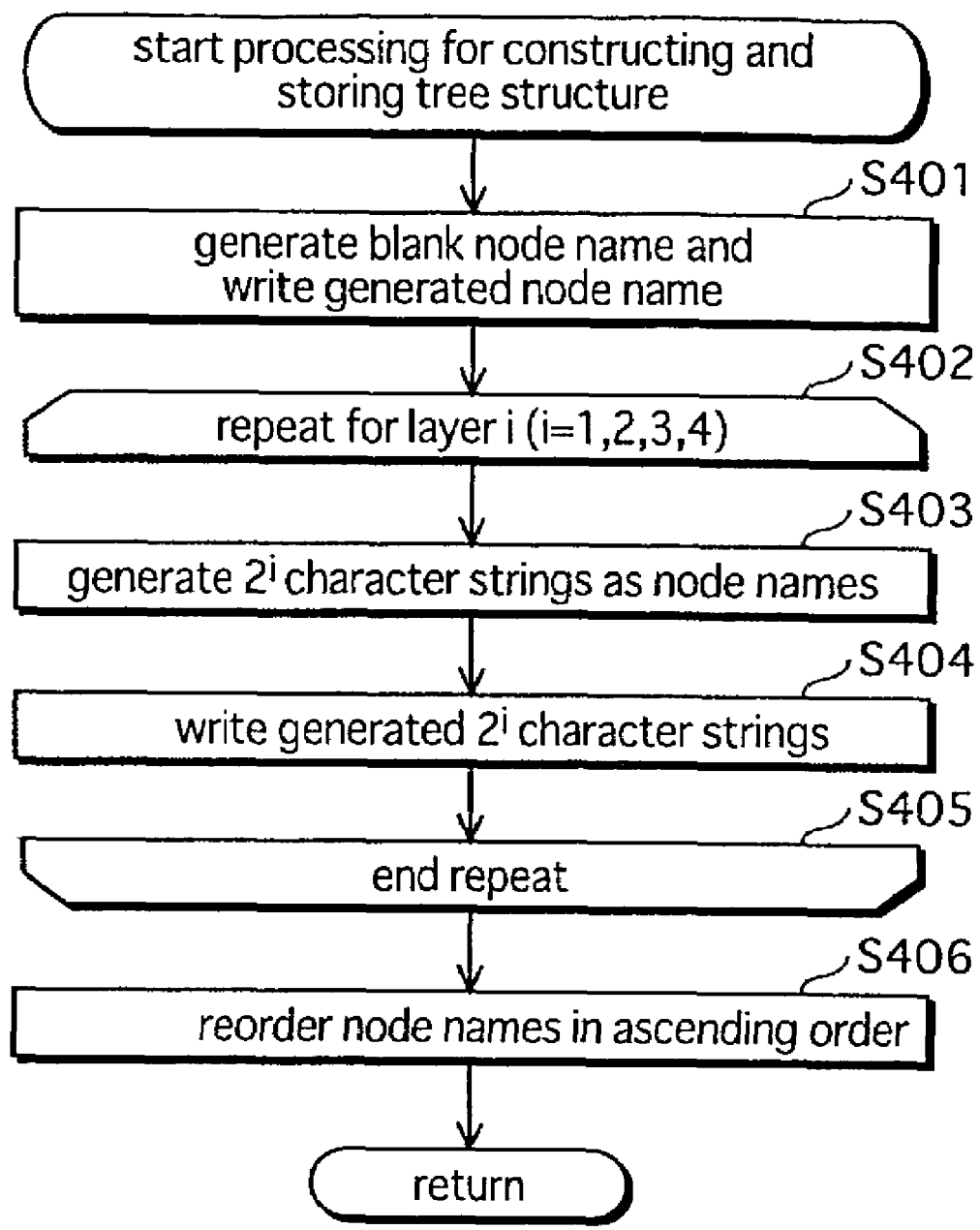
FIG. 39 is a flowchart showing operations by the tree structure construction unit 101 for generating a tree structure table, and writing the generated tree structure table to the tree structure storage unit 102.

Here, the flowchart in FIG. 39 is used to describe operations by the tree structure construction unit 101 for generating the tree structure table and writing the tree structure table to the tree structure storage unit 102. Note that the operations described here are details of step S101 in the flowchart in the FIG. 10.

The tree structure construction unit 101 generates a piece of node information that includes a blank node name, and writes the generated piece of node information to the tree structure data table (step S401).

Next, the tree structure construction unit 101 repeats the following steps S403 to S404 for layer i (i=1, 2, 3, 4).

The tree structure construction unit 101 generates $2^i$ character strings as a node names. Specifically, when i=1, the tree structure construction unit 101 generates $2^1=2$ character strings "0" and "1". When i=2, the tree structure construction unit 101 generates $2^2=4$ character strings "00", "01", "10" and "11". When i=3, the tree structure construction unit 101 generates $2^3=8$ character strings "000", "001", "010", . . . and "111". When i=4, the tree structure construction unit 101 generates $2^4=16$ character strings "0000", "0001", "0010", "0011" and "1111" (step S403). Next, the tree structure construction unit 101 writes pieces of node information, each of which includes one of the generated node names, to the tree structure table (step S404).

Next, the tree structure construction unit 101 rearranges the pieces of node information in the tree structure table in ascending order of node name, and overwrites pieces of node information in the tree structure table with the newly arranged pieces of node information (step S406).

In this way, a tree structure table is generated such as the example shown in FIG. 37. The generated tree structure table D1100 includes the pieces of node information in the above described Order Rule 2. Note that at this stage device keys have not yet been recorded in the tree structure table D1000.

4.2.2 Operations for Generating Header Information

Figure 40:
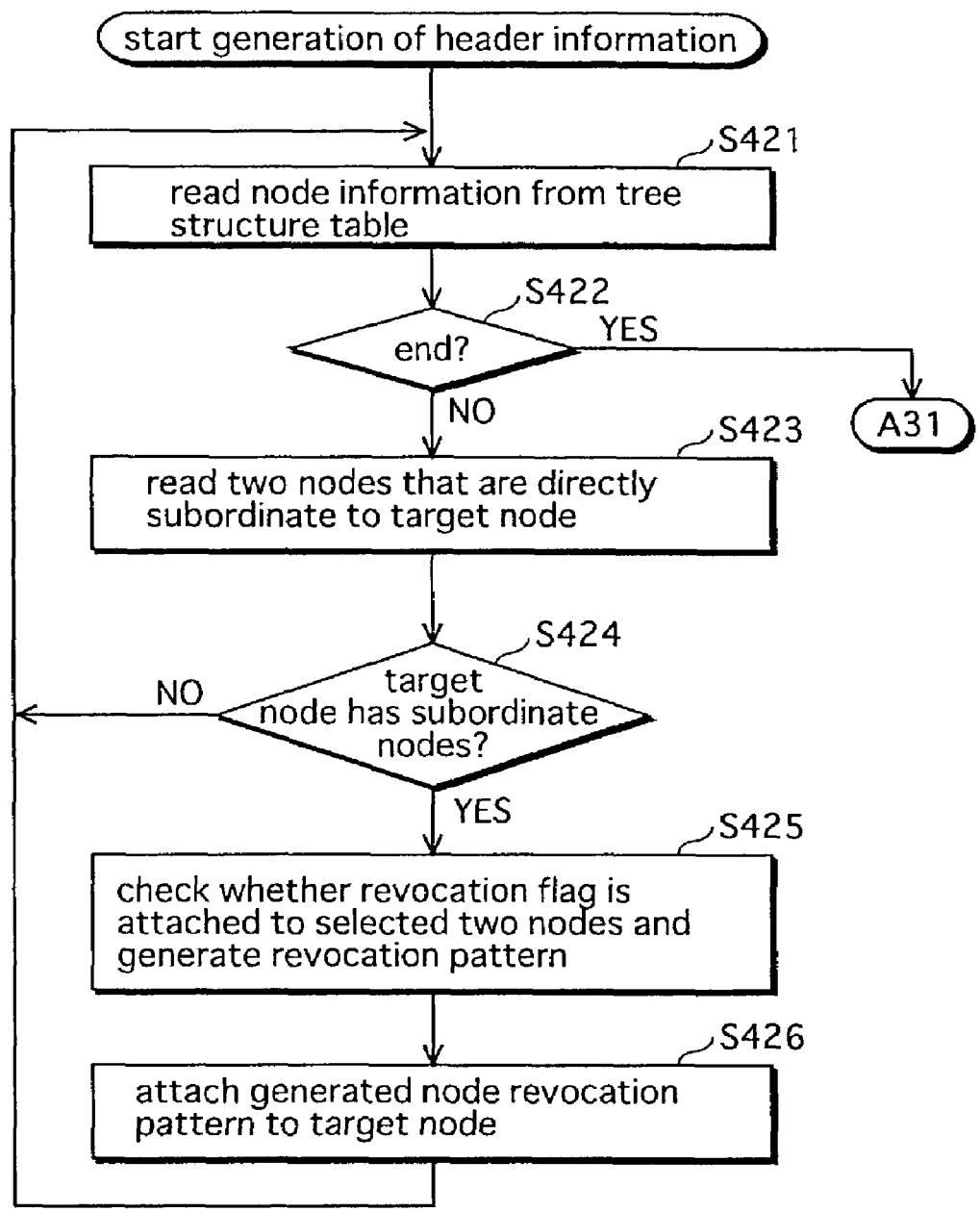
FIG. 40 is a flowchart, which continues in FIG. 41, showing operations by the key information header generation unit 106 for generating header information.
Figure 41:
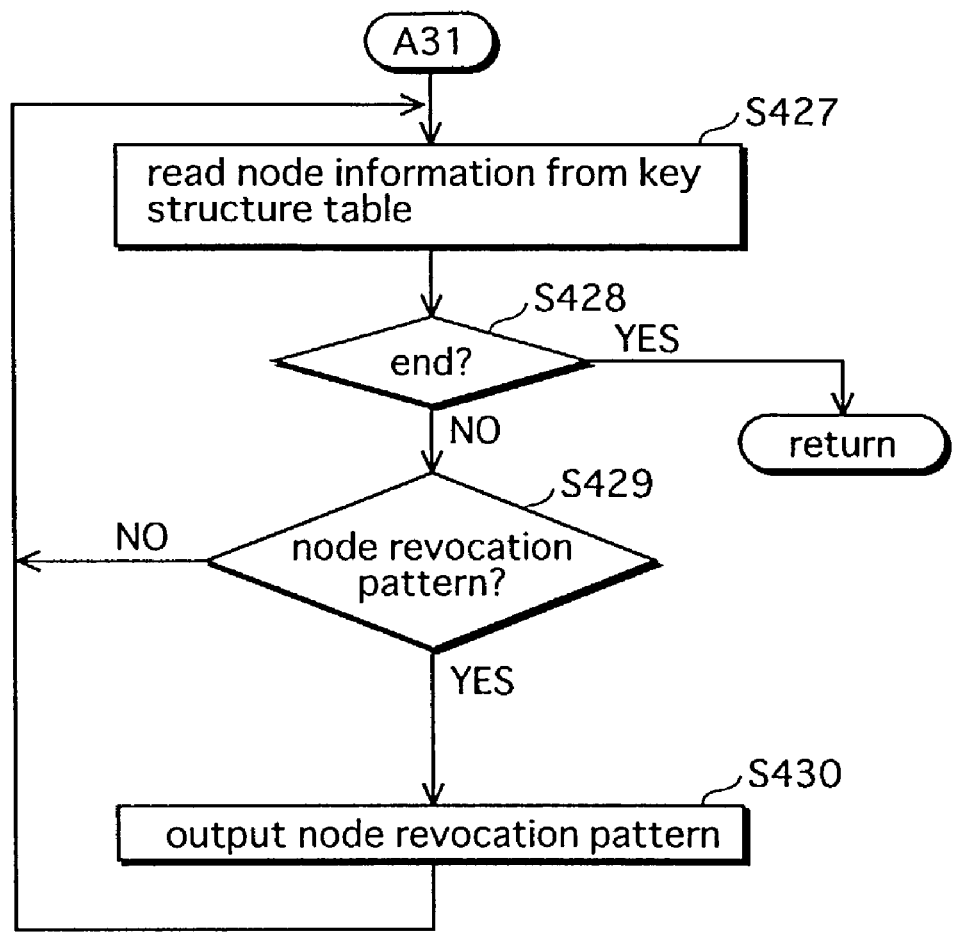
FIG. 41 is a flowchart, which continues from FIG. 40, showing operations by the key information header generation unit 106 for generating header information.

Here, the flowcharts in FIG. 40 and FIG. 41 are used to describe operations by the key information header generation unit 106 for generating header information. Note that the operations described here are the details of step S153 in the flowchart in FIG. 11.

The key information header generation unit 106 tries to read one piece of node information at a time from the tree structure table according to Order Rule 2 (step S421).

On detecting that it has finished reading all the pieces of node information (step S422), the key information header generation unit 106 proceeds to step S427.

When the key information header generation unit 106 does not detect that it has finished reading all the pieces of node information, but instead is able to read a piece of node information (step S422), the key information header generation unit 106 reads the two pieces of node information that correspond to the two subordinate nodes of the target node that corresponds to the read node information (step S423).

When the target node has subordinate nodes (step S424), the key information header generation unit 106 checks whether the read two pieces of node information corresponding to the two subordinate nodes have revocation flags attached thereto, and generates an NRP (step S425). Then, the key information header generation unit 106 adds the generated NRP to the read piece of node information corresponding to the target node (step S426), and returns to step S421 to repeat the processing.

When the target node does not have lower nodes (step S424), the key information header generation unit 106 returns to steps S421 to repeat the processing.

Next, the key information header generation unit 106 tries to read the pieces of node information from the tree structure table in order according to the Order Rule 2 (step S427).

On detecting that it has finished reading all the pieces of node information (step S422), the key information header generation unit 106 ends the processing.

When the key information header generation unit 106 does not detect that it has finished reading all the pieces of node information, but instead is able to read a piece of node information (step S428), the key information header generation unit 106 checks whether the read piece of node information has an NRP attached thereto, and if so (step S429), outputs the attached NRP (step S430). The key information header generation unit 106 then returns to step S427 to repeat the processing.

When the read piece of node information does not have an NRP attached thereto (step S429), the key information header generation unit 106 returns to step S427 to repeat the processing.

4.2.3 Operations for Specifying Key Information

Figure 42:
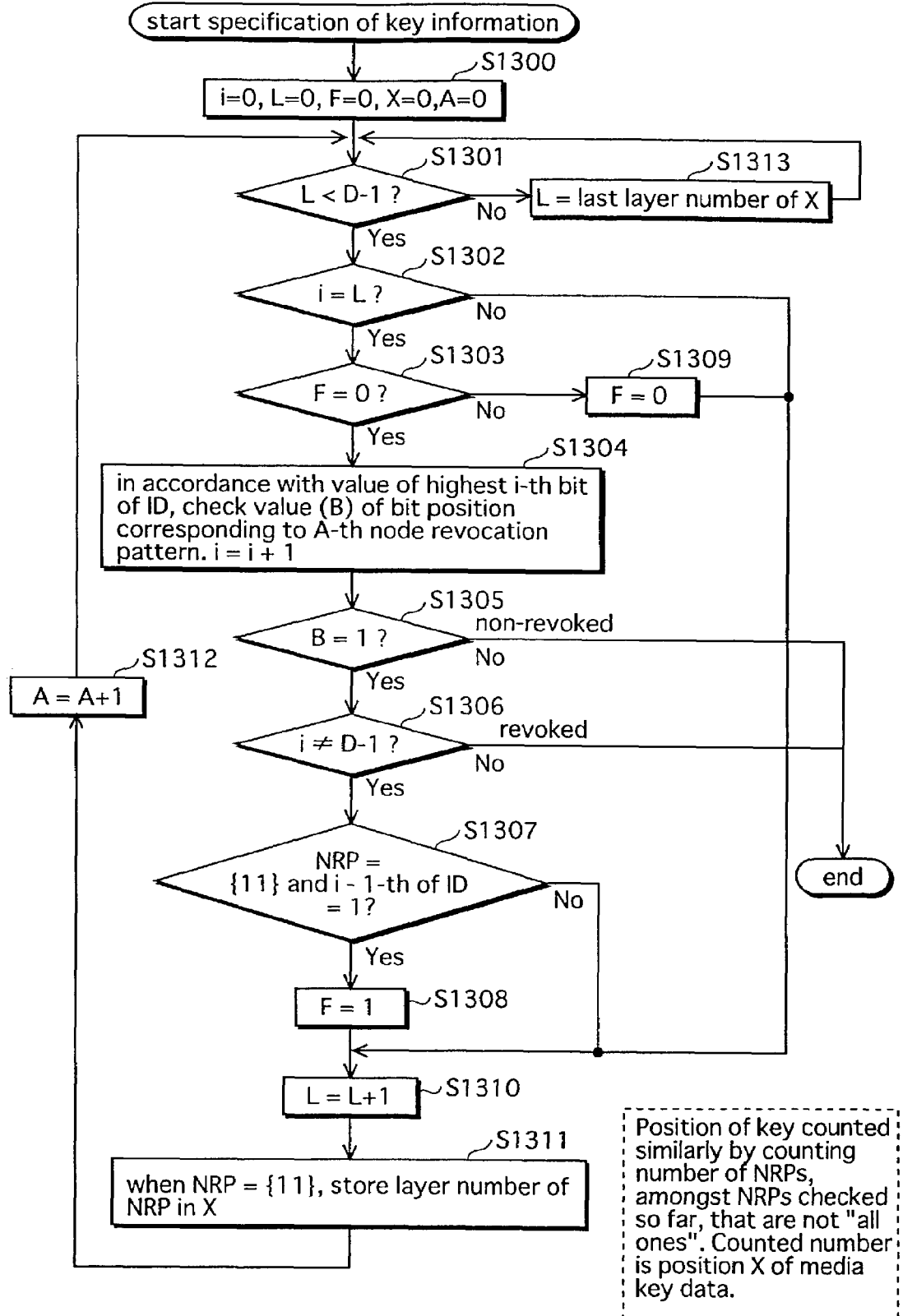
FIG. 42 is a flowchart showing operation by the specification unit 303 in the recording apparatus 300a for designating one encrypted media key from amongst key information stored in the recording medium 500b.
Figure 43:
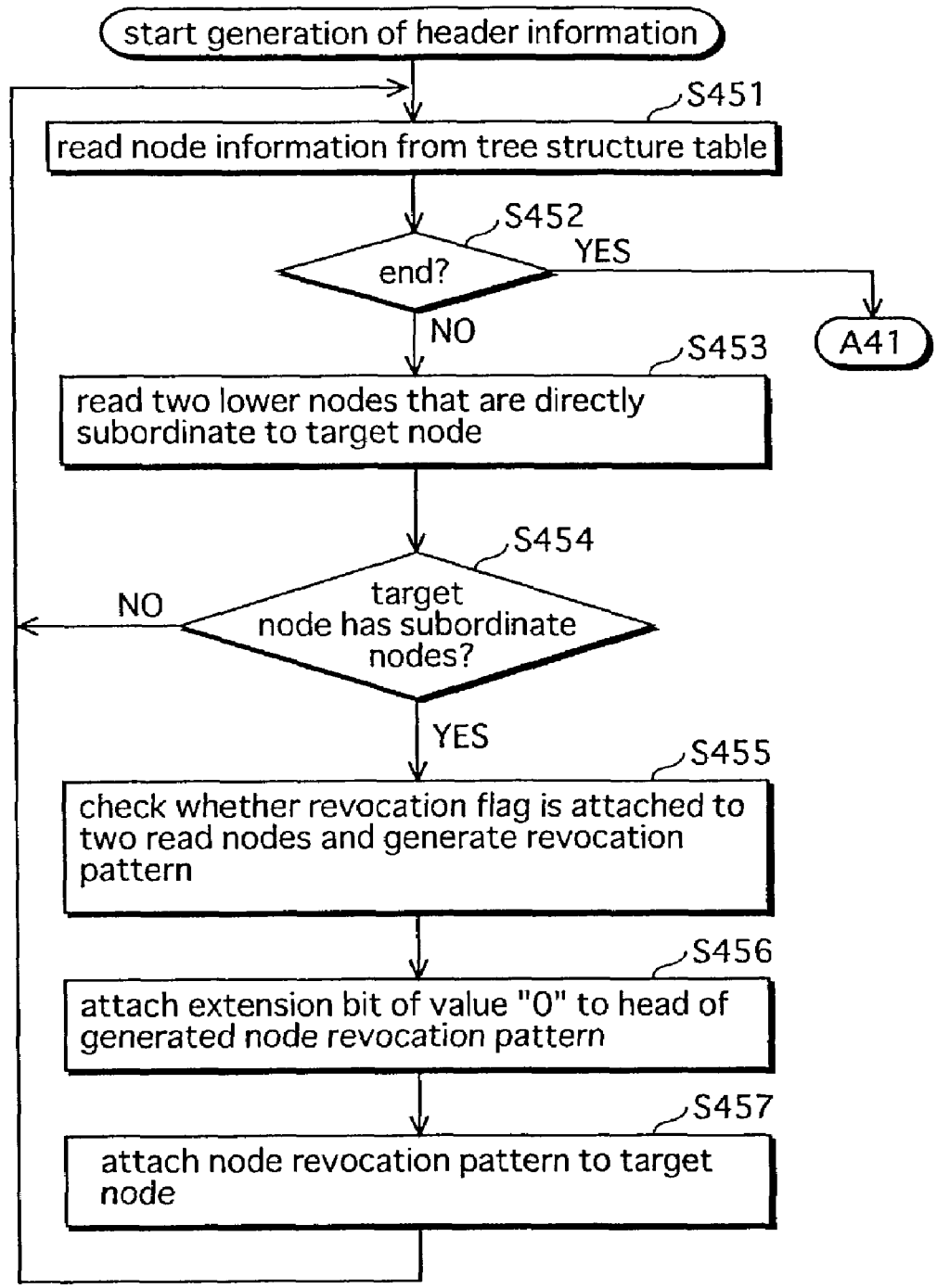
FIG. 43 is a flowchart, which continues in FIG. 44, showing operations by the key information header generation unit 106 for generating header information.
Figure 44:
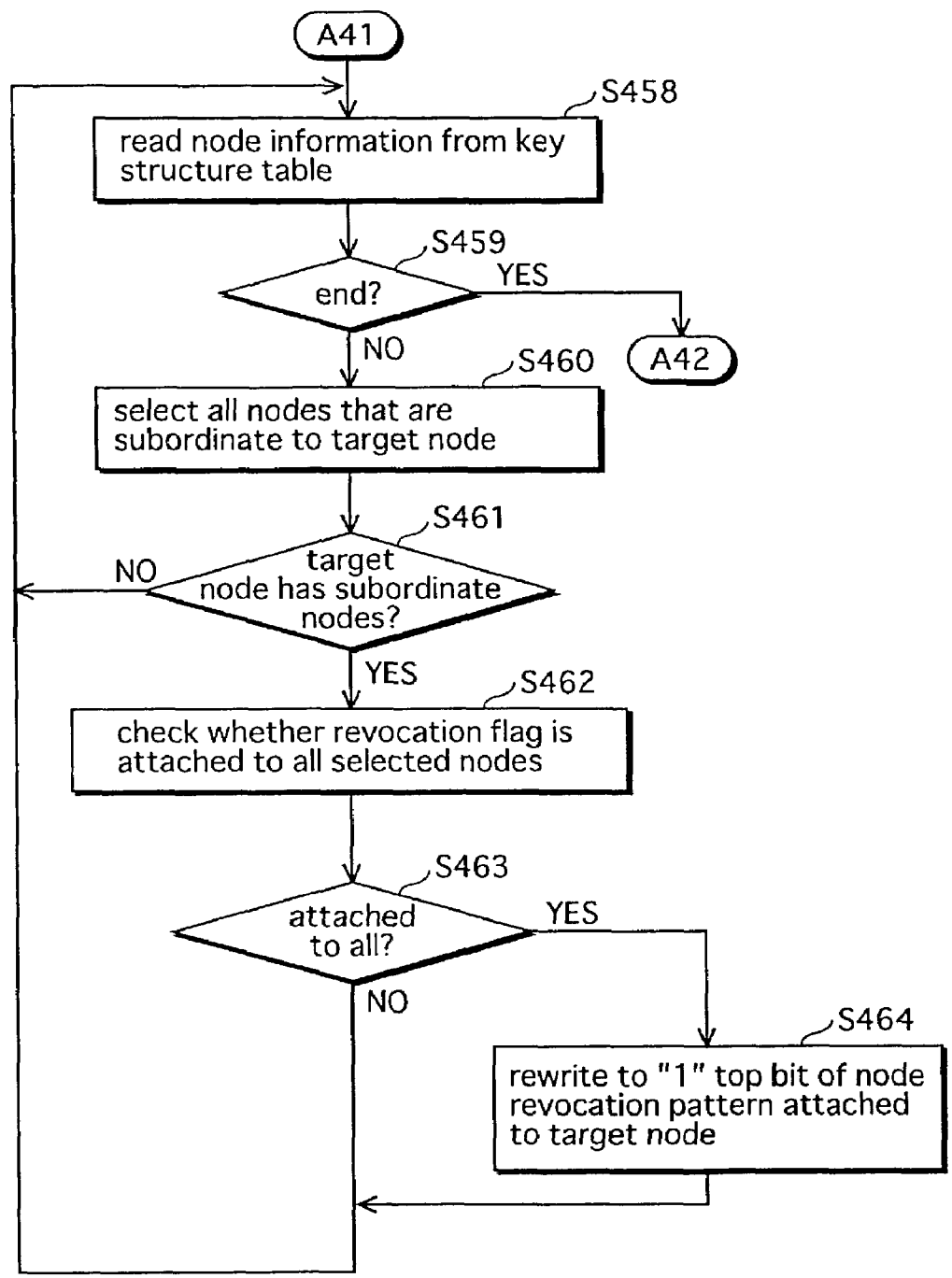
FIG. 44 is a flowchart, which continues in FIG. 45, showing operations by the key information header generation unit 106 for generating header information.
Figure 45:
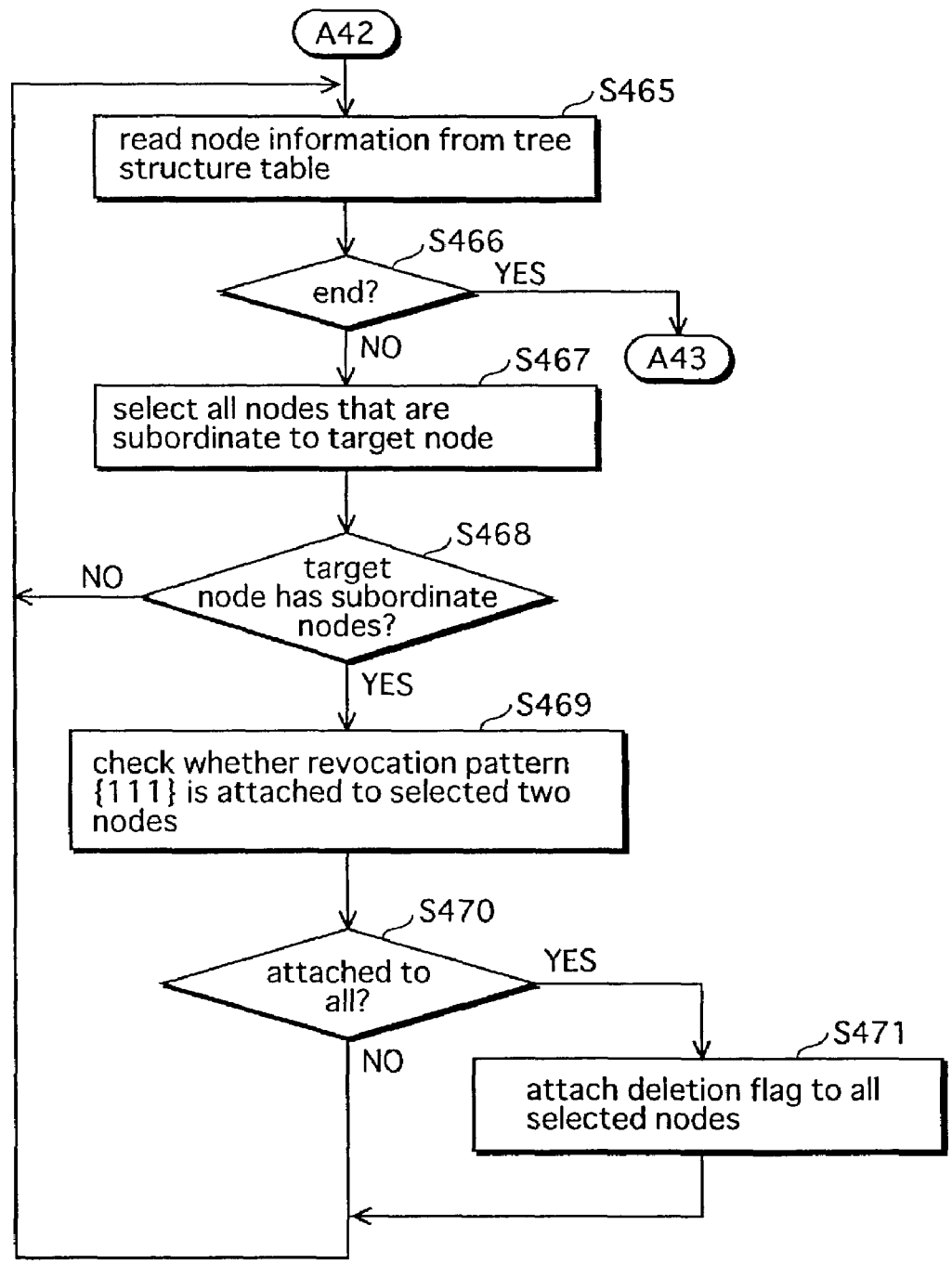
FIG. 45 is a flowchart, which continues in FIG. 46, showing operations by the key information header generation unit 106 for generating header information.
Figure 46:
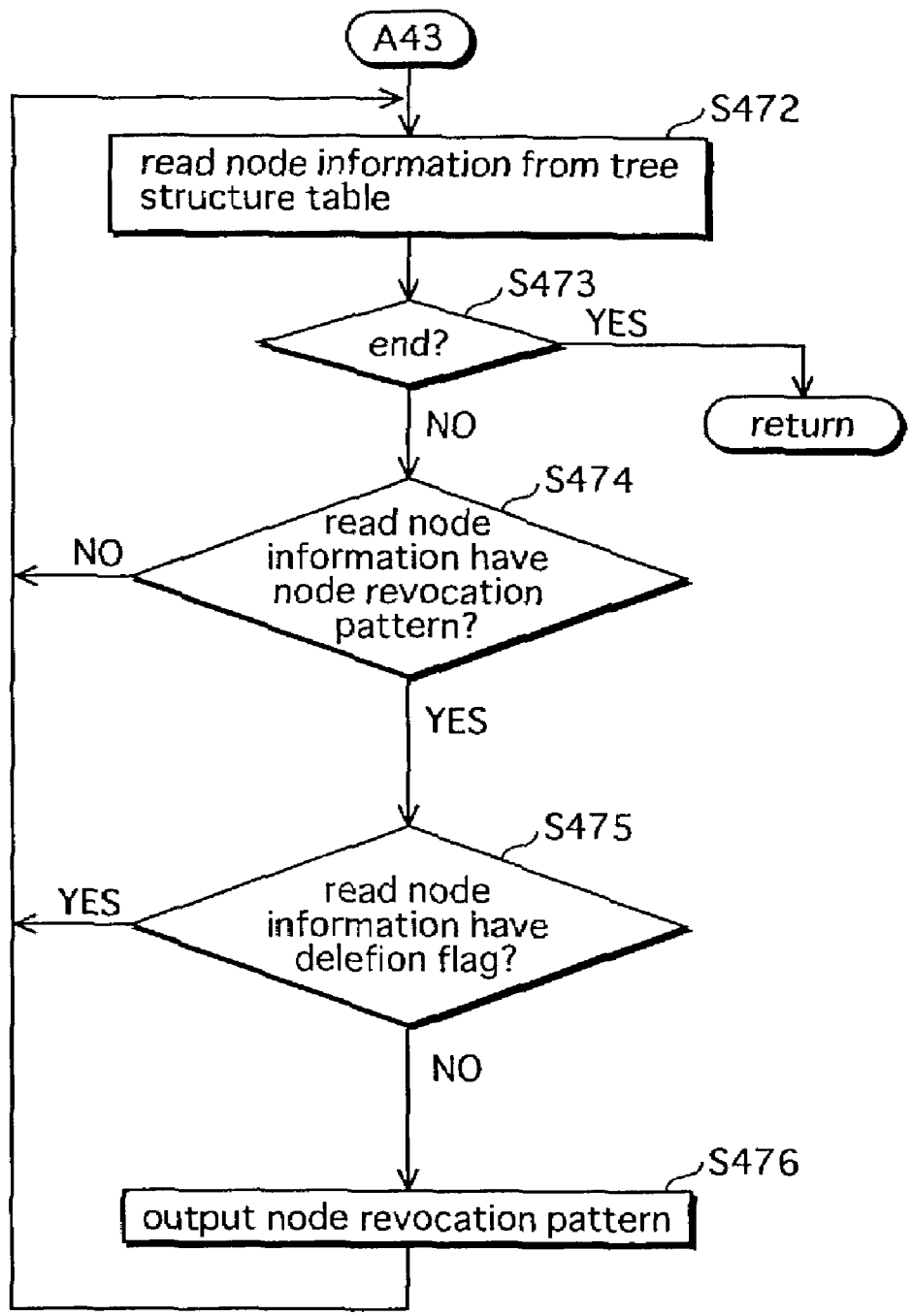
FIG. 46 is a flowchart, which continues from FIG. 45, showing operations by the key information header generation unit 106 for generating header information.

Here, the flowchart in FIG. 42 is used to describe operations by the specification unit 303 of the recording apparatus 300a for specifying an encrypted media key from the key information stored in the recording medium 500b. Note that the operations described here are the details of step S172 in the flowchart in FIG. 11.

Note also that operations performed by the specification unit 402 of the reproduction apparatus 400a are the same as those of the specification unit 303, and therefore a description thereof is omitted.

The specification unit 303 has a variable i, a variable L, a variable X, a flag F, a value D, and a pointer A. The variable i shows the bit position of ID information to be checked. The variable L shows the layer in which NRP currently being checked is included. The variable X stores the layer of the node at the point where paths diverge. The flag F (initial value F=0) is for judging whether to check an NRP. The value D shows the number of layers in the tree structure. The pointer A shows the position of the NRP to be checked.

The specification unit 303 sets variable i=0, variable L=0, flag F=0, variable X=0 and pointer A=0 (step S1300).

Next, the specification unit 303 judges whether the variable L is less than the number of layers D−1. When the variable L is greater than or equal to the number of layers D−1 (step S1301), the specification unit 303 inputs the last layer number of the variable X to the variable L. The variable X is a last-in first-out variable, and a value output therefrom is deleted. In other words, if layer 0, layer 2 and layer 3 are input to the variable X in order, layer 3 is output first and then deleted, and then layer 2 is output (step S1313). The specification unit 303 then returns to step S1301 to repeat the processing.

When the variable L is less than the number of layers D−1 (step S1301), the specification unit 303 judges whether variable i=variable L. When the variable i is not equal to the variable L (step S1302), the specification unit 303 proceeds to step S1310.

When variable i=variable L (step S1302), the specification unit 303 judges whether flag F=0. When the flag F is not equal to 0 (step S1303), the specification unit 303 sets the flag F to 0 (step S1309), and proceeds to step S1310.

When flag F=0 (step S1303), the specification unit 303 checks the value B of the bit position corresponding to the A-th NRP, according to the value of the top i-th bit of the ID information, and sets variable i=i+1 (step S1304).

Next, the specification unit 303 checks whether value B=1, and if not (step S1305), judges that the apparatus to which the ID information is assigned is not revoked, and ends the processing.

When value B=1 (step S1305), the specification unit 303 judges whether variable i≠D−1, and if the variable i is equal to 1 (step S1306), judges that the apparatus to which the ID information is assigned is revoked, and ends the processing.

Next, when variable i≠D−1 (step S1306), the specification unit 303 judges whether the NRP is {11} and the i−1-th value of the ID information is "1". When the judgement is negative (step S1307), the specification unit 303 proceeds to step S1310.

When the judgement is positive (step S1307), the specification unit 303 sets flag F=1 (step S1308), sets L=L+1 (step S1310), and if the NRP is {11}, the specification unit 303 stores the layer number of the NRP in the variable X (step S1311). Then the specification unit 303 sets A=A+1 (step S1312), and returns to step S1310.

5. Fifth Embodiment

In the fourth embodiment, NRPs are arranged according to Order Rule 2.

In the fifth embodiment described hereinafter a digital work protection system 10e (not illustrated) arranges and outputs NRPs according to the Order Rule 2 in the same manner as in the digital work protection system 10d in the fourth embodiment, while reducing the amount of data of the header information in the same manner as in the digital work protection system 10b described in the second embodiment when revoked apparatuses occur one-sidedly around a particular leaf.

5.1 Structure of the Digital Work Protection System 10e

The digital work protection system 10e has a similar structure to the digital work protection system 10d. Here, the features of the digital work protection system 10e that differ from the digital work protection system 10d are described.

5.1.1 Key Management Apparatus 100

The key management apparatus 100 of the digital work protection system 10e has a similar structure to the key management apparatus 100d described in the fourth embodiment. Here the features of the key management apparatus 100 that differ from the key management apparatus 100d are described.

(1) Tree Structure Storage Unit 102

The tree structure storage unit 102 has a tree structure table. The tree structure table in the tree structure storage unit 102 has the same structure as the tree structure table D1000 described in the fourth embodiment, with each piece of node information included in the tree structure table additionally including an NRP.

(2) Key Information Header Generation Unit 106

The key information header generation unit 106 generates a plurality of NRPs, and outputs the generated NRPs to the key information recording apparatus 200 as header information. Each NRP is composed of three bits as described in the second embodiment.

Details of operations for generating NRPs are described later.

5.1.2 Recording apparatus 300a

The recording apparatus 300a of the digital work protection system 10e has a similar structure to the recording apparatus 300a described in the fourth embodiment. Here the features of recording apparatus 300a that differ from the recording apparatus 300a described in the fourth embodiment are described.

(1) Specification Unit 303

The specification unit 303 specifies the position X of one encrypted media key by checking the pieces of header information sequentially from the top, with use of ID information and header information. Note that details of the operations for specifying the position X of the encrypted media key are described later.

5.2 Operations of the Digital Work Protection System 10e

The following description focuses on the features of the operations of the digital work protection system 10e that differ from the digital work protection system 10d.

5.2.1 Operations for Generating Header Information

Here, the flowcharts in FIG. 43 to FIG. 46 are used to describe operations by the key information header generation unit 106 for generating header information. Note that the operations described here are the details of step S153 in the flowchart in FIG. 11.

The key information header generation unit 106 tries to read one piece of node information at a time from the tree structure table according to Order Rule 2 (step S451).

On detecting that it has finished reading all the pieces of node information (step S452), the key information header generation unit 106 proceeds to step S458.

When the key information header generation unit 106 does not detect that it has finished reading all the pieces of node information, but instead is able to read a piece of node information (step S452), the key information header generation unit 106 reads the two pieces of node information that correspond to the two directly subordinate nodes of the target node that corresponds to the read node information (step S453).

When the target node has subordinate nodes (step S454), the key information header generation unit 106 checks whether the read two pieces of node information corresponding to the two subordinate nodes have revocation flags attached thereto, generates an NRP (step S455), and attaches an extension bit of the value "0" to the head of the generated NRP (step S456). Then, the key information header generation unit 106 adds the NRP that has the extension bit attached thereto to the piece of node information corresponding to the target node (step S457), and returns to step S451 to repeat the processing.

When the target node does not have subordinate nodes (step S454), the key information header generation unit 106 returns to steps S451 to repeat the processing.

Next, the key information header generation unit 106 tries to read the pieces of node information from the tree structure table in order according to Order Rule 2 (step S458).

On detecting that it has finished reading the pieces of node information (step S459), the key information header generation unit 106 proceeds to step S465.

When the key information header generation unit 106 does not detect that it has finished reading the pieces of node information, but instead is able to read a piece of node information (step S459), the key information header generation unit 106 reads all the pieces of node information corresponding to all directly subordinate nodes of the read piece of node information (step S460).

When the target node has subordinate nodes (step S461), the key information header generation unit 106 checks whether all the read pieces of node information corresponding to all the subordinate nodes have revocation flags attached thereto (step S462), and only when all the subordinate nodes have revocation flags attached thereto (step S463), the key information header generation unit 106 rewrites the top bit of the NRP attached to the piece of node information corresponding to the target node with "1" (step S464).

Next, the key information header generation unit 106 returns to step S458 to repeat the processing.

When the target node does not have subordinate nodes (step S461), the key information header generation unit 106 returns to step S458 to repeat the processing.

Next, the key information header generation unit 106 tries to read one piece of node information at a time from the tree structure table according to Order Rule 2 (step S465).

On detecting that it has finished reading all the pieces of node information (step S466), the key information header generation unit 106 proceeds to step S472.

When the key information header generation unit 106 does not detect that it has finished reading all the pieces of node information, but instead is able to read a piece of node information (step S466), the key information header generation unit 106 reads all the pieces of node information that correspond to all the subordinate nodes of the target node that corresponds to the read piece of node information (step S467).

When the target node has subordinate nodes (step S468), the key information header generation unit 106 checks whether all the read pieces of node information corresponding to all the subordinate nodes have NRPs {111} attached thereto (step S469), and only when all the read pieces of node information have NRPs {111} attached thereto (step S470), the key information header generation unit 106 attaches a deletion flag to each of the pieces of node information (step S471).

Next, the key information header generation unit 106 returns to step S465 to repeat the processing.

When the target node does not have subordinate nodes (step S468), the key information header generation unit 106 returns to step S465 to repeat the processing.

Next, the key information header generation unit 106 tries to read the pieces of node information one at a time from the tree structure table according to Order Rule 2 (step S472).

On detecting that it has finished reading the pieces of node information (step S473), the key information header generation unit 106 ends the processing.

When the key information header generation unit 106 does not detect that it has finished reading the pieces of node information, but instead is able to read a piece of node information (step S473), the key information header generation unit 106 checks whether the read piece of node information has an NRP attached thereto, and if so (step S474), checks whether a deletion flag is attached to the read piece of node information. When a deletion flag is not attached thereto (step S475), the key information header generation unit 106 outputs the attached NRP (step S476). The key information header generation unit 106 then returns to step S472 to repeat the processing.

When the read piece of node information does not have an NRP attached thereto (step S474), or when the read piece of node information has a deletion flag attached thereto (step S475), the key information header generation unit 106 returns to step S472 to repeat the processing.

5.2.2 Operations for Specifying Key Information

Figure 47:
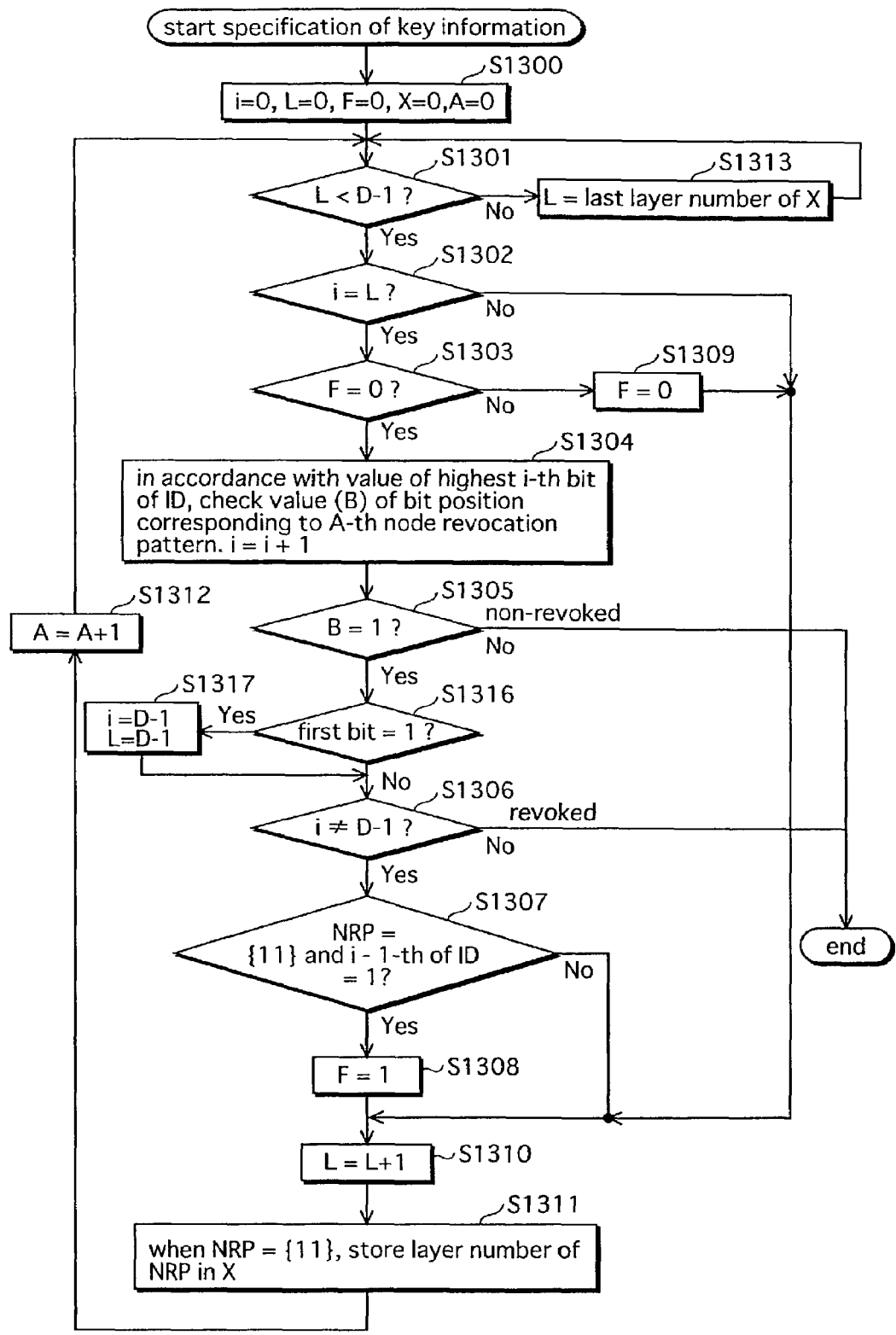
FIG. 47 is a flowchart showing operations by the specification unit 303 in the recording medium 300a for designating one encrypted media key from amongst key information stored in the recording medium 500b.

Here, the flowchart in FIG. 47 is used to describe operations by the specification unit 303 of the recording apparatus 300a for specifying an encrypted media key from key information stored in the recording medium 500b. Note that the operations described here are the details of step S172 in the flowchart in FIG. 11.

Note also that operations performed by the specification unit 402 of the reproduction apparatus 400a are the same as those by the specification unit 303, and therefore a description thereof is omitted.

Here, the features that differ from the flowchart shown in FIG. 42 are described.

Similar to the fourth embodiment, the specification unit 303 has a variable i, a variable L, a variable X, a flag F, a value D, and a pointer A. The variable i shows the bit position of ID information to be checked. The variable L shows the layer in which NRP currently being checked is included. The variable X stores the layer of the node where the paths branch out. The flag F (initial value F=0) is for judging whether to check an NRP. The value D shows the number of layers in the tree structure. The pointer A shows the position of the NRP to be checked.

When value B=1 (step S1305), only when the highest bit of the NRP is "1" (step S1316), the specification unit 303 sets variable i=D−1 and sets variable L=D−1 (step S1317).

Furthermore, when both the NRP is {11} and the highest bit of the NRP is not "1", the specification unit 303 stores the layer number of the NRP in the variable X (step S1311).

6. Other Modifications

Note that although the present embodiment has been described based on the above embodiments, the present invention is not limited thereto. Cases such as the following are also included in the present invention.

(1) The present invention is not limited to using the conventional method of revocation described in the embodiments. Any method of assigning device keys to the nodes and assigning the device keys to recording apparatuses and/or reproduction apparatuses is possible providing the following conditions are fulfilled: the key management apparatus maintains a tree structure, recording apparatuses and/or reproduction apparatuses are assigned to the leaves of the tree structure, device keys associated with the nodes are assigned to the recording apparatuses and/or reproduction apparatuses, and the key management apparatus performs revocation of device keys with use of the tree structure, and generates key information.

(2) The tree structure is not limited to being the binary tree described in the embodiments. Generally, the present invention may be realized by an n-ary tree. In this case the ID information is set by assigning 0 to n−1 to the n paths derived from and below a node, and, as described in the embodiments, joining values assigned to the paths from the leaves through to the root in order from the top.

(3) An example of recordable media such as a DVD-RAM is used in the above-described embodiments, however the present invention can be realized in a similar manner for pre-recorded media such as a DVD-Video.

The following describes a digital work protection system 10f for pre-recorded media.

Figure 48:
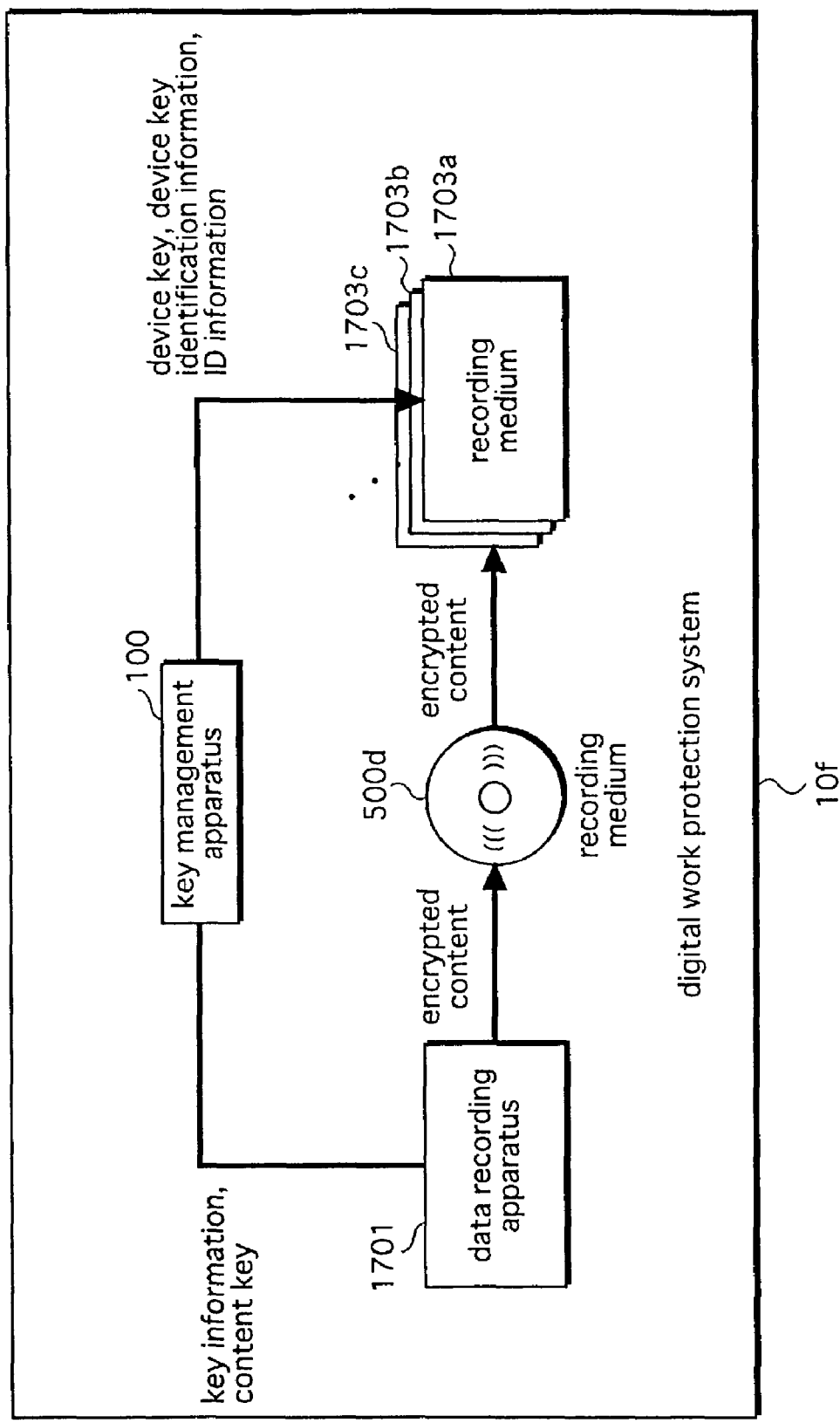
FIG. 48 is a block diagram showing the structure of a digital work protection system 10f.

The digital work protection system 10f, as shown in FIG. 48, is composed of a key management apparatus 100, a data recording apparatus 1701, and data reproduction apparatuses 1703a, 1703b, 1703c, etc (hereinafter referred to as "recording apparatuses 1703a, etc.").

As described is the embodiments, the key management apparatus 100 outputs key information to which header information is attached, and a content key to the data recording apparatus 1701, and outputs a plurality of device keys, identification information about each device key, and ID information to the data reproduction apparatuses 1703a, etc.

A recording medium 500a, which is a pre-recorded medium, is loaded into the data recording apparatus 1701. The data recording apparatus 1701 receives the key information and the media key from the key management apparatus 100, encrypts content using the media key, to generate encrypted content, and writes the generated encrypted content and the received key information to the recording medium 500a. In this way, a recording medium 500d on which encrypted content, and key information are written, is produced.

The recording medium 500d is circulated on the market, and a user acquires the recording medium 500d. The user loads the recording medium 500d into the data reproduction apparatus 1703a.

The data reproduction apparatus 1703a has received a plurality of device keys, identification information about the device keys, and ID information from the key management apparatus 100 in advance. When the recording medium 500d is loaded into the data reproduction apparatus 1703a, the data reproduction apparatus 1703a reads the key information and the encrypted content from the recording medium 500d, specifies the encrypted media key from the key information, decrypts the specified encrypted media key with use of the device key, and decrypts the encrypted content with use of the obtained media key, to generate content.

The same kind of operations as the key management apparatus 100 shown in the embodiments can be used to control the size of the header information that is recorded on the recording medium, and for the data reproduction apparatuses to specify efficiently the encrypted media key to be decrypted.

(4) The present invention is not limited to being applied to copyright protection of digital content as described in the embodiments, but may be used, for example, for the purpose of conditional access in a membership-based information provision system for providing information to members other than a particular member or members.

(5) In the embodiments an example is described of key information and encrypted content being distributed with use of a recording medium, but instead of the recording medium, a communication medium, of which the Internet is representative, may be used.

(6) The key management apparatus and the key information recording apparatus may be integrated into one apparatus.

(7) The present invention is not limited to the method of assigning device keys described in the embodiment in which a device key is assigned to each node in the n-ary tree in advance, and all the device keys on a path from a leaf to the root are assigned to the user apparatus that corresponds to the leaf.

If is possible to assign a device key in advance, not to all the nodes in the n-ary tree, but to some nodes.

Furthermore, it is possible to assign not all the device keys on the path from the leaf to the root but some of the device keys on the path, to the user apparatus that corresponds to the leaf.

(8) Taking for example the tree structure in FIG. 4, assume that in an initial state in which the device key has not been leaked, an encrypted media key is generated by encrypting the media key with use of the device key A.

Assume now that one of the user apparatuses 1 to 16 is hacked illegally by a third party, the device key A is exposed, and a clone device is manufactured that has the device key A only. Since the clone device has only the device key A, it is not possible to specify which of the user apparatuses 1 to 16 has been hacked. Furthermore, since the clone device has the device key A, it is able to obtain the correct media key.

In this situation it is necessary to revoke only the device key A and to encrypt the media key using a device key that can cover all the devices, in other words that is common to all devices. The reason here for using a device key that covers all the devices is that it is not possible to judge which of the devices has been hacked.

To deal with this, the media key is encrypted respectively with use of device key B and device key C, to generate two encrypted device keys.

Next, if key B is exposed, device key B is revoked, and the media key is encrypted respectively with use of device key C, device key D, and device key E, to generate three encrypted media keys.

If this is repeated a number of times equal to the number of layers in the tree, it will be possible in the end to specify which device has been hacked.

In order to deal with the described situation, an NRP {100} is attached to the node corresponding to device key A when only device key A is revoked. In the case of the tree structure in FIG. 4, the NRP {100} is attached to the root.

The head bit "1" of the NRP {100} shows that the node is revoked, and the bit string "00" after the head bit "1" shows that the two directly subordinate nodes of the node are not revoked.

In other words, in the case of the tree structure in FIG. 4, if the NRP {100} is attached to the root, this means that there are two encrypted media keys that have been generated by encrypting the media key with use of device key B and device key C respectively. In this way, it can be said that the head bit "1" of the NRP means that there are two encrypted media keys below the node.

On the other hand, as described in the second embodiment, when the NRP is {111}, the head bit "1" shows that there are no NRPs below the node.

The following describes this in more detail.

<Key Management Apparatus 100>

Here it is assumed that the key management apparatus 100 generates the tree structure T100 shown in FIG. 4, and assigns a device key to each node, and a user apparatus to each leaf, as shown in FIG. 4.

Figure 49:
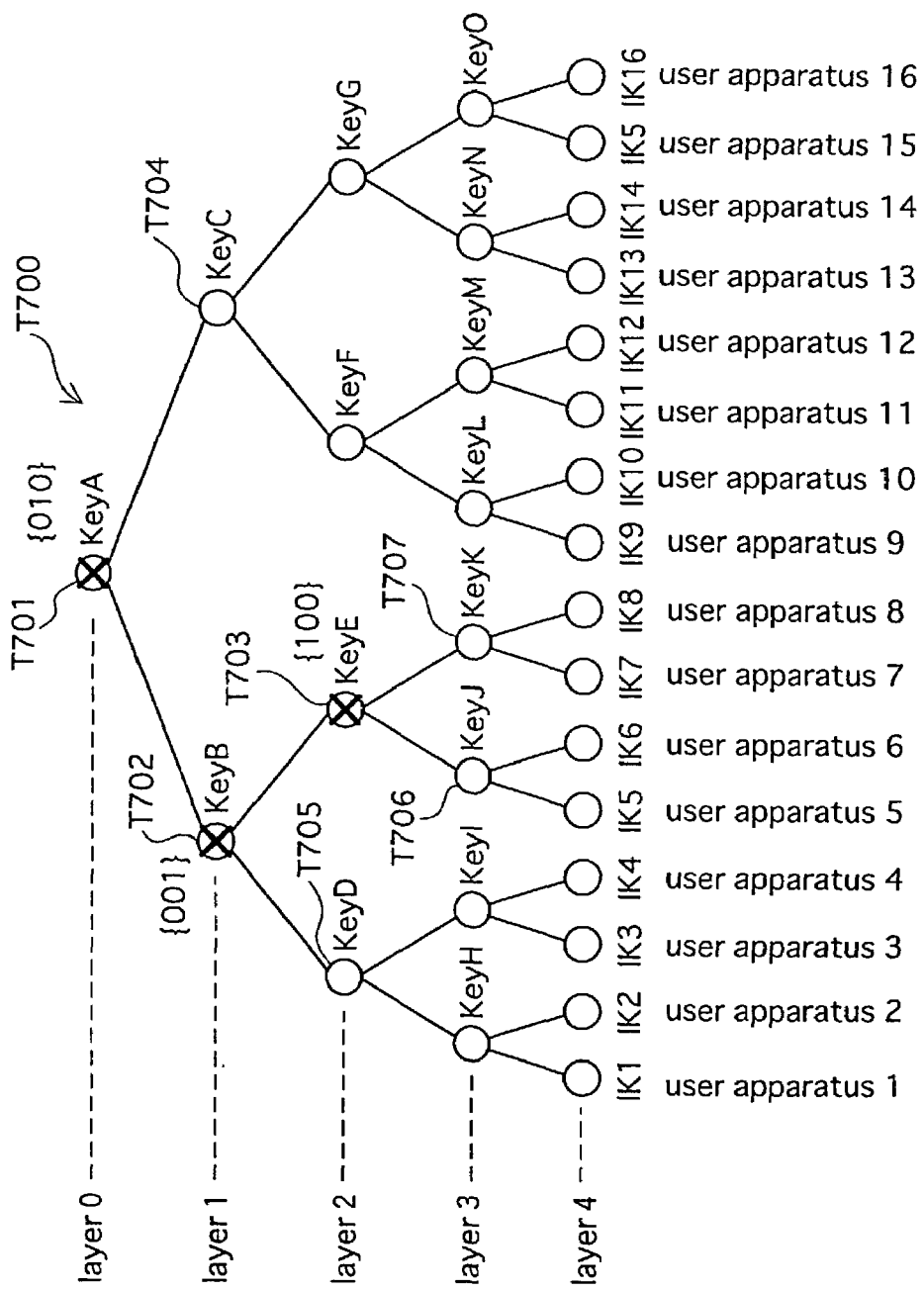
FIG. 49 is an conceptual diagram of a tree structure T700 that includes nodes to which revoked device KeyA, KeyB and KeyE are assigned.

After this, as shown in FIG. 49, device keys KeyA, KeyB and KeyE assigned to nodes T701, T702 and T703 respectively are leaked as described earlier. The key management apparatus 100 revokes the device keys KeyA, KeyB and KeyE, generates header information and key information, and writes the generated header information and key information to the recording medium via the key information recording apparatus 200.

(a) Revocation of Device Keys KeyA, KeyB and KeyE

The key management apparatus attaches revocation flags "1" to the pieces of node information that respectively include the device keys KeyA, KeyB and KeyE.

(b) Generation of Header Information

The key management apparatus 100 generates, with use of the tree structure table that includes node information to which a revocation flag is attached, an NRP {010} to attach to the root T701, and writes the generated NRP {010} to the recording medium via the key information recording apparatus 200 as part of the header information. Here, the head bit "0" of the NRP shows that one of the directly subordinate nodes of the root T701 is revoked and the other subordinate nodes is not revoked. Furthermore, as described in the embodiment, the lower two bits "10" show that of the two directly subordinate nodes of the root T701, the left node T702 is revoked and the right node T704 is not revoked.

Next, the key management apparatus 100 generates an NRP {001} to attach to the node T702, and writes the generated NRP {001} to the recording medium via the key information recording apparatus 200 as part of the header information. Here, the head bit "0" of the NRP shows that one of the directly subordinate nodes of the node T702 is revoked and the other directly subordinate nodes is not revoked. Furthermore, as described in the embodiment, the lower two bits "01" show that of the two directly subordinate nodes of the root T702, the left node T705 is not revoked and the right node T703 is revoked.

Next, the key management apparatus 100 generates an NRP {100} to attach to the node T703, and writes the generated NRP {100} to the recording medium via the key information recording apparatus 200 as part of the header information. The NRP {100}, as described above, shows that neither of the two directly subordinate nodes T706 and T707 of the node T703 are revoked, and that the nodes T706 and T707 have respective encrypted media keys.

Figure 50:
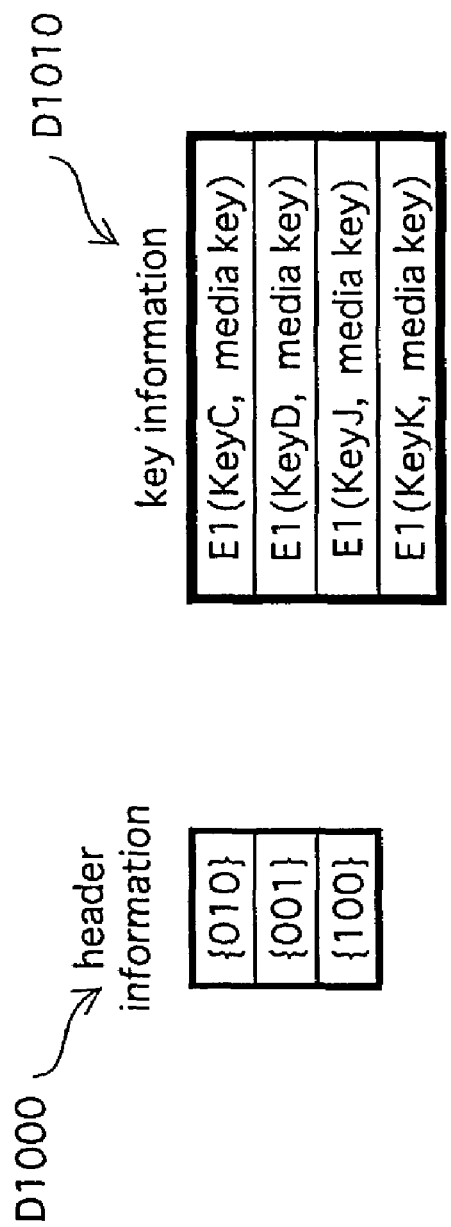
FIG. 50 is a data structure diagram showing header information D1000 and key information D1010.

In this way the header information D110 shown in FIG. 50 is written to the recording medium. As shown in FIG. 50, the header information D1100 is composed of NRPs {010}, {001} and {100} in the stated order.

(c) Generation of Key Information

Next, the key management apparatus 100 encrypts the media key with use of some of the non-revoked device keys, to generate encrypted media keys, and writes key information that includes the generated encrypted media keys, and header information that includes NRPs to the recording medium via the key information recording apparatus 200. The key information is generated in the following way.

First, the key management apparatus 100 encrypts the media key with use of the device key assigned to the node on the highest layer, to generate an encrypted media key. Here, as shown in FIG. 49, the device key on the highest layer amongst the non-revoked device keys is the device key KeyC assigned to the node T704. Therefore, the key management apparatus 100 encrypts the media key with use of the device key KeyC, to generate an encrypted media key E1(KeyC, media key), and writes the generated encrypted media key E1(KeyC, media key) the recording medium via the key information recording apparatus 200.

Next, the key management apparatus 100 encrypts the media key with use of the device key assigned to the node on the highest layer excluding the node T704 to which the device key KeyC is assigned and all the subordinate nodes of the node T704, to generate an encrypted media key. Here, since the applicable node is the node T705, the key management apparatus 100 encrypts the media key with use of the device key KeyD assigned to the node T705, to generate an encrypted media key E1(KeyD, media key), and writes the generated encrypted media key E1(KeyD, media key) the recording medium via the key information recording apparatus 200.

Next, the key management apparatus 100 encrypts the media key with use of the device key assigned to the node on the highest layer excluding the node T704 to which the device key KeyC is assigned and the node T705 to which the device key KeyD and all the respective subordinate nodes of the nodes T704 and T705, to generate an encrypted media key. Here, since the applicable node is the node T706, the key management apparatus 100 encrypts the media key with use of the device key KeyJ assigned to the node T706, to generate an encrypted media key E1(KeyJ, media key), and writes the generated encrypted media key E1(KeyJ, media key) the recording medium via the key information recording apparatus 200.

Next, the key management apparatus 100 encrypts the media key in the same way as above with use of the device key K, to generate to generate an encrypted media key E1(KeyK, media key), and writes the generated encrypted media key E1(KeyK, media key) the recording medium via the key information recording apparatus 200.

In this way key information D1010 shown in FIG. 50 is written to the recording medium. As shown in FIG. 50, the key information D1010 is composed of the encrypted media keys E1(KeyC, media key), E1(KeyD, media key), E1(KeyJ, media key) and E1(KeyK, media key) in the stated order.

<Recording Apparatus 300*a*>

Figure 51:
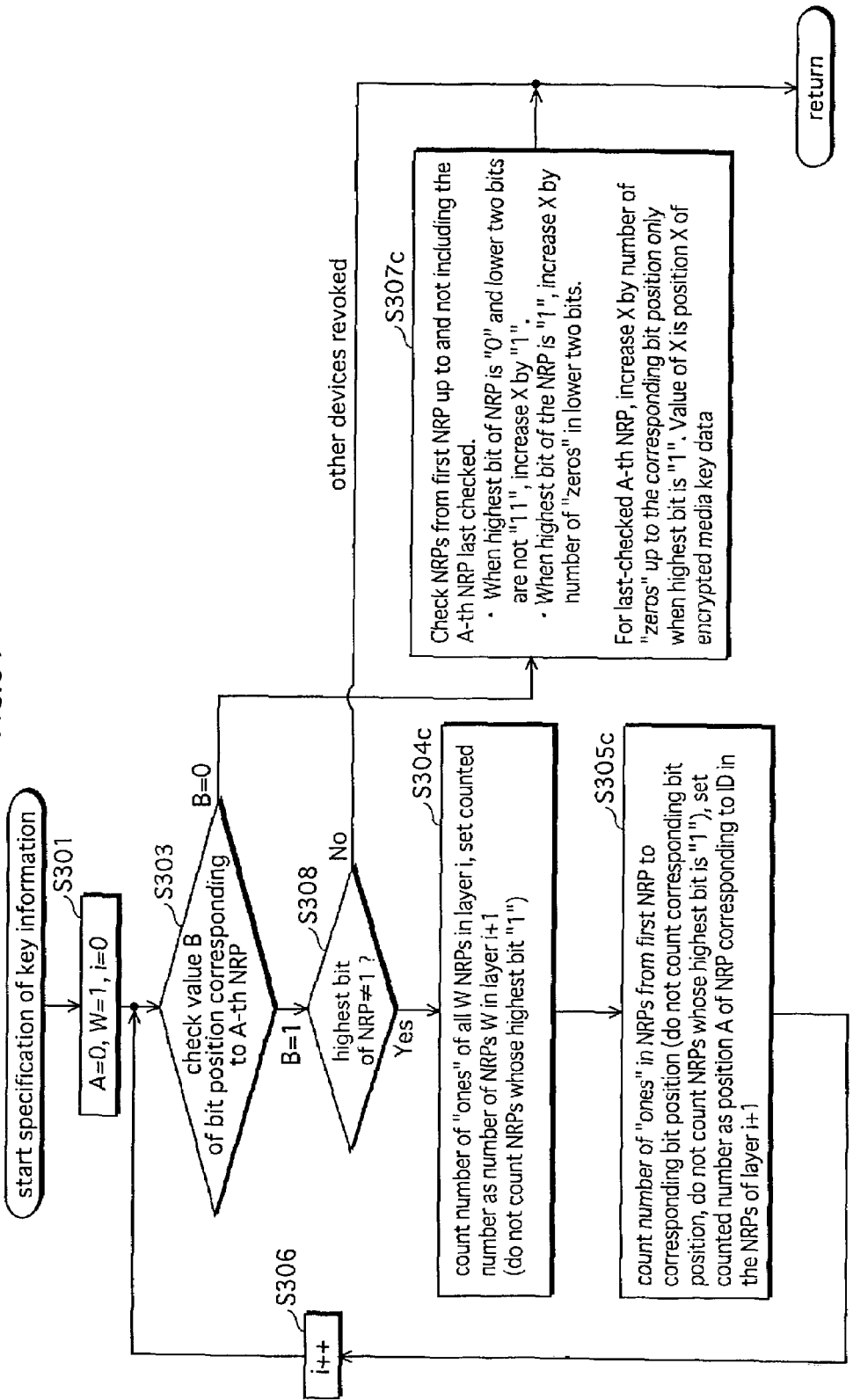
FIG. 51 is a flowchart showing operations by the specification unit 303 of the recording apparatus 300a for specifying an encrypted media key.

The flowchart in FIG. 51 is used to described operations by the specification unit 303 of the recording apparatus 300*a* for specifying one encrypted media key from the header information and the key information stored on the recording medium as described above.

The specification unit 303 unit has a variable X showing the position of the encrypted media key, a variable A showing the position of the NRP relating to the user apparatus itself, a variable W showing the number of NRPs in a particular layer, and a variable i showing the number of the layer that is the target of processing.

The specification unit 303 sets variable A=0, variable W=1, and variable i=0 as initial values (step S301).

Next the specification unit 303 checks whether a value B that is in the bit position corresponding to the value of the highest i-th bit of the ID information is "0" or "1" (step S303). Here, as described in the embodiments the corresponding bit pattern is ID information composed based on a rule that the "0" is assigned to left paths in the tree structure and "1" is assigned to right paths. Therefore, a value "0" of the top i-th bit of the ID information corresponds to the left bit of two lower bits of the A-th NRP, and a value "1" of the top i-th bit corresponds to the right bit of two lower bits of the A-th NRP.

Next, when value B=0 (step S303), the specification unit 303 checks the each NRP from the head NRP to the NRP last checked, in the following way. Note that the A-th NRP is not included.

(a) When the highest bit of the NRP is "0" and the lower two bits are not "11", the specification unit 303 adds "1" to the variable X.

(b) When the highest bit of the NRP is "1", the specification unit 303 adds the number of "0" included in the lower two bits to the variable X.

For the A-th NRP that was checked last, the specification unit 303 adds the number of "0" up to the corresponding bit to the variable X only when the highest bit of the NRP is "1". Here, corresponding bit itself is not included. The variable X obtained in this way shows the position of the encrypted media key. Furthermore, the variable i at this point is the device identification information for identifying the device key (step S307*c*). The specification unit 303 then ends the processing.

On the other hand, when value B=1 (step S303), the specification unit 303 further judges whether the highest bit of the NRP is "1", and if so (step S308), ends the processing because the user apparatus is revoked.

When the highest bit of the NRP is not "1" (step S308), the specification unit 303 counts the number of "ones" included in the lower bits of all the W NRPs in the layer i, and sets the counted value in the variable W. Note that NRPs whose highest bit is "1" are not counted. The variable W obtained in this way shows the number of NRPs in the next layer i+1 (step S304*c*).

Next, the specification unit 303 counts the number of "ones" included in the lower two bits of each NRP from the first NRP in layer i up to the corresponding bit position, and sets the counted value in the variable A. Here the corresponding bit position is not counted. Furthermore, NRPs whose highest bit is "1" are not counted. The variable A obtained in this way shows the position amongst the NRPs in the next layer i+1 of the NRP relating to the user apparatus itself (step S305*c*).

Next, the specification unit 303 calculates variable i=i+1 (step S306), moves to step S303, and repeats the above-described processing.

In this way the key management apparatus is able to write header information and key information to the recording apparatus and the reproduction apparatus is able to specify an encrypted media key, not only in cases in which device keys on a path from a leaf of the to the root in the tree structure are revoked, but also in cases in which device keys assigned to some nodes in the tree structure are revoked.

(9) Taking for example the tree structure in FIG. 4, assume that the tree is in an initial stage in which none of the device keys has been leaked and none of the nodes in the tree structure has been revoked.

In this case, the key management apparatus encrypts the media key with use of the device key KeyA that is in correspondence with the root, to generate an encrypted media key. Next, the key management apparatus generates one special NRP {00} that shows that there are no revoked nodes in the tree structure and that all the nodes are valid (i.e., not revoked). Then the key management apparatus writes the generated encrypted media key and the generated NRP {00} via the key information recording apparatus to the recording medium.

Furthermore, in this case, when the reproduction apparatus reads the NRP from the recording medium, and judges that the only read NRP is {00} and that there are no other NRPs recorded on the recording medium, the reproduction apparatus judges that there are no revoked nodes in the tree structure. Then the reproduction apparatus reads the encrypted media key recorded on the recording medium, and decrypts the read encrypted medium key with use of the device key KeyA that is the device key amongst those stored by the reproduction apparatus that is in correspondence with the root, to generate the media key.

The recording apparatus also operates in the same manner as the reproduction apparatus in this case.

(10) The present invention may be methods shown by the above. Furthermore, the methods may be a computer program realized by a computer, and may be a digital signal of the computer program.

Furthermore, the present invention may be a computer-readable recording medium apparatus such as a flexible disk, a hard disk, a CD-ROM (compact disk-read only memory), and MO (magneto-optical), a DVD-ROM (digital versatile disk-read only memory), a DVD RAM, or a semiconductor memory, that stores the computer program or the digital signal. Furthermore, the present invention may be the computer program or the digital signal recorded on any of the aforementioned recording medium apparatuses.

Furthermore, the present invention may be the computer program or the digital signal transmitted on a electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium apparatus, or by transferring the program or the digital signal via a network or the like, the program or the digital signal may be executed by another independent computer system.

(11) The present invention may be any combination of the above-described embodiments and modifications.

7. Overall Conclusion

As has been clearly described, according to the disclosed first embodiment of the invention, arranging NRPs in level order as header information that is pre-recorded on the recording medium enables key information and efficient specification by players of the encrypted media key to be decrypted.

Furthermore, according to the disclosed, second embodiment, by adding one bit, as header information, to the head of NRPs to show whether the descendants of a node are all revoked apparatuses, the header information can be reduced in size in cases in which the revoked apparatuses occur in a particular part of the tree structure.

Furthermore, according to the disclosed third embodiment, the header information can be further reduced in size by judging according to a particular pattern whether all the descendants of a particular node are revoked apparatuses.

Furthermore, according to the disclosed fourth embodiment and fifth embodiment, it is possible to arrange the NRPs in orders other than that shown in the first to the third embodiments.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

INDUSTRIAL APPLICABILITY

The above described digital work protection system composed of the key management apparatus and user apparatuses is an ideal means for preventing illegal use of content when circulating a digitized work such as music, a movie or a novel stored on a DVD or the like in the marketplace.

What is claimed is:

1. A user apparatus that is assigned one or more device keys by a key management apparatus that has at least one device key in association with an n-ary tree (n being a integer equal to or greater than 2), and encrypts or decrypts based on the assigned device key, wherein the key management apparatus (a) stores the at least one device key in one-to-one correspondence with at least one node in the n-ary tree, a plurality of the nodes on at least one path from a root node to a leaf node having been revoked, (b) encrypts a media key respectively using a plurality of common device keys to generate a plurality of encrypted media keys, each common device key being one of the at least one device key that is in correspondence with a valid node and that is commonly assigned to at least one user apparatus, and writes the generated plurality of encrypted media keys to a recording medium in an order relating to the structure of the n-ary tree, and (c) generates a piece of revocation information for each revoked node excluding the leaf nodes showing (i) whether each of n directly subordinate nodes of the revoked node is respectively revoked or not and (ii) whether the media key has been encrypted using a device key in correspondence with the revoked node, to obtain a plurality of pieces of revocation information, and writes the obtained pieces of revocation information to the recording medium in the order relating to the structure of the n-ary tree, the user apparatus comprising:
a specification unit operable to specify one encrypted media key using the plurality of pieces of revocation information, from amongst the plurality of encrypted media keys that has been encrypted based on one of the device keys assigned to the user apparatus;
a decryption unit operable to generate the media key by decrypting the specified encrypted media key based on the device key assigned to the user apparatus; and
an encryption/decryption unit operable to perform at least one of (d) encrypting content based on the generated media key and writing the encrypted content to the recording medium, and (e) decrypting, based on the obtained media key, encrypted content read from the recording medium to generate content,
wherein the specification unit is operable to (1) check, in accordance with the order relating to the structure of the n-ary tree and starting from the root node of the n-ary tree, each of the plurality of pieces of revocation information recorded on the recording medium, and (2) count how many of the checked pieces of revocation information show existence of a media key encrypted using a device key, and
wherein, when a node corresponding to a piece of revocation information that is a current checking target of the specification unit exists on a path from the leaf node allocated to the user apparatus to the root node, the specification unit is operable to specify, as the encrypted media key encrypted by a device key allocated to the user apparatus, an encrypted media key that exists in a position determined according to how many pieces of revocation information have been counted since the checking by the specification unit started.

2. The user apparatus of claim 1, wherein
the n-ary tree is composed of a plurality of layers,
the order in which the plurality of encrypted media keys are written to the recording medium is an order of the layers from a root-side layer corresponding to the root node to a leaf-side layer corresponding to the leaf nodes, the root being a starting point of the order,
the pieces of revocation information are written to the recording medium in the order, and the specification unit specifies the encrypted media key from amongst the plurality of encrypted media keys written in the order, with use of the plurality of pieces of revocation information written in the order.

3. The user apparatus of claim 1, wherein
the n-ary tree is composed of a plurality of layers,
the order in which the plurality of encrypted media keys are written to the recording medium is an order in which the nodes are positioned on the paths from the root node to the leaf nodes, the root node being a starting point of the order, and each node being included only once in the order,
the pieces of revocation information are written to the recording medium in the order, and the specification unit specifies the encrypted media key from amongst the plurality of encrypted media keys written in the order, with use of the plurality of pieces of revocation information written in the order.

4. The user apparatus of claim 1, wherein
a piece of revocation information is generated and written to the recording medium for each revoked node excluding the leaf nodes, and
the specification unit specifies the encrypted media key with use of the pieces of revocation information.

5. The user apparatus of claim 1, wherein
a piece of special revocation information is generated for each revoked node, excluding the leaf nodes, whose subordinate nodes are all revoked, showing that the subordinate nodes are all revoked,
generation of revocation information for the revoked subordinate nodes is suppressed,
a piece of revocation information is generated for each revoked node, excluding the leaf nodes, whose n subordinate nodes are not all revoked, showing whether each of n subordinate nodes of the revoked node is respectively revoked or not, and
the specification unit specifies the encrypted media key with use of the pieces of special revocation information and the pieces of revocation information.

6. The user apparatus of claim 5, wherein
the special revocation information is composed of first attached information showing that all the subordinate nodes are revoked and n-digit information showing that each of n directly subordinate nodes is respectively revoked,
generation of revocation information is suppressed for all the revoked subordinate nodes,
each piece of revocation information for revoked nodes whose n directly subordinate nodes are not all revoked is composed of second attached information that shows that not all the subordinate nodes are revoked, and n-digit information showing whether each of n directly subordinate nodes is respectively revoked or not, and
the specification unit specifies the encrypted media key with use of the pieces of special revocation information and the pieces of revocation information.

7. The user apparatus of claim 5, wherein
the special revocation information is composed of an n-digit special value showing that each of n directly subordinate nodes is respectively revoked,
generation of revocation information is suppressed for all the revoked subordinate nodes,
each piece of revocation information for nodes whose n directly subordinate nodes are not all revoked is composed of n-digits showing whether each of n directly subordinate nodes is respectively revoked or not, and
the specification unit specifies the encrypted media key with use of the pieces of special revocation information and the pieces of revocation information.

8. A user apparatus that is assigned one or more device keys by a key management apparatus that has at least one device key in association with an n-ary tree (n being a integer equal to or greater than 2), and encrypts or decrypts with use of the assigned device key,
wherein the key management apparatus:
(a) stores the at least one device key in one-to-one correspondence with at least one node in the n-ary tree, one or more of the nodes on at least a path from a root node to a leaf node having been revoked,
(b) encrypts a media key respectively using a plurality of common device keys to generate a plurality of encrypted media keys, each common device key being one of the at least one device key that is in correspondence with a valid node and that is commonly assigned to at least one user apparatus, and writes the generated plurality of encrypted media keys to a recording medium in an order relating to the structure of the n-ary tree,
(c) for each node excluding the leaf nodes,
(c1) when at least one of n directly subordinate nodes of the revoked node is revoked, generate first revocation information showing (i) whether each of the n subordinate nodes is respectively revoked or not, and (ii) whether the media key has been encrypted using a device key in correspondence with the revoked node, (c2) when none of the n directly subordinate nodes is revoked, generate second revocation information showing that none of the n subordinate nodes is revoked, to obtain one of (i) at least one piece of first revocation information, (ii) at least one piece of second revocation information, and (iii) at least one piece of first revocation information and at least one piece of second revocation information, and (d) write the obtained one of (i) at least one piece of first revocation information, (ii) at least one piece of second revocation information, and (iii) at least one piece of first revocation information and at least one piece of second revocation information to the recording medium in the order relating to the structure of the n-ary tree, the user apparatus comprising:

a specification unit operable to use the one of (i) at least one piece of first revocation information, (ii) at least one piece of second revocation information, and (iii) at least one piece of first revocation information and at least one piece of second revocation information to specify one encrypted media key, from amongst the plurality of encrypted media keys, encrypted based on one of the device keys assigned to the user apparatus;

a decryption unit operable to generate the media key by decrypting the specified encrypted media key based on the device key assigned to the user apparatus; and an encryption/decryption unit operable to perform at least one of (e) encrypting content based on the generated media key, and writing the encrypted content to the recording medium, and (f) decrypting, based on the obtained media key, encrypted content read from the recording medium to generate content, wherein the specification unit is operable to (1) check, in accordance with the order relating to the structure of the n-ary tree and starting from the root node of the n-ary tree, each of the at least one piece of first revocation information recorded on the recording medium, and (2) count how many of the checked pieces of first revocation information show existence of a media key encrypted using a device key, and wherein, when a node corresponding to a piece of first revocation information that is a current checking target of the specification unit exists on a path from the leaf node allocated to the user apparatus to the root node, the specification unit is operable to specify, as the encrypted media key encrypted by a device key allocated to the user apparatus, an encrypted media key that exists in a position determined according to how many pieces of first revocation information have been counted since the checking by the specification unit started.

9. A usage method that is used in a user apparatus that is assigned one or more device keys by a key management apparatus that has at least one device key in association with an n-ary tree (n being a integer equal to or greater than 2), and encrypts or decrypts based on one of the assigned device keys, wherein the key management apparatus (a) stores the at least one device key in one-to-one correspondence with at least one node in the n-ary tree, a plurality of the nodes on at least one path from a root node to a leaf node having been revoked, (b) encrypts a media key respectively using a plurality of common device keys to generate a plurality of encrypted media keys, each common device key being one of the at least one device key that is in correspondence with a valid node and that is commonly assigned to at least one user apparatus, and writes the generated plurality of encrypted media keys to a recording medium in an order relating to the structure of the n-ary tree, and (c) generates a piece of revocation information for each revoked node excluding the leaf nodes showing (i) whether each of n directly subordinate nodes of the revoked node is respectively revoked or not and (ii) whether the media key has been encrypted using a device key in correspondence with the revoked node, to obtain a plurality of pieces of revocation information, and writes the obtained pieces of revocation information to the recording medium in the order relating to the structure of the n-ary tree, the user method comprising:

a specification step of specifying one encrypted media key using the plurality of pieces of revocation information, from amongst the plurality of encrypted media keys that has been encrypted based on one of the device keys assigned to the user apparatus;

a decryption step of generating the media key by decrypting the specified encrypted media key based on the device key assigned to the user apparatus; and an encryption/decryption step of performing at least one of (d) encrypting content based on the generated media key and writing the encrypted content to the recording medium, and (e) decrypting, based on the obtained media key, encrypted content read from the recording medium to generate contents, wherein the specification step comprises:

checking, in accordance with the order relating to the structure of the n-ary tree and starting from the root node of the n-ary tree, each of the plurality of pieces of revocation information recorded on the recording medium;

counting how many of the checked pieces of revocation information show existence of a media key encrypted using a device key; and specifying, when a node corresponding to a piece of revocation information that is a current checking target exists on a path from the leaf node allocated to the user apparatus to the root node, as the encrypted media key encrypted by a device key allocated to the user apparatus, an encrypted media key that exists in a position determined according to how many pieces of revocation information have been counted since the checking by the specification unit started.

10. A computer-readable recording medium having stored thereon a user program that is used in a user apparatus that is assigned at least one device key by a key management apparatus that has at least one device key in association with an n-ary tree (n being a integer equal to or greater than 2), and encrypts or decrypts based on one of the assigned device keys, wherein the key management apparatus (a) stores the at least one device key in one-to-one correspondence with at least one node in the n-ary tree, a plurality of the nodes on at least one path from a root node to a leaf node having been revoked, (b) encrypts a media key respectively using a plurality of common device keys to generate a plurality of encrypted media keys, each common device key being one of the at least one device key that is in correspondence with a valid node and that is commonly assigned to at least one user apparatus, and writes the generated plurality of encrypted media keys to a recording medium in an order relating to the structure of the n-ary tree, and (c) generates a piece of revocation information for each revoked node excluding the leaf nodes showing (i) whether each of n directly subordinate nodes of the revoked node is respectively revoked or not and (ii) whether the media key has been encrypted using a device key in correspondence with the revoked node, to obtain a plurality of pieces of revocation information, and writes the obtained pieces of revocation information to the recording medium in the order relating to the structure of the n-ary tree, the user program causing the user apparatus to execute a method comprising:

a specification step of specifying one encrypted media key using the plurality of pieces of revocation information, from amongst the plurality of encrypted media keys that has been encrypted based on one of the device keys assigned to the user apparatus;

a decryption step of generating the media key by decrypting the specified encrypted media key based on the device key assigned to the user apparatus; and an encryption/decryption step of performing at least one of (d) encrypting content based on the generated media key and writing the encrypted content to the recording medium, and (e) decrypting, based on the obtained media key, encrypted content read from the recording medium to generate content, wherein the specification step comprises:

checking, in accordance with the order relating to the structure of the n-ary tree and starting from the root node of the n-ary tree, each of the plurality of pieces of revocation information recorded on the recording medium;

counting how many of the checked pieces of revocation information show existence of a media key encrypted using a device key; and specifying, when a node corresponding to a piece of revocation information that is a current checking target exists on a path from the leaf node allocated to the user apparatus to the root node, as the encrypted media key encrypted by a device key allocated to the user apparatus, an encrypted media key that exists in a position determined according to how many pieces of revocation information have been counted since the checking by the specification unit started.

* * * * *

UNITED STATES PATENT AND TRADEMARK OFFICE
CERTIFICATE OF CORRECTION

PATENT NO. : 7,272,229 B2  Page 1 of 1
APPLICATION NO. : 10/278082
DATED : September 18, 2007
INVENTOR(S) : Toshihisa Nakano et al.

It is certified that error appears in the above-identified patent and that said Letters Patent is hereby corrected as shown below:

Column 50,

Line 35, "contents" should read --content--.

Signed and Sealed this

Thirteenth Day of May, 2008

JON W. DUDAS
*Director of the United States Patent and Trademark Office*